US012596014B2

(12) United States Patent
Wannerberg et al.

(10) Patent No.: US 12,596,014 B2
(45) Date of Patent: Apr. 7, 2026

(54) GUIDANCE FOR COLLABORATIVE MAP BUILDING AND UPDATING

(71) Applicant: Adeia Guides Inc., San Jose, CA (US)

(72) Inventors: Petter Wannerberg, Stockholm (SE); Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 100 days.

(21) Appl. No.: 18/241,181

(22) Filed: Aug. 31, 2023

(65) Prior Publication Data

US 2025/0076079 A1     Mar. 6, 2025

(51) Int. Cl.
*G01C 21/00* (2006.01)
*G06T 19/00* (2011.01)

(52) U.S. Cl.
CPC ........ *G01C 21/3848* (2020.08); *G06T 19/006* (2013.01)

(58) Field of Classification Search
CPC ......................... G01C 21/3848; G06T 19/006
USPC ......................................................... 701/409
See application file for complete search history.

(56) References Cited

U.S. PATENT DOCUMENTS 10,650,588 B2    5/2020  Hazeghi et al.
11,645,904 B2 *  5/2023  Trundle .................. B60L 53/36
                                                            701/2

| | | | |
|---|---|---|---|
| 11,907,093 B1 | 2/2024 | Nair et al. | |
| 2015/0172604 A1 | 6/2015 | Kim | |
| 2018/0130196 A1 * | 5/2018 | Loveland | H04N 1/00204 |
| 2018/0253862 A1 | 9/2018 | Barnes et al. | |
| 2020/0034620 A1 * | 1/2020 | Lutterodt | G01C 11/28 |
| 2020/0117201 A1 * | 4/2020 | Oetken | G05D 1/0231 |
| 2021/0150818 A1 * | 5/2021 | Dedonato | G06F 3/011 |
| 2021/0256722 A1 * | 8/2021 | Staab | G01S 17/894 |
| 2025/0076080 A1 | 3/2025 | Phillips | |

FOREIGN PATENT DOCUMENTS

| | | | | |
|---|---|---|---|---|
| CN | 108136257 B | | 9/2021 | |
| CN | 113393579 A | * | 9/2021 | G06T 17/05 |

OTHER PUBLICATIONS

San Juan, Víctor, Santos, Matilde, Andújar, José Manuel, "Intelligent UAV Map Generation and Discrete Path Planning for Search and Rescue Operations", Complexity, 2018, 6879419, 17 pages, 2018. https://doi.org/10.1155/2018/6879419 (Year: 2018).*

(Continued)

*Primary Examiner* — Ramya P Burgess
*Assistant Examiner* — Hyang Ahn
(74) *Attorney, Agent, or Firm* — HG LAW LLP

(57) ABSTRACT

A collaborative map building method is described in which if it is determined, for example, by a SLAM network edge, that a portion of a map corresponding to a target area of a first region is incomplete, a request to a device is transmitted to move toward the target area. The map is updated based on the scan performed by the device in the target area. Also described is a virtual image guide embodiment in which upon determining that a map of a target area of the first region is incomplete, a virtual guide image is generated on a device to appear at a target location. The user of the device is guided to the target area by the virtual image.

20 Claims, 34 Drawing Sheets

(56) References Cited

OTHER PUBLICATIONS

Chen, Yu, Qi Dong, Xiaozhou Shang, Zhenyu Wu, and Jinyu Wang. 2023. "Multi-UAV Autonomous Path Planning in Reconnaissance Missions Considering Incomplete Information: A Reinforcement Learning Method" Drones 7, No. 1: 10. https://doi.org/10.3390/drones7010010 (Year: 2023).*

H. Surmann, N. Berninger and R. Worst, "3D mapping for multi hybrid robot cooperation," 2017 IEEE/RSJ International Conference on Intelligent Robots and Systems (IROS), Vancouver, BC, Canada, 2017, pp. 626-633, https://ieeexplore.ieee.org/document/8202217 (Year: 2017).*

Canvas Lite for Homeowners, Remote 3D Home Measurement, Occipital, Inc., https://apps.apple.com/US/app/canvas-pocket-3d-room-scanner/id1514382369, retrieved from internet Oct. 3, 2023.

Canvas: LiDAR 3D Measurements, Fast, Easy As-Built CAD/BIM, Occipital, Inc., https://apps.apple.com/us/app/canvas-lidar-3d-measurements/id1169235377, retrieved from internet Oct. 3, 2023.

Indoor Positioning System according to Wikipedia, https://en.wikipedia.org/wiki/Indoor_positioning_system, retrieved from internet Oct. 3, 2023.

Introducing Roomplan, https://developer.apple.com/augmented-reality/roomplan/, retrieved from internet Oct. 3, 2023.

Jover, "Experimental Feature: De-Lighting Tool," https://blog.unity.com/technology/experimental-feature-de-lighting-tool (Jul. 7, 2017).

Learning Efficient Multi-Agent Cooperative Visual Exploration, Chao Yu1, Xinyi Yang, Jiaxuan Gao2, Huazhong Yang, Yu Wang, Yi Wu, 2022, https://openreview.net/pdf?id =-4Yz4vU4uN5.

LIDAR as defined by Wikipedia, https://en.wikipedia.org/wiki/Lidar, retrieved from internet Oct. 3, 2023.

Photogrammetry as defined by Wikipedia, https://en.wikipedia.org/wiki/Photogrammetry, retrieved from internet Oct. 3, 2023.

Quixel's Reality Scan app, https://www.unrealengine.com/en-us/realityscan, retrieved from internet Oct. 3, 2023.

Ren et al., "Poster Abstract: 3D Human Pose Estimation Using WiFi Signals," SenSys '21: Proceedings of the 19th ACM Conference on Embedded Networked Sensor Systems, pp. 363-364 (2021).

SwarmMap: Scaling Up Real-time Collaborative Visual SLAM at the Edge, Jingao Xu, Hao Cao, and Zheng Yang, Longfei Shangguan, Jialin Zhang, Xiaowu He, and Yunhao Liu, Apr. 4, 2022, https://www.usenix.org/system/files/nsdi22-paper-xu_jingao.pdf.

Wang et al., "An Effective Hole Detection Method for 3D Models," 20th European Signal Processing Conference (EUSIPCO), pp. 1-5 (2012).

U.S. Appl. No. 18/241,185, filed Aug. 31, 2023, Christopher Phillips.

U.S. Appl. No. 18/128,934, filed Mar. 30, 2023, Christopher Phillips.

U.S. Appl. No. 18/128,935, filed Mar. 30, 2023, Christopher Phillips.

* cited by examiner

First region 101

First device transmits map data to central processor

113

121

Central processor determines that more data is needed and requests a second device to move to a target location of a target area

115

123

The second device transmits updated map data to the central processor from the target location

125

111

Target area 103

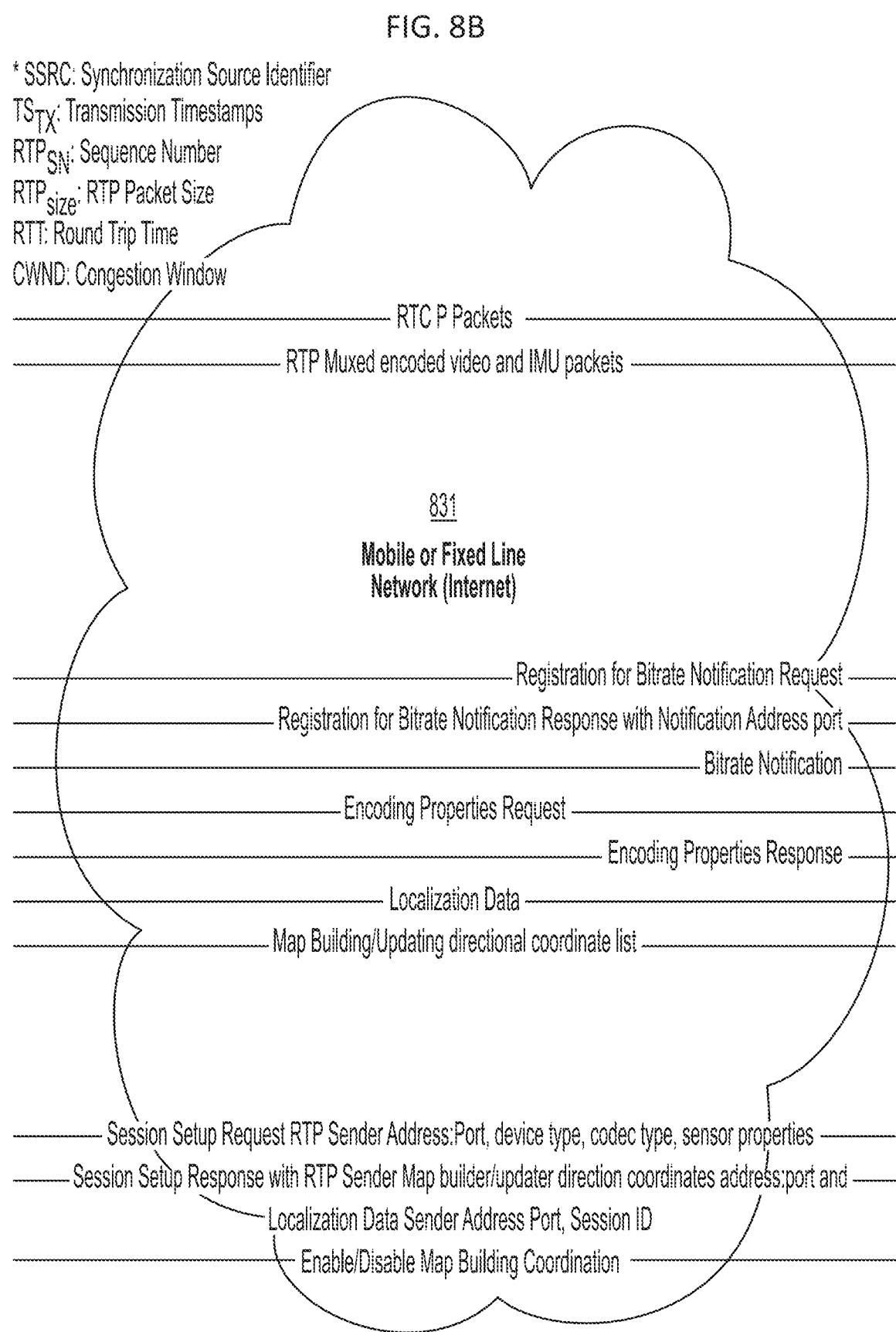

* SSRC: Synchronization Source Identifier
$TS_{TX}$: Transmission Timestamps
$RTP_{SN}$: Sequence Number
$RTP_{size}$: RTP Packet Size
RTT: Round Trip Time
CWND: Congestion Window RTC P Packets RTP Muxed encoded video and IMU packets

831

**Mobile or Fixed Line
Network (Internet)**

Registration for Bitrate Notification Request

Registration for Bitrate Notification Response with Notification Address port

Bitrate Notification

Encoding Properties Request

Encoding Properties Response

Localization Data

Map Building/Updating directional coordinate list

Session Setup Request RTP Sender Address:Port, device type, codec type, sensor properties Session Setup Response with RTP Sender Map builder/updater direction coordinates address:port and Localization Data Sender Address Port, Session ID Enable/Disable Map Building Coordination

Figure 8D:
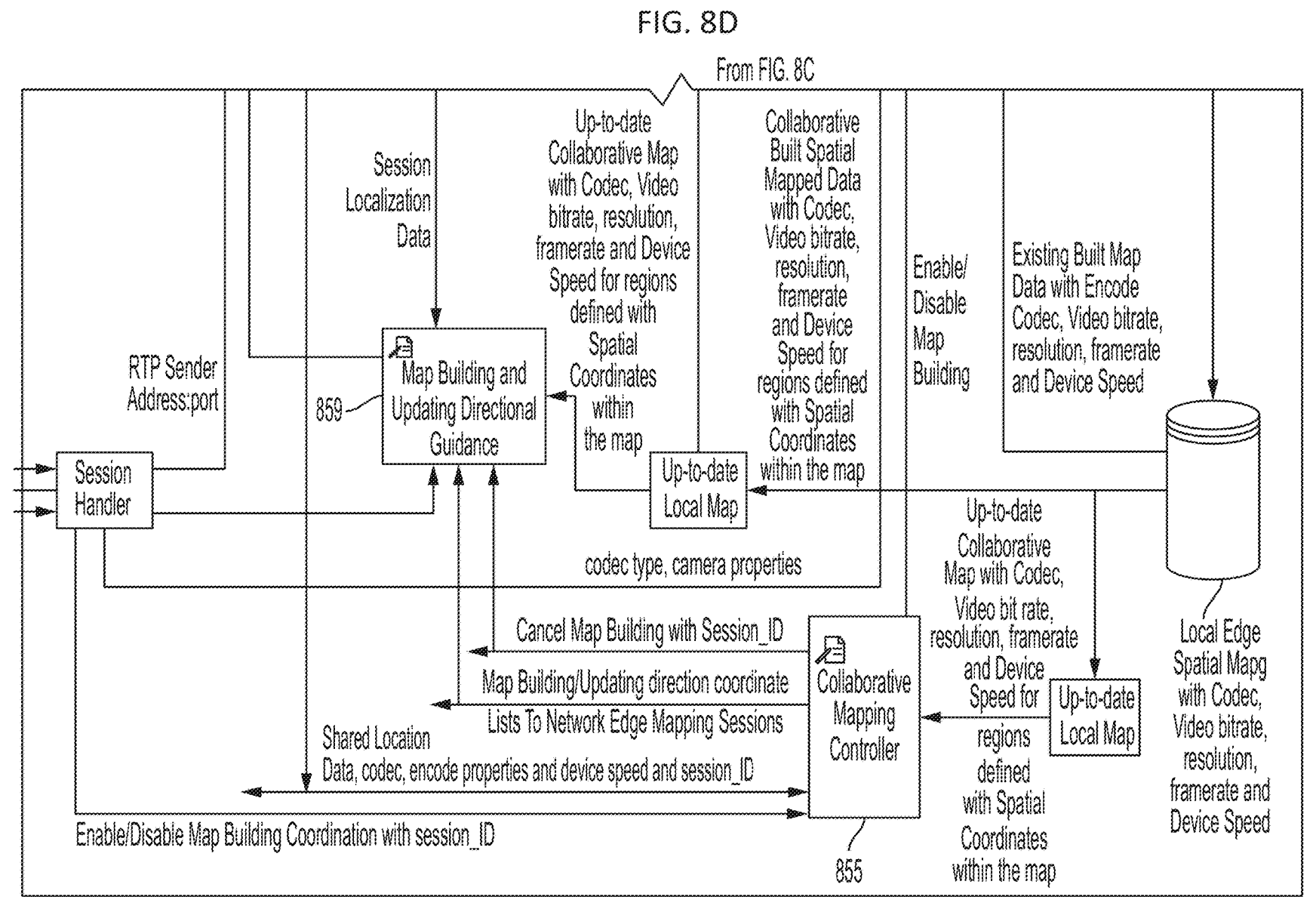

From FIG. 8C

Local Edge Spatial Mapg with Codec, Video bitrate, resolution, framerate and Device Speed Existing Built Map Data with Encode Codec, Video bitrate, resolution, framerate and Device Speed Enable/Disable Map Building Up-to-date Collaborative Map with Codec, Video bit rate, resolution, framerate and Device Speed for regions defined with Spatial Coordinates within the map Up-to-date Local Map Collaborative Mapping Controller

855

Collaborative Built Spatial Mapped Data with Codec, Video bitrate, resolution, framerate and Device Speed for regions defined with Spatial Coordinates within the map Up-to-date Local Map codec type, camera properties Cancel Map Building with Session_ID Map Building/Updating direction coordinate Lists To Network Edge Mapping Sessions Up-to-date Collaborative Map with Codec, Video bitrate, resolution, framerate and Device Speed for regions defined with Spatial Coordinates within the map Session Localization Data Map Building and Updating Directional Guidance

859

Shared Location Data, codec, encode properties and device speed and session_ID

RTP Sender Address:port

Session Handler

Enable/Disable Map Building Coordination with session_ID

Figure 10A:
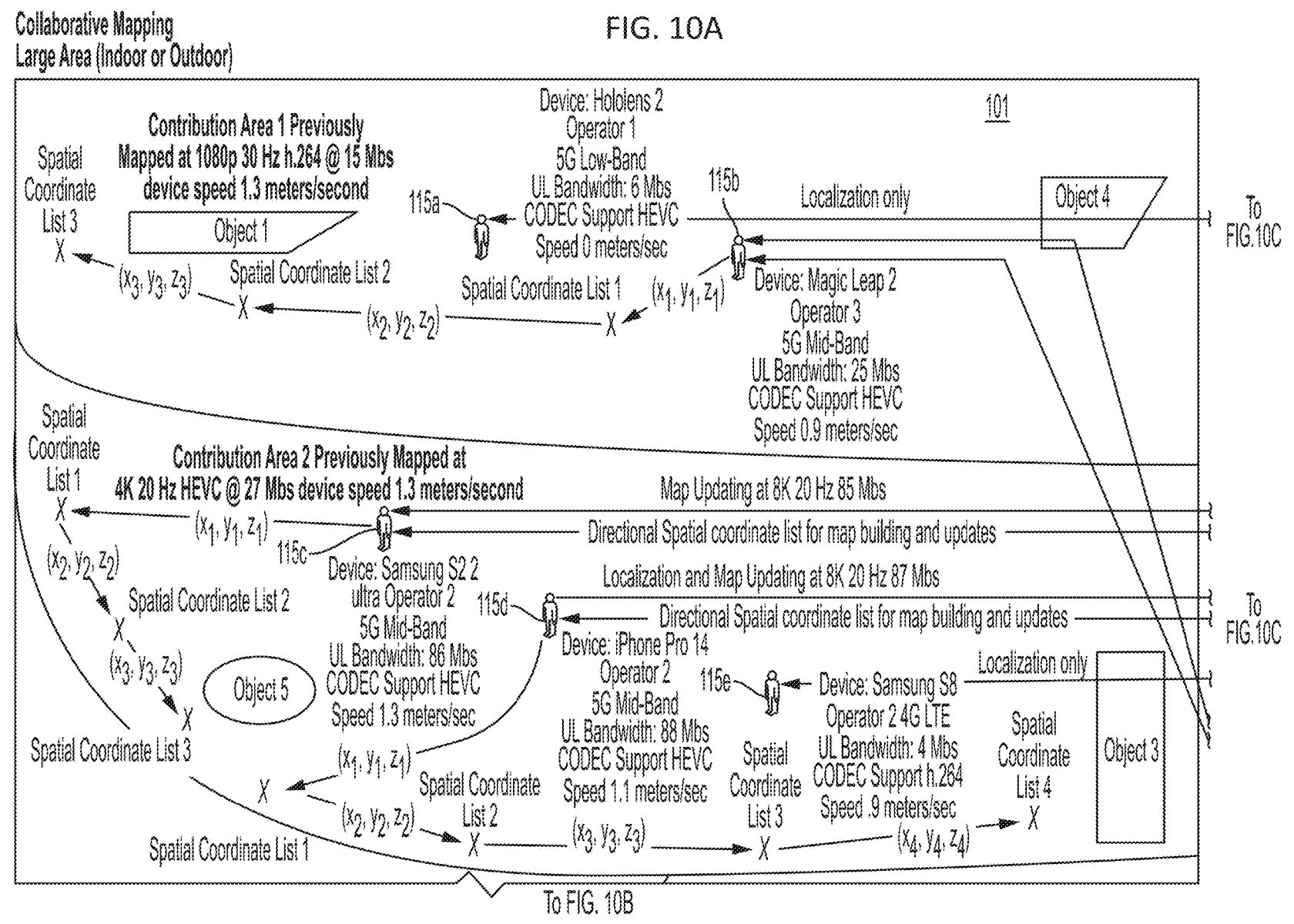

Collaborative Mapping
Large Area (Indoor or Outdoor)

Object 4

Object 3

Localization only

Localization only

Spatial
Coordinate
List 4
X
$(x_4, y_4, z_4)$

Contribution Area 1 Previously
Mapped at 1080p 30 Hz h.264 @ 15 Mbs
device speed 1.3 meters/second Device: Hololens 2
Operator 1
5G Low-Band
UL Bandwidth: 6 Mbs
CODEC Support HEVC
Speed 0 meters/sec 115a Spatial Coordinate List 1    $(x_1, y_1, z_1)$
X
$(x_2, y_2, z_2)$ Device: Magic Leap 2
Operator 3
5G Mid-Band
UL Bandwidth: 25 Mbs
CODEC Support HEVC
Speed 0.9 meters/sec 115b Spatial Coordinate List 2
X
$(x_3, y_3, z_3)$ Spatial
Coordinate
List 3
X
$(x_3, y_3, z_3)$ Object 1

Map Updating at 8K 20 Hz 85 Mbs

Directional Spatial coordinate list for map building and updates

Localization and Map Updating at 8K 20 Hz 87 Mbs

Directional Spatial coordinate list for map building and updates

Device: Samsung S8
Operator 2 4G LTE
UL Bandwidth: 4 Mbs
CODEC Support h.264
Speed .9 meters/sec 115e Contribution Area 2 Previously Mapped at
4K 20 Hz HEVC @ 27 Mbs device speed 1.3 meters/second Device: iPhone Pro 14
Operator 2
5G Mid-Band
UL Bandwidth: 88 Mbs
CODEC Support HEVC
Speed 1.1 meters/sec 115d Spatial
Coordinate
List 1
X
$(x_1, y_1, z_1)$ Device: Samsung S2 2
ultra Operator 2
5G Mid-Band
UL Bandwidth: 86 Mbs
CODEC Support HEVC
Speed 1.3 meters/sec 115c $(x_1, y_1, z_1)$ Spatial
Coordinate
List 2
X
$(x_2, y_2, z_2)$ Spatial Coordinate List 2
X
$(x_3, y_3, z_3)$ Object 5

$(x_2, y_2, z_2)$

Spatial Coordinate List 3
X
$(x_3, y_3, z_3)$ $(x_3, y_3, z_3)$ $(x_2, y_2, z_2)$ Spatial Coordinate List 1

Figure 10C:
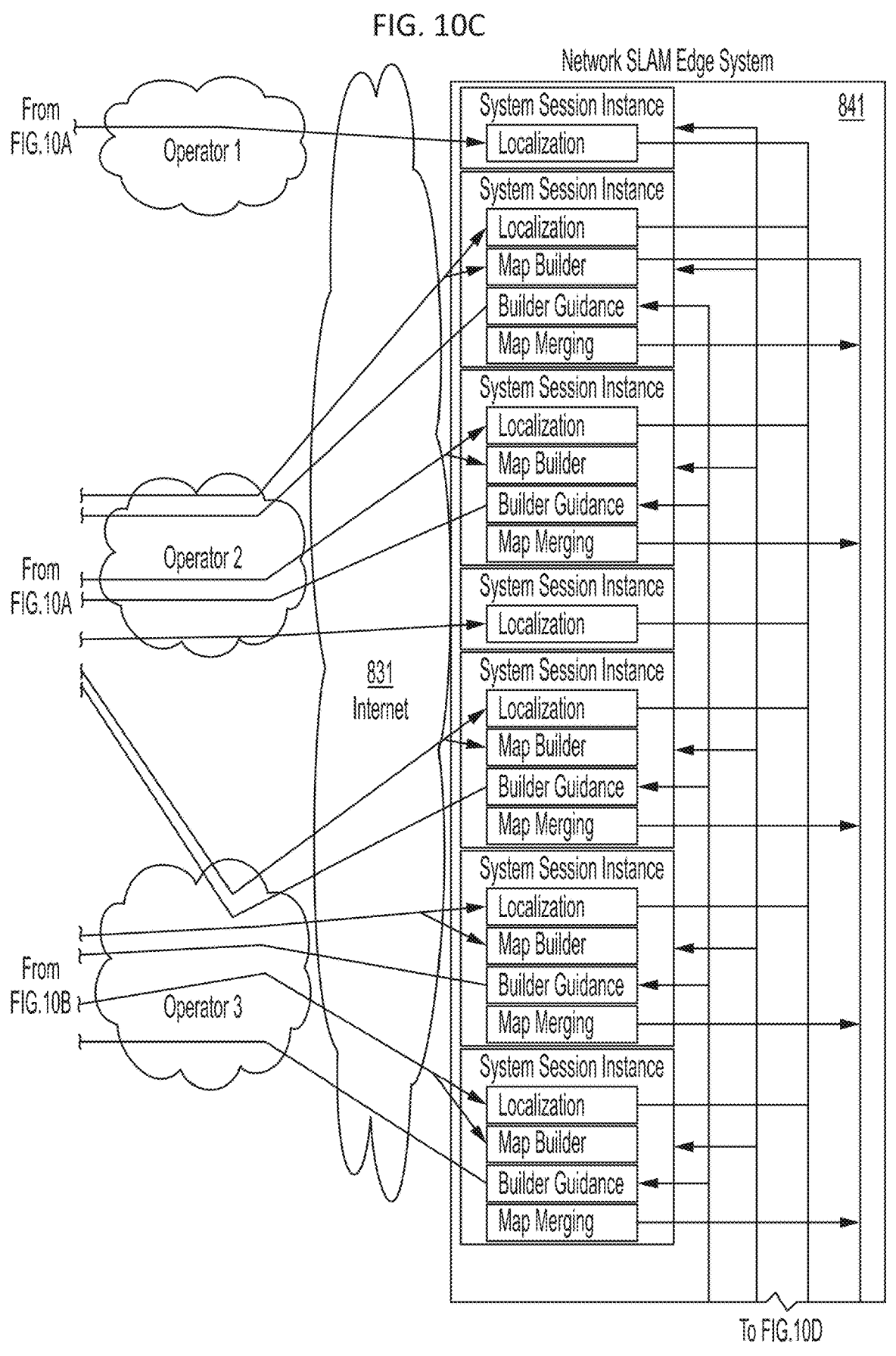

Network SLAM Edge System

841

From FIG.10A

Operator 1

System Session Instance
- Localization

System Session Instance
- Localization
- Map Builder
- Builder Guidance
- Map Merging System Session Instance
- Localization
- Map Builder
- Builder Guidance
- Map Merging From FIG.10A Operator 2

System Session Instance
- Localization

831
Internet

System Session Instance
- Localization
- Map Builder
- Builder Guidance
- Map Merging System Session Instance
- Localization
- Map Builder
- Builder Guidance
- Map Merging From FIG.10B Operator 3

System Session Instance
- Localization
- Map Builder
- Builder Guidance
- Map Merging To FIG.10D

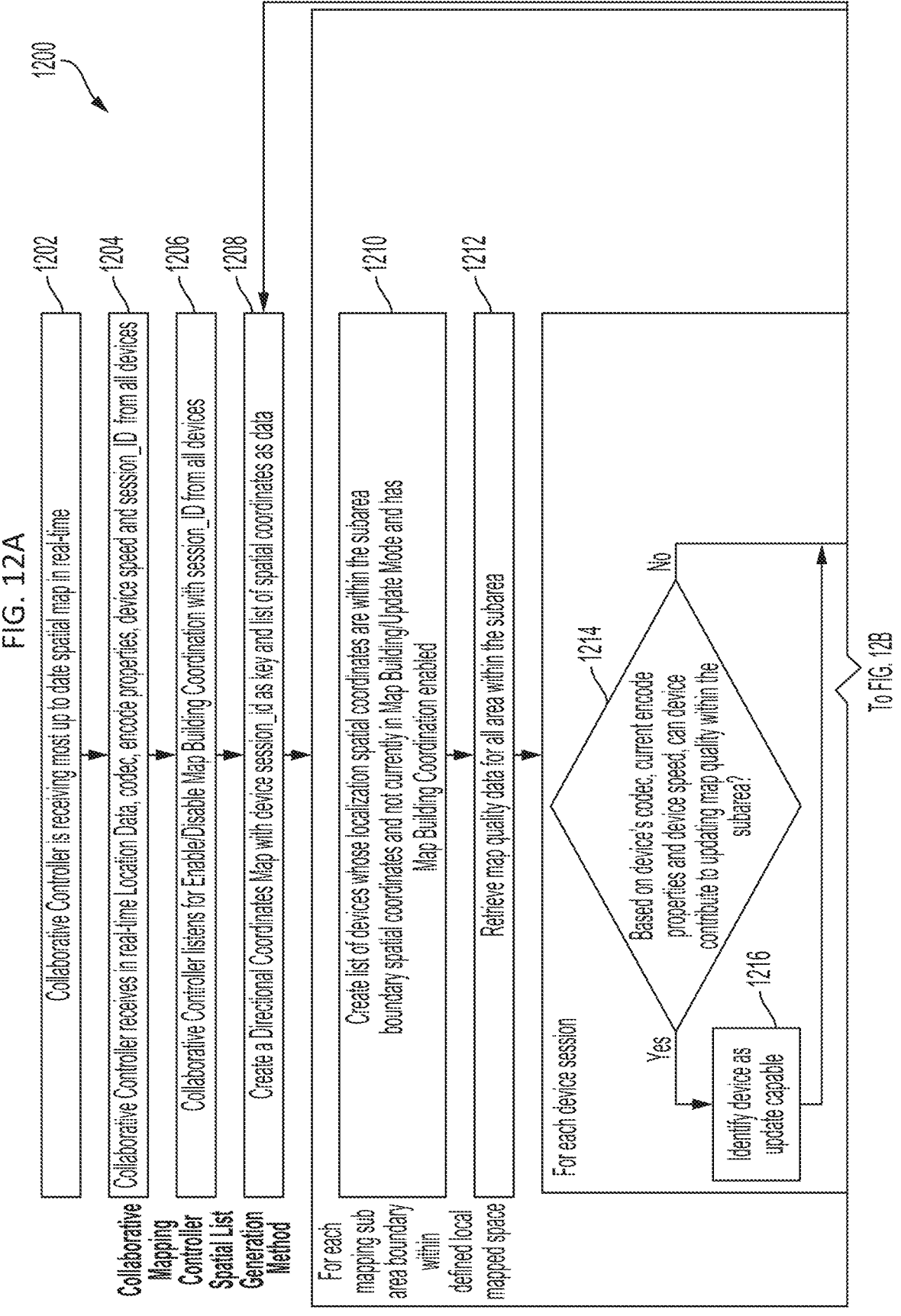

1200

1202 — Collaborative Controller is receiving most up to date spatial map in real-time 1204 — Collaborative Controller receives in real-time Location Data, codec, encode properties, device speed and session_ID from all devices 1206 — Collaborative Controller listens for Enable/Disable Map Building Coordination with session_ID from all devices 1208 — Create a Directional Coordinates Map with device session_id as key and list of spatial coordinates as data Collaborative Mapping Controller Spatial List Generation Method For each mapping sub area boundary within defined local mapped space 1210 — Create list of devices whose localization spatial coordinates are within the subarea boundary spatial coordinates and not currently in Map Building/Update Mode and has Map Building Coordination enabled 1212 — Retrieve map quality data for all area within the subarea For each device session 1214 — Based on device's codec, current encode properties and device speed, can device contribute to updating map quality within the subarea?

Yes → 1216 — Identify device as update capable

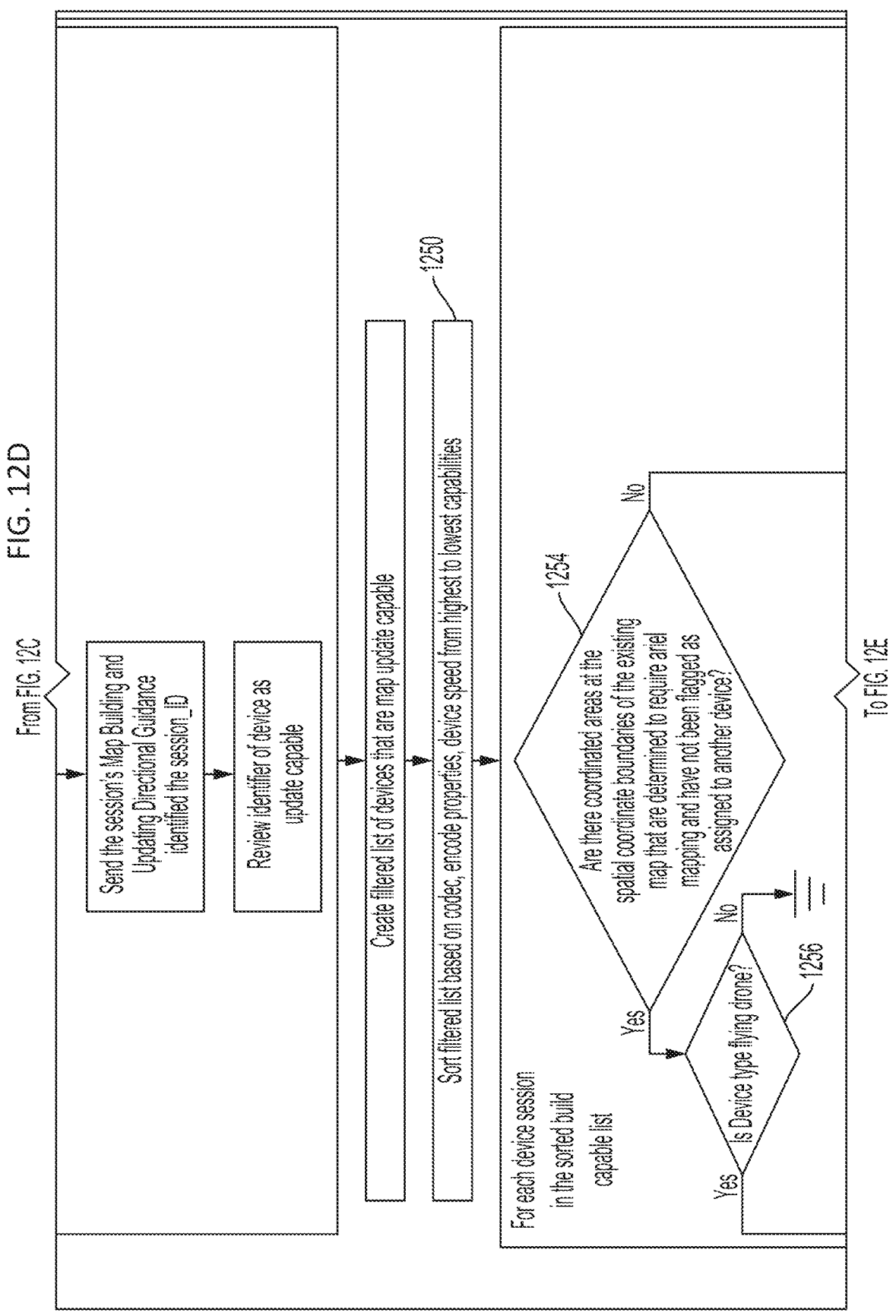

From FIG. 12C

Send the session's Map Building and Updating Directional Guidance identified the session_ID Review identifier of device as update capable Create filtered list of devices that are map update capable Sort filtered list based on codec, encode properties, device speed from highest to lowest capabilities

1250

For each device session in the sorted build capable list

1254

Are there coordinated areas at the spatial coordinate boundaries of the existing map that are determined to require ariel mapping and have not been flagged as assigned to another device?

Yes

No

Is Device type flying drone?

1256

Yes

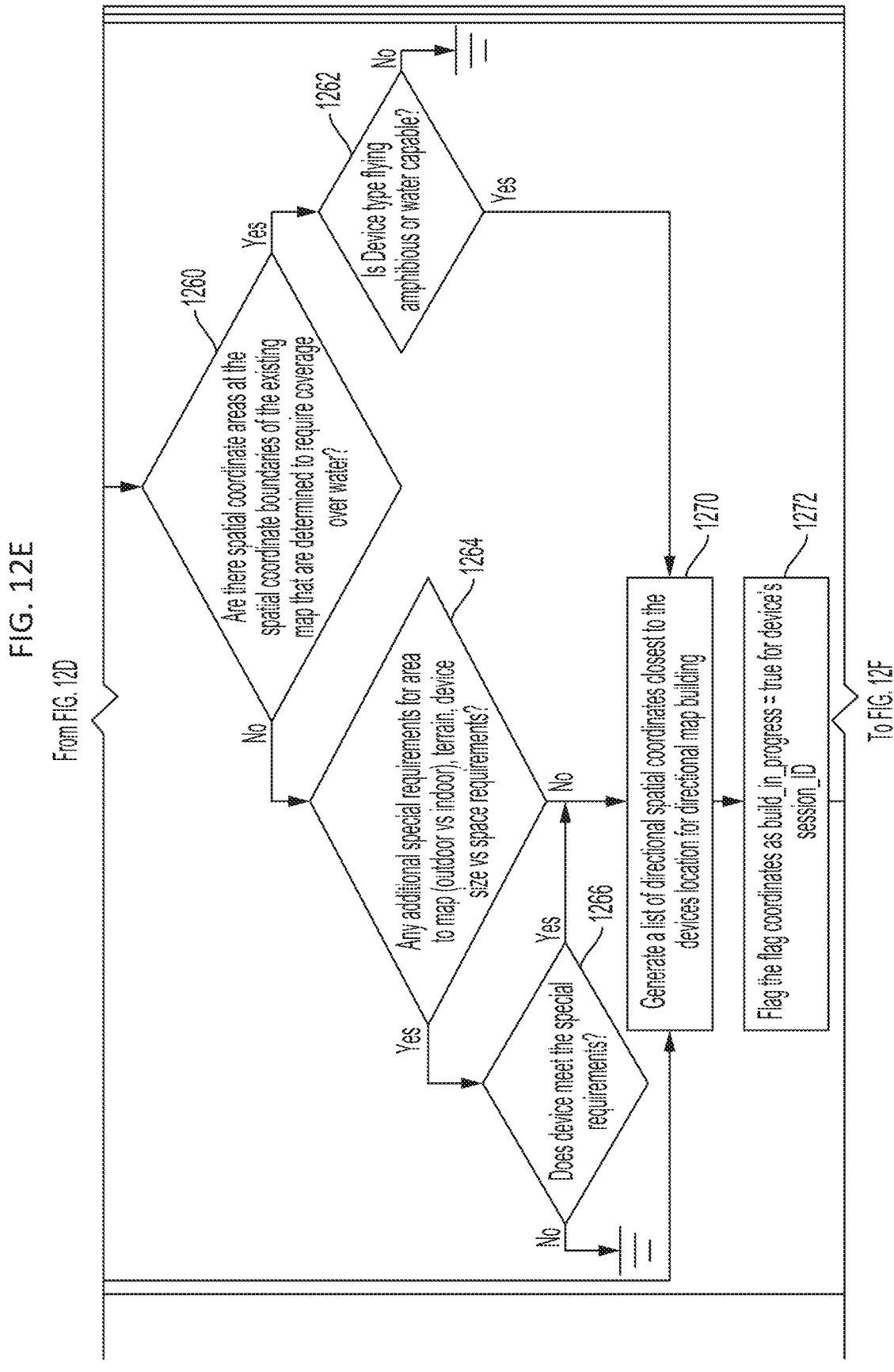

From FIG. 12D

1260 — Are there spatial coordinate areas at the spatial coordinate boundaries of the existing map that are determined to require coverage over water?

1262 — Is Device type flying amphibious or water capable?

1264 — Any additional special requirements for area to map (outdoor vs indoor), terrain, device size vs space requirements?

1266 — Does device meet the special requirements?

1270 — Generate a list of directional spatial coordinates closest to the devices location for directional map building 1272 — Flag the flag coordinates as build_in_progress = true for device's session_ID To FIG. 12F

FIG. 12F

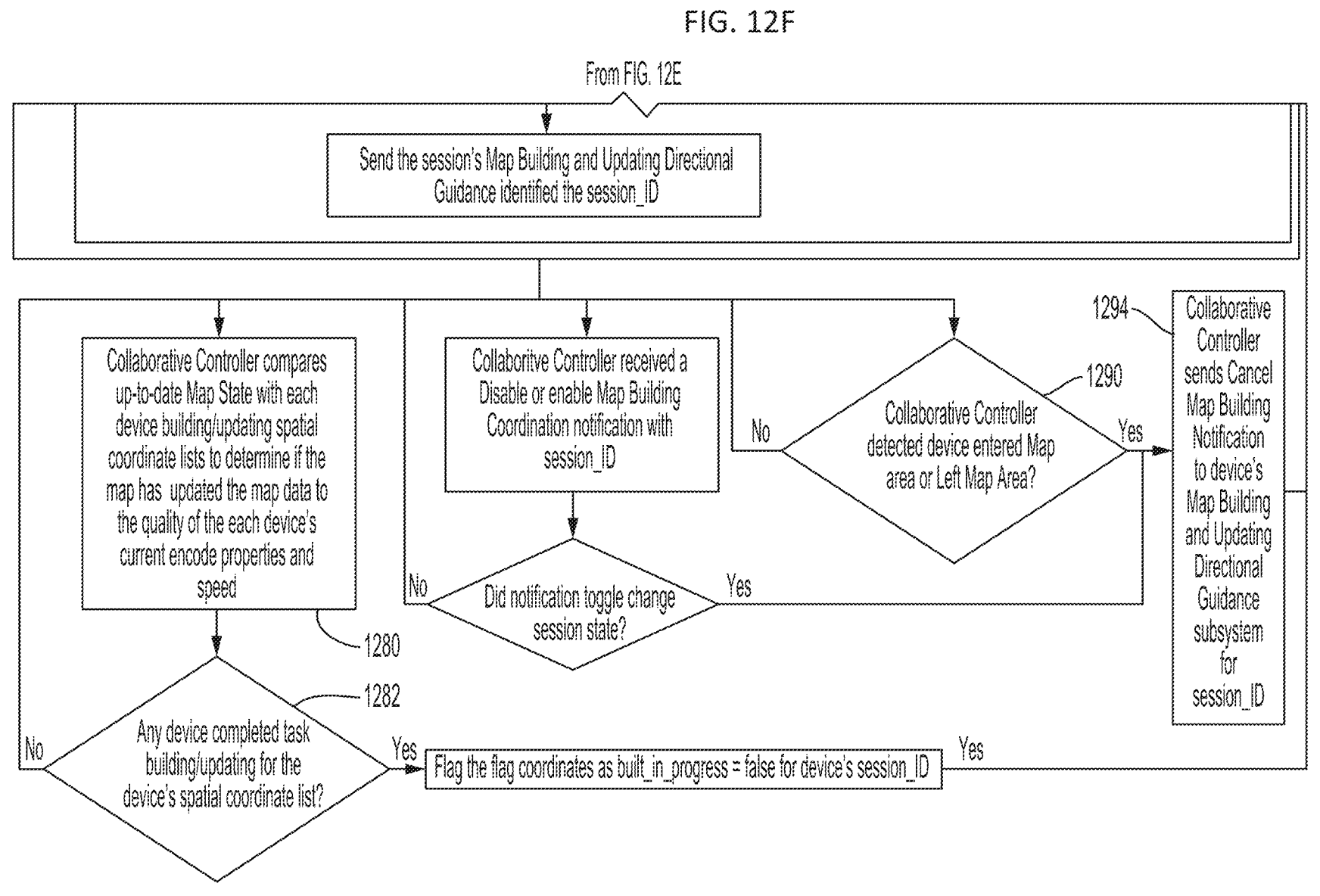

From FIG. 12E

Send the session's Map Building and Updating Directional Guidance identified the session_ID Collaborative Controller compares up-to-date Map State with each device building/updating spatial coordinate lists to determine if the map has updated the map data to the quality of the each device's current encode properties and speed

1280

1282

Any device completed task building/updating for the device's spatial coordinate list?

No

Yes → Flag the flag coordinates as built_in_progress = false for device's session_ID Yes → Collaborative Controller detected device entered Map area or Left Map Area?

Collaborative Controller received a Disable or enable Map Building Coordination notification with session_ID Did notification toggle change session state?

No

Yes

1294

1290

No

Yes → Collaborative Controller sends Cancel Map Building Notification to device's Map Building and Updating Directional Guidance subsystem for session_ID

FIG. 14B

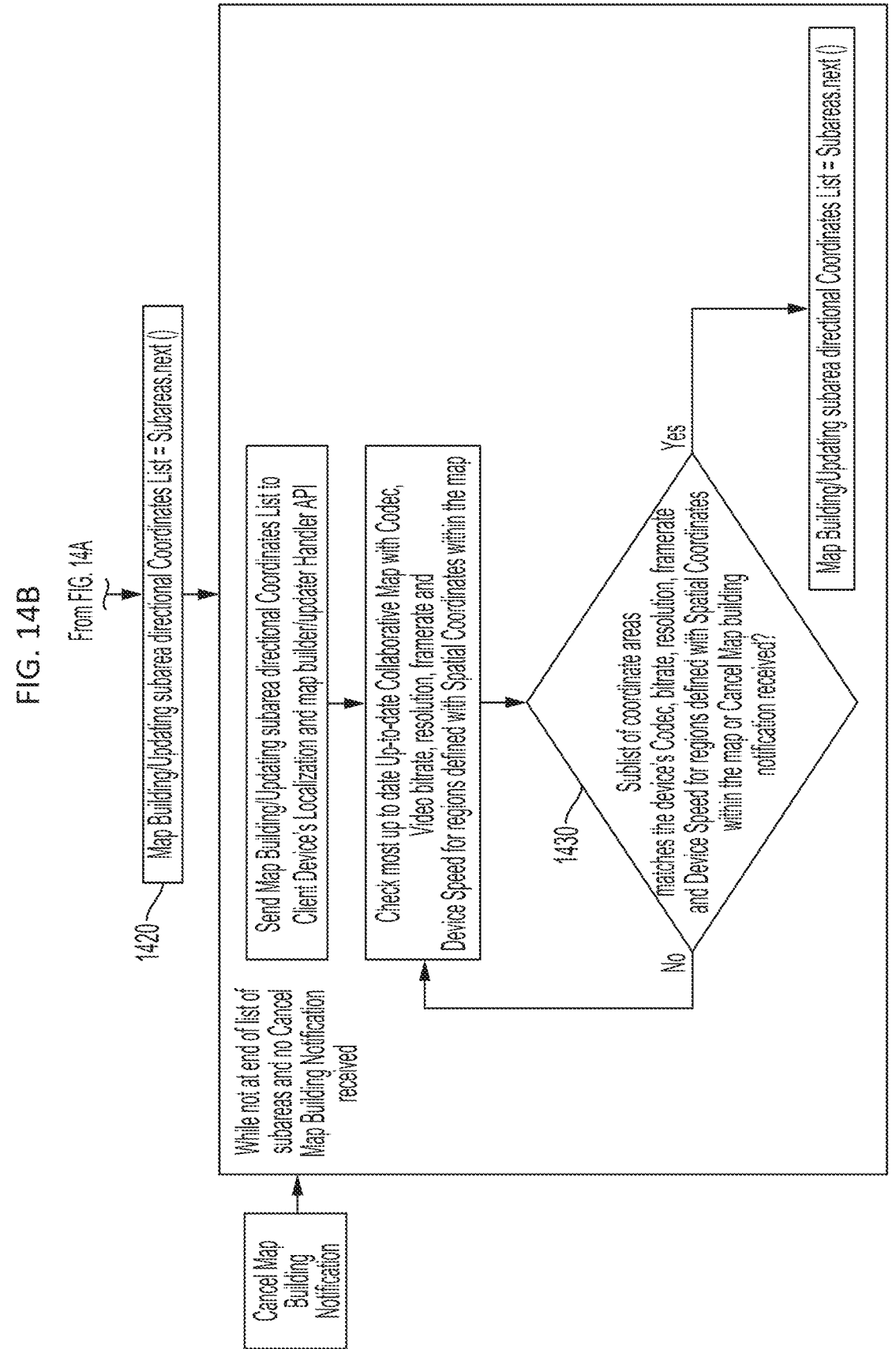

From FIG. 14A

1420 — Map Building/Updating subarea directional Coordinates List = Subareas.next ()

While not at end of list of subareas and no Cancel Map Building Notification received Send Map Building/Updating subarea directional Coordinates List to Client Device's Localization and map builder/updater Handler API Check most up to date Up-to-date Collaborative Map with Codec, Video bitrate, resolution, framerate and Device Speed for regions defined with Spatial Coordinates within the map 1430 — Sublist of coordinate areas matches the device's Codec, bitrate, resolution, framerate and Device Speed for regions defined with Spatial Coordinates within the map or Cancel Map building notification received?

No

Yes — Map Building/Updating subarea directional Coordinates List = Subareas.next ()

Cancel Map Building Notification

FIG. 15

| Speed m/sec | Frames Per Second (Hz) |
|---|---|
| 0.4-2.19 | 10 |
| 2.2-3.49 | 20 |
| 3.5-4.49 | 25 |
| 4.5-11.19 | 30 |
| 11.2-28.99 | 50 |
| 29-44.69 | 60 |
| 29-62.99 | 90 |
| 63-89.39 | 120 |
| 89.4> | 240 |

FIG. 16

| Resolution | Frame Rate | h.264 Bitrate Mbs | HEVC Bitrate Mbs | VVC Bitrate Mbs |
|---|---|---|---|---|
| 8K | 240 Hz | | 280+ | 150+ |
| 8K | 120 Hz | | 230-279.9 | 115-149.9 |
| 8K | 90 Hz | | 180-229.9 | 90-114.9 |
| 8K | 60 HZ | | 145-179.9 | 72.5-89.9 |
| 8K | 50 HZ | | 130-144.9 | 67-72.4 |
| 8K | 30 Hz | | 115-129.9 | 57.5-66.9 |
| 8K | 25 Hz | | 100-114.9 | 55.5-57.4 |
| 8K | 20 Hz | | 85-99.9 | 51-55.4 |
| 4K | 240 Hz | 320+ | 160+ | 80+ |
| 4K | 120 Hz | 240-319.9 | 120-159.9 | 63-79.9 |
| 4K | 90 Hz | 210-239.9 | 105-199.9 | 55-62.9 |
| 4K | 60 HZ | 110-209.9 | 55-104.9 | 27-54.9 |
| 4K | 50 HZ | 98-109.9 | 49-54.9 | 25-26.9 |
| 4K | 30 Hz | 84-97.9 | 42-48.9 | 21-24.9 |
| 4K | 25 Hz | 78-83.9 | 39-41.9 | 20.5-20.9 |
| 4K | 20 Hz | 70-77.9 | 35-38.9 | 17.4-20.4 |
| 1080p | 240 Hz | 60+ | 33+ | 18+ |
| 1080p | 120 Hz | 50-59.9 | 26-32.9 | 14-17.9 |
| 1080p | 90 Hz | 47-49.9 | 20-25.9 | 11.5-13.9 |
| 1080p | 60 HZ | 30-46.99 | 17-19.9 | 9-11.4 |
| 1080p | 50 HZ | 24-29.9 | 13-16.9 | 6.8-8.9 |
| 1080p | 30 Hz | 13-23.99 | 8-12.9 | 4.4-6.7 |
| 1080p | 25 Hz | 9-12.99 | 6.9-7.9 | 3.78-4.3 |
| 1080p | 20 Hz | 7-8.99 | 5.7-6.8 | 3.1-3.77 |
| 720p | 240 Hz | 37+ | 20+ | 13+ |
| 720p | 120 Hz | 25-36.9 | 14-19.9 | 7.8-12.9 |
| 720p | 90 Hz | 18-24.9 | 10-13.9 | 6.5-7.8 |
| 720p | 60 HZ | 12-17.9 | 7-9.9 | 4.2-6.4 |
| 720p | 50 HZ | 9.5-11.9 | 6-6.9 | 3.6-4.1 |
| 720p | 30 Hz | 7-9.4 | 4-5.9 | 2.4-3.5 |
| 720p | 25 Hz | 4-6.99 | 3.3-3.9 | 2.8 |
| 720p | 20 Hz | 3-3.99 | 2.6-3.2 | 1.8-2.7 |
| 480p | 240 Hz | 24.5+ | 14+ | 8.8+ |
| 480p | 120 Hz | 19-24.4 | 11-13.9 | 7-8.7 |
| 480p | 90 Hz | 14.5-18.9 | 8-12.9 | 5-6.9 |
| 480p | 60 HZ | 7-14.4 | 5-7.9 | 3.8-4.9 |
| 480p | 50 HZ | 5.4-6.9 | 4.4-4.9 | 2.9-3.7 |
| 480p | 30 Hz | 4.5-5.39 | 3.9-4.3 | 2.1-2.8 |
| 480p | 25 Hz | 4-4.4 | 3.5-3.8 | 1.8-2.0 |
| 480p | 20 Hz | 2.8-3.9 | 2.9-3.4 | 1.4-1.7 |

Figure 17:
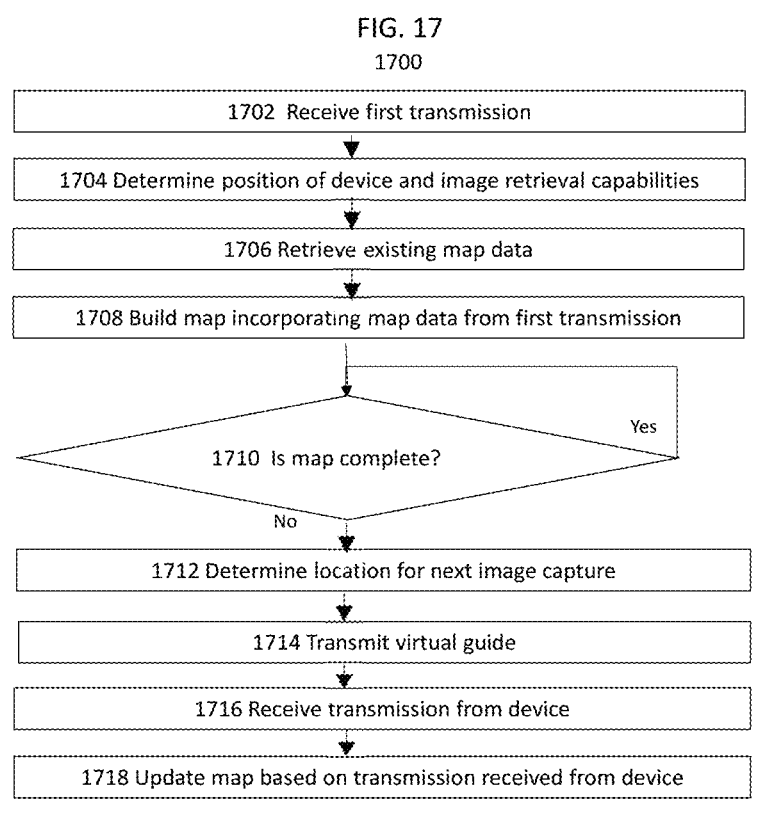

| 1702 Receive first transmission |

| 1704 Determine position of device and image retrieval capabilities |

| 1706 Retrieve existing map data |

| 1708 Build map incorporating map data from first transmission |

1710 Is map complete?     Yes

No

| 1712 Determine location for next image capture |

| 1714 Transmit virtual guide |

| 1716 Receive transmission from device |

| 1718 Update map based on transmission received from device |

FIG. 18

GUIDANCE FOR COLLABORATIVE MAP BUILDING AND UPDATING

BACKGROUND

The present disclosure relates to guiding devices to build a map collaboratively and, in particular, to updating a map by transmitting information to guide devices to positions where additional map data is determined to be necessary.

Various types of devices, including those used for extended reality (XR), including mixed reality (MR), augmented reality (AR), and virtual reality (VR) applications, and for various autonomous devices, including industrial robots, autonomous household devices, drones, self-driving vehicles, etc., rely on digital maps to navigate their environments and/or to inform or guide their users. Some devices use Simultaneous Localization and Mapping (SLAM) technology to create or to update a map and to localize themselves in the map. SLAM technology allows a device, such VR, AR, MR, or other XR device (VR, AR, and MR devices hereinafter sometimes referred to as an XR device), including equipment such as glasses, a head mounted devices (HMD) or other type of wearable device, as well as autonomous automobiles and other vehicles, industrial and residential robots, autonomous vacuum cleaners, autonomous lawn mowers and other household devices, drones, etc., to create a map of its surroundings, to locate itself on the map and to assist in autonomous and/or user-assisted navigation based on the map in real time. A challenge of SLAM technology is to construct a map of an unknown environment while simultaneously localizing or keeping track of the location of the device that is supplying the information for building the map. A map of an area may be generated based on sensor data captured by sensors onboard the SLAM-enabled device, and the location of the SLAM-enabled device on the map may be determined based on data generated by the device. One or more sensors may be positioned in, on, or at the SLAM-enabled device, or may be positioned elsewhere and capture a field of view of the SLAM-enabled device. For example, one or more stationary cameras on, at or in the vicinity of the SLAM-enabled device may provide image data, in addition to or instead of, cameras onboard the SLAM-enabled device. A SLAM-enabled device may be equipped with IMU (inertial measurement unit). IMU data may be used for location/orientation/movement determination.

Map data so generated by devices may remain fragmentary, consisting of partially low resolution mapped areas, or otherwise incomplete. Further, a device often remaps an area that was already mapped. This may result in inefficient use of camera, processing and memory resources. Also, a device may generate low resolution map data of an area that is barely sufficient for its needs but does not support full functionality for the device.

SUMMARY

In one approach, devices build maps on their own. Even the latest radio transmitters and portable processor have constraints on the amount of map data they are able to obtain, process and store. Also, when a device is far away from any surrounding objects, much lower image quality may be obtained for building an accurate map of an area. A faster moving device, such as a flying drone, may obtain sufficient data for an initial rough map of an area, and may do so ahead of other devices gathering map data. However, a flying drone may capture fewer frames of an object that it flies over, yielding less data for a map.

In an embodiment according to an aspect of the disclosure, a central processor generates a map of a region based on data received from one or more devices in the region. The map at this point may be sufficient for aiding devices in navigating the region, or in navigating parts of the region, or in guiding users of the devices in or through the region or parts of the region. If the central processor determines that the map of the region is incomplete or could otherwise be improved, for example, that the map includes only low-resolution image data for a target area, or only image data from a high or otherwise limited vantage point, then the central processor may transmit a request to one or more target devices detected in or near the region to move toward the target area and to obtain map data. The request may specify the image resolution, framerate, bitrate or other data quality metrics necessary for generating improved mapping of the target area. The central processor may select a first target device for the job based on a determination that the first target device has a superior camera (e.g., higher resolution, higher framerate, improved codec) or is able to reach higher or to reach lower with its camera than a second target device also detected in or near the region. Using the data captured by the first target device, the central processor may update the portion of the first map corresponding to the target area.

In one approach, devices use GPS to navigate. However, GPS is not necessarily sufficiently accurate outdoors when precision within a few inches is required to move about safely. Some consumer appliances, such as robot vacuum cleaners and floor mops, robots such as the Amazon Astro, operate indoors, where GPS data is often unavailable or not sufficiently specific. In large indoor industrial applications, fast moving industrial robots often require finer granularity positioning for safe operation.

In an embodiment, the central processor may be a network edge service, such as a SLAM-network edge device, that communicates with SLAM-enabled device in, near or over the region and builds the map of the region, determines map quality, detects candidate devices for updating or improving the map, selects one or more target devices among the detected candidate device, requests the one or more target devices to proceed toward or into or over the target area, receives a map data transmission from the one or more target devices, updates the map accordingly, and provides map data to devices. Or, the central processor may be one or more devices in or near the region that are themselves navigating through the region.

According to an embodiment, image data quality parameters, for example, bandwidth, codec, resolution, and framerate of the camera that capture image data, may be stored by the processor building a map for the SLAM-enabled devices when the map is initially built. The image data quality parameters may describe the capacity limits of the device and/or may describe the parameters prevailing when the device captured transmitted the image data. Improved or upgraded map data may replace or may be merged into the existing map and the image quality parameters, for example, resolution, framerate, bandwidth and/or codec may be saved in association with the data obtained from a device used for portions or aspects of the map. The central processor may determine that an update is called for based on the image quality parameters saved in connection with the portions or aspects of the map. As the system determines that a contributing device's image data can contribute to updating the map to improve map quality, the system may request the highest quality image data the client device can deliver based on the client device's camera or other sensor capabilities, encoding capabilities and available uplink bandwidth. If the central processor in the future detects the same device in the genera region it may determine whether or not to request the same device to transmit map data based on the data quality that the device provided in the past. For example, if it is determined that the device provides high quality image data, then central processor may task the device with capturing image data for the map if the device is detected in the region.

In the case of multiple devices collaborating in the same area, the device offering the highest quality of image data may be selected to contribute to either the initial map building or map updating. If there are multiple devices in the same space, the device(s) offering the highest quality may contribute to building or updating the map. In a distributed SLAM system, improved localization accuracy for SLAM-enabled devices in the region described by a map may be achieved.

With the improved, more detailed, higher quality data-based maps generated through repeated iterations greater detail/resolution with regard to feature points of nearby objects, distances of nearby objects to the SLAM-enabled device may be estimated more precisely or with a greater degree of confidence. This greater precision of the location of nearby objects with respect to the SLAM-enabled device, or greater degree of certainty with regard to the location of such nearby objects, may make it possible to run devices more safely and at faster speeds.

When higher quality image data becomes available, the map may be upgraded to a higher accuracy map, for example, with improved estimation of distances between objects afforded by higher resolution image data or by a higher frame capture rate or by improved uplink network conditions affording increased data throughput. It may also result in increased accuracy for device localization and tracking, decreased power usage, and reduced redundancy/duplication of map generation by more than one device.

For example, after identifying the device as being in the device region, one or more second data parameters may be requested from the device. The second data parameters, e.g., image data, may be received from a second device different from the first device, or from the same one.

This generating of the map and the updating of the map may be performed by a SLAM-enabled device. The second image data may be used to replace or modify the first image data used to generate or update the map data.

Described are a method, system, device, non-transitory computer readable, and means for implementing the method for collaborative map building. The method may include: receiving a first transmission from a first device, the first transmission indicating a location of the first device and containing first image data for a first region. Using the first image data, control circuitry could then generate a map of the first region and determine that a portion of the map of the first region corresponding to a target area is incomplete; in response to the determining that the map of the first region corresponding to the target area is incomplete, a request may be transmitted to a second device to move toward the target area. A second transmission may be received from the second device, the second transmission indicating a location of the second device and containing second image data of the target area. According to the second image data, the map of the first region may then be updated.

Such a method may also entail receiving a third transmission from a third device, the third transmission indicating a location of the third device. It may be determined that an image data retrieval capability of the second device exceeds the image data retrieval capability of the third device. For example, the transmitting of the request to the second device to move toward the target area may be performed in response to the determining that the image data retrieval capability of the second device exceeds the image data retrieval capability of the third device. By way of illustration, the determining that the image data retrieval capability of the second device exceeds the image data retrieval capability of the third device may include determining that the second device retrieves image data in flight, and/or determining that the second device comprises an image sensor configured to provide a higher image resolution or a higher frame rate than provided by the third device, or that the second device is configured to provide a higher bit transmission rate than provided by the third device, and/or determining that an image sensor of the second device is positioned lower to the ground than is an image sensor of the third device.

A central processor may store in relation to the second image data one or more of an image resolution provided by the image sensor of the second device, a frame rate provided by the image sensor of the second device, or the bit transmission rate provided by the second device. The central processor may determine, prior to the transmitting of the request to the second device to move toward the target area, that the indicated location of the third device is closer to the target area than is a location of the second device.

The second device may be a SLAM-enabled device, and the second transmission indicating the location of the second device may include inertial measurement data obtained by the second device. The control circuitry may be part of a SLAM network edge service.

In an embodiment, the second device and the first device may be the very same device. The second device may be a wearable device, for example, an extended reality or an augmented reality or mixed reality device. While sometimes described in the singular as a second device, several devices working in concert, for example, an HMD and one or more handheld devices linked thereto, may also be thought of as a second device.

Also described is a virtual image embodiment in which one or more users may simultaneously collaborate to generate or to update a map. A SLAM network edge may generate for display by a client device a virtual object to guide collaborative mapping of a target area. For example, as part of a game, several users may compete in finding and reaching virtual object that are positioned in or near a target area. The SLAM network edge service may generate the virtual objects to be seen by the client devices and position them strategically so that as the device moves through the target area, mapping data is captured by the device. If improvements to the map data are called for, then the SLAM network edge may position virtual objects as needed for capturing of the improved map data. In an embodiment, the roaming devices do not inform their users that the aim of the game or of the virtual object is to collect images or to generate map data. In an embodiment, the roaming devices do inform users of this intent, and also guide users in capturing the image data needed in the target area as part of the game or story involving the virtual images. According to an embodiment, different virtual objects may be selected and displayed for different client devices based on different games or applications being used, and/or particular progress in a game or application. Such different virtual objects may be simultaneously or sequentially displayed for different client devices depending on the game/application. By way of example, in a game for children, the system may generate virtual objects to be seen at lower physical spaces, for example, under tables, while placing virtual objects higher, such as near ceiling lights, for adults or taller players. Also, each device may enable a wearer/user to see all, some or none of the virtual objects at any given time depending on the game/application. For example, there may be levels of a game, such that during a first level, such as beginner level or a first round, a first set of virtual objects are seen positioned in a first region, and then other and/or additional virtual objects are made visible in subsequent rounds. In such further rounds, the first set of virtual objects may still be seen, may be removed entirely, or may be removed selectively, depending on the status of the VR device in the game or depending on the height and/or age and/or other status of the wearer of the VR device. Also, the system may cease display of a virtual object, or may display the virtual object less frequently or less prominently, if it determines that the map is complete for the target area. Or, the system may cease display of a virtual object in a one or more VR devices, or may be display the virtual object less frequently or less prominently, for the one or more VR devices, if it determines that it no longer needs map data from the one or more VR devices to complete the map, or to improve the map, for the target area.

Also described as a virtual image embodiment is a system that generates or selects virtual images seen on a device at selected locations to guide or incentivize users to explore or to traverse a target area. Such a method may include: receiving a first transmission from a device, the first transmission indicating a first location of the device and containing image data of a first region and determining, by control circuitry, that a map of a target area of the first region is incomplete. Such a map can be generated based on the first image data received in the first transmission A guide location in the first region is selected. From the guide location, image data of the target area is capturable by the image sensor of the device, and a virtual guide image is transmitted to the device at the second location, wherein the virtual guide image appears to the second device to be at the third location. A target area data transmission is received from the device, the target area data transmission containing target area image data of the target area captured at the guide location by the image sensor of the device, and the map of the target may then be updated based on the target area image data.

The control circuitry may be implemented in a SLAM network edge service. The image sensor of the device may gather LIDAR image data, and the device may be an extended reality, mixed reality or an augmented reality wearable device. For example, the virtual guide image may appear to the device to be at the guide location at a physical light source. The guide location may be inside or outside the target area. For example, the virtual guide image may be arranged to guide toward the target area.

In such a method, the first image data may be sufficient to generate a low-resolution mesh of the target area, and the target image data may be sufficient to generate a high-resolution scan mesh of the target area. The method may also entail receiving a transmission from a second device comprising an image sensor, the transmission indicating a location of the second device in the first region. For example, the transmitting of the virtual image to the device may be performed in response to determining that the device is closer to the target area than is the second location.

Other aspects and features of the present disclosure will become apparent to those ordinarily skilled in the art upon review of the following description of specific embodiments in conjunction with the accompanying figures.

BRIEF DESCRIPTION OF THE DRAWINGS

The present disclosure, in accordance with one or more various embodiments, is described in detail with reference to the following Figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 8B illustrates communication via the data network between the SLAM device and the distributed SLAM network edge service, according to an aspect of the disclosure;

FIGS. 8C-8D illustrate an example of a SLAM network edge service that may perform localization, according to an aspect of the disclosure;

FIGS. 10A-D illustrate an example of a SLAM network edge service in communication via a network with devices being guided to move through target areas, according to an aspect of the disclosure;

FIGS. 12A-12F illustrates an example of a method for controlling the map building as the SLAM network edge service orchestrates map updating by one or more SLAM devices in the first region 101, according to an aspect of the disclosure;

FIGS. 14A-14B shows an example of a process the SLAM network edge service for orchestrating map data capturing by devices shown in FIGS. 10A-D, according to an aspect of the disclosure;

FIG. 15 is a table showing examples of optimal minimum framerates needed for device speed rates, according to an aspect of the disclosure;

FIG. 16 shows examples of encoding bitrates, resolutions, framerates and codecs for optimal map building, according to an aspect of the disclosure;

FIG. 17 shows an example of a process for the virtual image or guide object embodiment, according to the aspect of the disclosure;

FIG. 18 conceptually illustrates components of the system, including the SLAM network edge service and the local device, and the remote device that may interact with it, according to an aspect of the disclosure;

DETAILED DESCRIPTION

Figure 1:
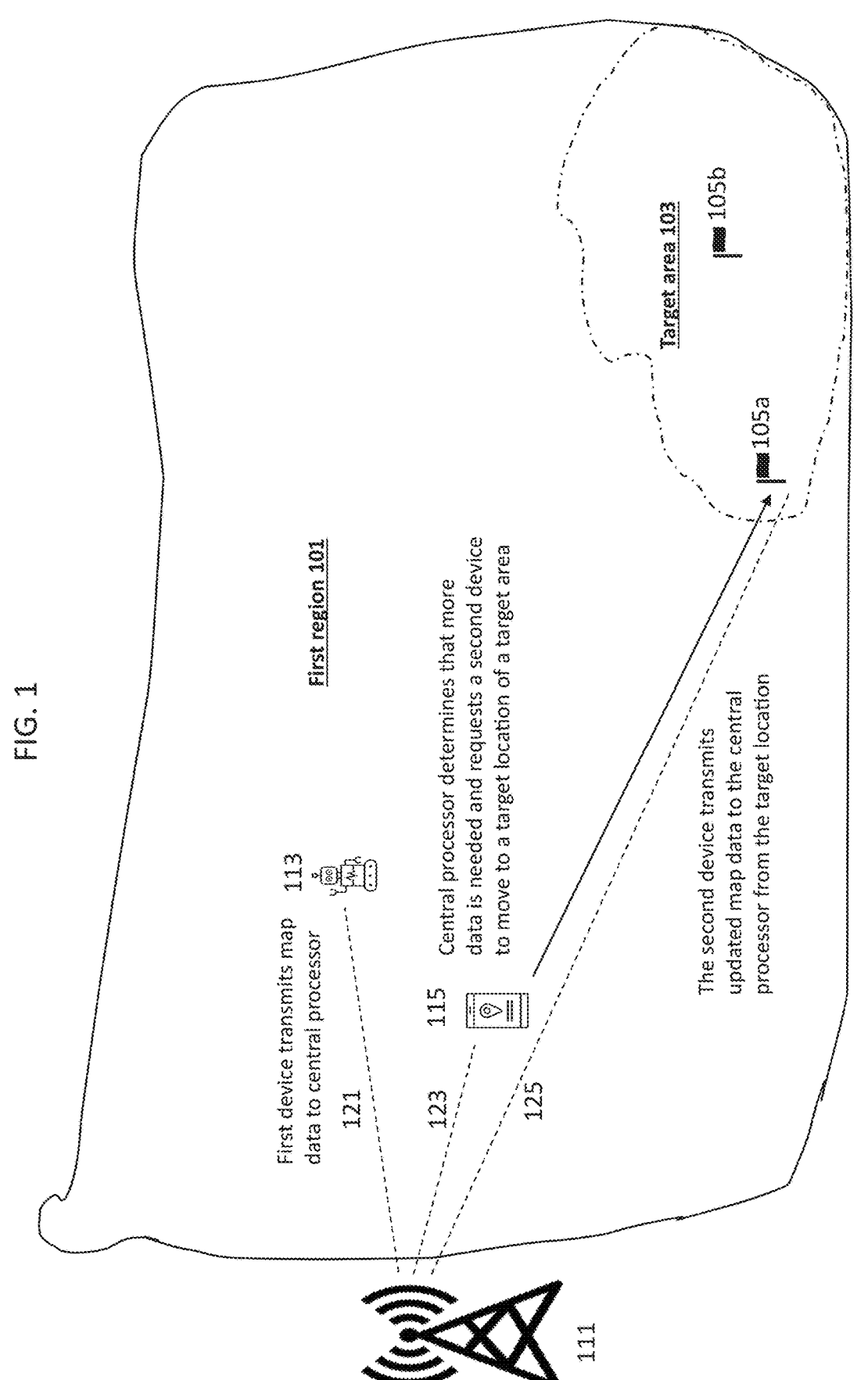
FIG. 1 illustrates an example of collaborate mapping of a target area by a central processor, according to an aspect of the present disclosure.

It will be appreciated that for simplicity and clarity of illustration, where considered appropriate, reference numerals may be repeated among the figures. to indicate corresponding or analogous elements. In addition, numerous specific details are set forth in order to provide a thorough understanding of the embodiments described herein. However, it will be understood that the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

FIG. 1 illustrates guided collaborative mapping facilitated by a central processor 111 that builds a map and updates it based on map data, for example, camera data, captured by devices in a first region 101. The central processor 111 may be a network edge device implemented as part of a cellular network tower, or a network edge device in wired or wireless communication with one or more cellular network towers or in communication with one or more devices 113, 115 in other ways, such as via Wi-Fi networks, satellite links and the like. Central processor 111 may first receive first map data of the first region 101 from a first device 113. The central processor 111 builds a map based on the first map data or adds to or supplements a map of the first region 101 that already existed.

However, the map at this point may be incomplete in one or more respects: the map may lack data on one or more areas of the first region 101, or may have only a rough approximation of portion for portions of the first region 101. For example, the first device 113 may have traversed only a portion of the first region 101 or may have sensor of limited capacity or a sensor positioned or oriented in a particular direction. Or, the first device 113 may be a flying drone that sped over the first region 101 and so the captured only a few frames. By way of further example, the sensor positioned on the first device may have been too high to capture data about lower portions of furniture, such as chair or table legs, or positioned too low to capture cantilevered table kitchen counters, tabletops, or swinging TV wall mounts. Another instance may be if data traffic conditions at the time of transmission of the first map data have constrained the amount of data received by central processor 111.

Central processor 111 may determine that the map needs to be supplemented, for example, map data corresponding to a target areas 103 of the first region 101 may be insufficient or lack sufficient resolution. The central processor 111 may decide that the map data of the first region 101 lacks sufficient detail or granularity, is incomplete regarding various portions of the area, is missing information in various other respects. Or the central processor 111 may determine that the target area requires updating because of recent changes in the layout of the area, due to objects being added or removed, other devices entering or leaving the area, or because a predetermined length of time, for example, 2 hours, 4 hours, or 0.1-100 hours, have elapsed since the most recent update of the target area.

Central processor 111 may ping devices in or near the first region. One or more candidate devices may respond. Central processor 111 may select a device, for example, based on proximity to the target area 103 a second device and, accordingly, transmit a second transmission 123 requesting the second device 115 to move to a target location 105a for target region 103 of the first area 101 to obtain map data of the target region 103.

Central processor 111 may determine an optimal target location 105a for capturing map data from the target region 103. For example, initial map built by central processor 111 based on the first map data may show that the target location 105a may be a hilltop from which sensors can capture map data for the target area 103, may be centrally located in the target area 103, may be an open area that provides relatively unobstructed sensor views, may be an entry way through which remaining portions of the target area 103 may be accessed, or may offer a combination of such features. The central processor 111 may select the target location 105a based on capabilities of the second device 115. The central processor may query the second device 115 as to its height, width, or other dimensions to determine whether the second device 115 can fit through or under various furniture items or other features of the landscape, as to the position or orientation of its camera, as to the height of its camera, or as to the type of its other sensors. For example, the central processor may determine that given current night time lighting conditions in the target area 103, the second device 115 is well suited to capture a portion of the target area 103 with ample indoor lighting but not other portions of the target area 103 that lack sufficient lighting and, accordingly, determine the target location 105a. Or, the central processor 111 may determine that the second device 115 has night vision infrared sensors or LIDAR and assign it a target location 105a without regard to indoor lighting available at the target area 103. In an embodiment, the central processor 111 may query the second device 115 as to its previously set itinerary and select the target location 105a to avoid or to minimize the second device 115 having to deviate from its previously set itinerary. For example, the central processor 111 may determine that a second target location 105b would be ideal but determine a first target location 105a that is more or less along the path previously set by/for the second device 115, and then request the second device 115 to head for the first target location 105*a*.

The second device 115 may move to the target location 105, or in, near or over the target area 105, and transmit third transmission 125 to central processor 111. The third transmission 125 may contain image data gathered by one or more cameras of the second device 115 to be used as map data of the target area 103, which the central processor 111 may use to improve, to expand, or to make more detailed the map data of the first region 101. The data transmitted may sometimes be referred to as "map data" because it is used for making or updating a map. The central processor 111 may transmit the map data, or may transmit relevant portion thereof, to other devices in the first region 101. The central processor 111 may transmit guidance data or navigation instructions, based on the map data or the map built therefrom, to devices in the first regions 101, instead of, or in addition to, the map data. For example, in the off-loaded configuration shown in FIGS. 9B and 9C, the central processor 111 may handle many of the processing tasks necessary for navigating devices in the field.

The central processor 111 may then transmit a request to the second device 115, or to another device identified in or near the first region 101, to move to a second target location 105*b* to capture additional map data of the target area 103. The additional map data may be for the same portion of the target area 103, for example, to capture more detailed data or to capture data in another configuration of an object—an open door, moveable equipment in a different location than before—in the same portion of the target area 103, or may be for a different portion of the target area 103. The central processor 101 may determine an optimal route needed by a processor through the first region 101 to achieve the aims of the device, and then transmit to the device an actual route that deviates from the optimal route in order that the device obtain sensor data from the target area.

In an embodiment, central processor 111 may transmit map data or may transmit guidance data or navigation instructions to devices in the first regions 101 only if the devices collaborate in obtaining and transmitting map data as needed by the central processor 101. For example, such guidance from the central processor 111 may be held out as incentive for devices to collaborate in the map data gathering.

The central processor 111 may be implemented as a network edge service 841. It may receive IMU and image data from the devices in the target area, which may be implemented as SLAM devices 801. The data may be demultiplexed and decoded after receipt. This data may be sufficient for localizing the SLAM devices 801. The SLAM network edge service 841 may determine a distance of the SLAM device, or a change in distance of the SLAM device, to one or more neighboring objects. For example, visual odometry may be used for processing the image data received from the SLAM device to estimate distances to aid in navigating the SLAM device through rooms or nearby objects. Successive frames of the image data may be analyzed to estimate distance at known successive intervals, the length of the time intervals depending on the frame capture rate. The rate of change of distance may be used to determine speed of the SLAM device relative to other objects. Similarly, the image data may be used to determine a change in direction or orientation of the SLAM device, or a rate of change in direction or orientation of the SLAM device. The SLAM network edge service 841 may also receive additional data, such as IMU data, from the first device. For example, the IMU data may be multiplexed with the first image data and encoded and compressed before being transmitted to the SLAM network edge service 841. Additional sensor data, such as RADAR data, audio data, electric field or magnetic field data, and/or radio or microwave frequency communication, may also be captured by the first device and transmitted by the first device and transmitted to the SLAM network edge service 841. The image data may be captured by one or more cameras in, on, or at the first device, and may comprise image data in one or more of the visible frequencies, radio frequencies, microwave frequencies and/or other EM bands. Such data may be transmitted to the SLAM network edge service 841 via radio transmission or in other suitable frequencies.

The map building may be a collaborative process in which more than one processor participates in receiving data from the first device to build the map, and in which more than one processor participates in localizing the first device, and in guiding the first device. Such processors may be provided remote from one another and from the first device.

While sometimes referred to as a processor or as a SLAM network edge service 841, the SLAM network edge service 841 may itself be provided as part of a SLAM-enabled device, such as AR, XR, MR or VR wearable devices, for example, smart glasses or head mounted displays, or as autonomous or self-driving/driver assist vehicles, drones, robots, household appliances such as vacuum cleaners, sweepers, floor treatment equipment, lawn mowers, and the like.

The SLAM network edge service 841 may then determine one or more image data parameters pertaining to the first data received. Such an image data parameter may pertain to a sensor capacity of the capturing sensor of the first device. The capturing sensor may be the sensor of the first device that captured the first image data, for example, one or more cameras. In an embodiment, the image data parameter may refer to a setting or condition of the capturing sensor that is controlling at a time that the first image data was captured. For example, a setting or condition of a capturing camera may be 4K resolution at the time the first image data is captured, but the maximum capacity of the capturing camera may be 8K resolution. The image data parameter may thus be 4K and this image data parameter may be compared with the image data parameter of the second image data, as discussed below. Similarly, a set of image data may have been captured at a lower framerate than the maximum framerate capacity of the sensor, and thus the lower framerate may be transmitted to the SLAM network edge service 841 in association with this set of image data.

An image data parameter may be a maximum resolution capacity and/or a maximum framerate capacity of a camera of the SLAM device 801. The image data parameter may be a maximum bit rate that can be provided by the SLAM device 801. The parameter may be a maximum encoder throughput using a particular codec of the first device. The parameter may also concern data traffic conditions prevailing at the time of the transmission of the image data. In addition, weather-related conditions, such as rain, snow or other precipitation, humidity, cloudiness, time of day, season or time of year and the like, may affect image quality, and such conditions may also be provided as image data parameters. In addition, a speed of the SLAM device at the time of the capturing of image data may affect image quality as the amount of data captured per unit of time may be reduced with increased speed of the first device. Thus, these factors may also be transmitted to the SLAM network edge service 841 by the devices in the field and considered as image data parameters and may be taken into account by the SLAM network edge service 841. The transmission from the SLAM device 801 may also include the one or more such image data parameters pertaining to the image data. Or, such image data parameter information may be previously stored by the SLAM network edge service 841, or may be otherwise obtained by the SLAM network edge service 841, for example, from an online database that contains maximum image resolution, maximum framerate, maximum bitrate, the codec uses and the like for each type of device. Accordingly, by knowing the type of SLAM device, such parameter information may be retrieved.

If the parameter pertains to factors such as data traffic conditions, weather conditions, indoor or outdoor lighting conditions, or a speed of the device on which the capturing camera is deployed, then the second image data may be considered higher quality data than the first data if a constraint imposed by one or more such factors has been mitigated, reduced or changed in its ability to adversely affect image quality.

According to an embodiment, the quality of the image data, or a segment of video, or an image or frame of the second image data, may be considered higher if it contains more data. For example, this may be measured by the number of bits compared with a corresponding portion of the first image data. Or, the amount of data may be compared for the same area within a corresponding image, or for a corresponding reference point or key point of a scene or for a set of reference points or key points of a scene. It is thus determined whether a second parameter or a two or more parameters of the second image data provide(s) for or enable(s) higher quality image data than does a first parameter or two or more parameters of the first image data. On the other hand, overall image quality may be equal to or higher for the first image data but one or more portions of the second image data may be taken at a higher framerate, or at a higher resolution than the framerate or resolution of the first image data, in which case those one or more portions of the second image data are used to replace corresponding portions of the first image data while keeping remaining portions of the first image data.

The map may be supplemented with the image data. The old map may be replaced, in whole or in part, according to the second image data. For example, some or all of the first image data may be replaced by the second image data for generating the updated map. It may be possible that only portions of the second image data deemed to be higher quality may be used to update the map. For example, an area of the device region that has higher image quality than a corresponding area of the first image data may be replaced. Data for a reference point or key point of a scene or for a set of reference points or key points of a scene may be replaced by corresponding data of the second image data. Further, the second image data may be used to supplement the first image data without replacing or supplanting the first image data. Or updated map data may be generated such that portions of the first image data that are higher image quality may be used for some portions of the updated may while portions of the second image data that are higher quality may be used for generating other portions of the updated map.

Figure 2A:
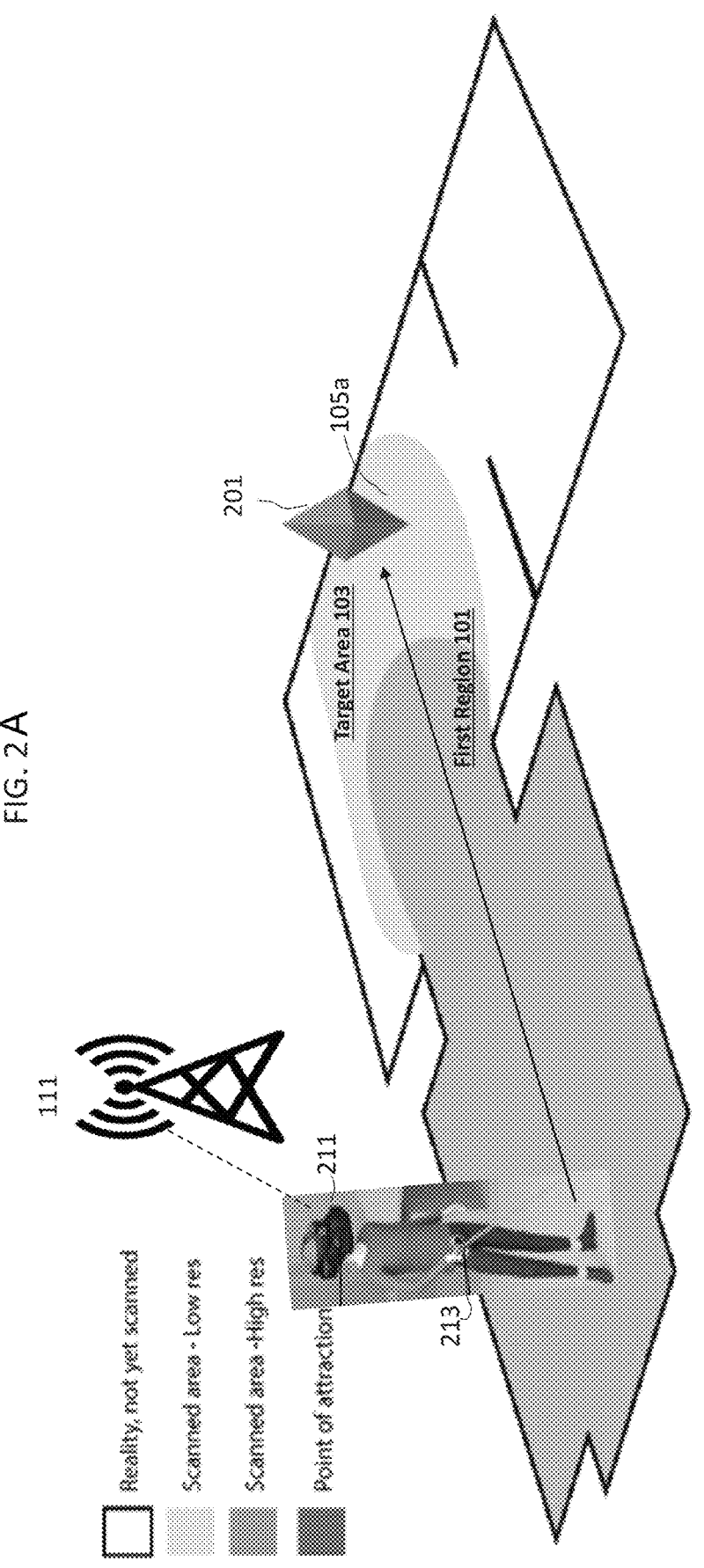
FIGS. 2A-B illustrate examples of placement of a virtual object to guide or to propel collaborative mapping of a physical room or target area, according to an aspect of the present disclosure.
Figure 2B:
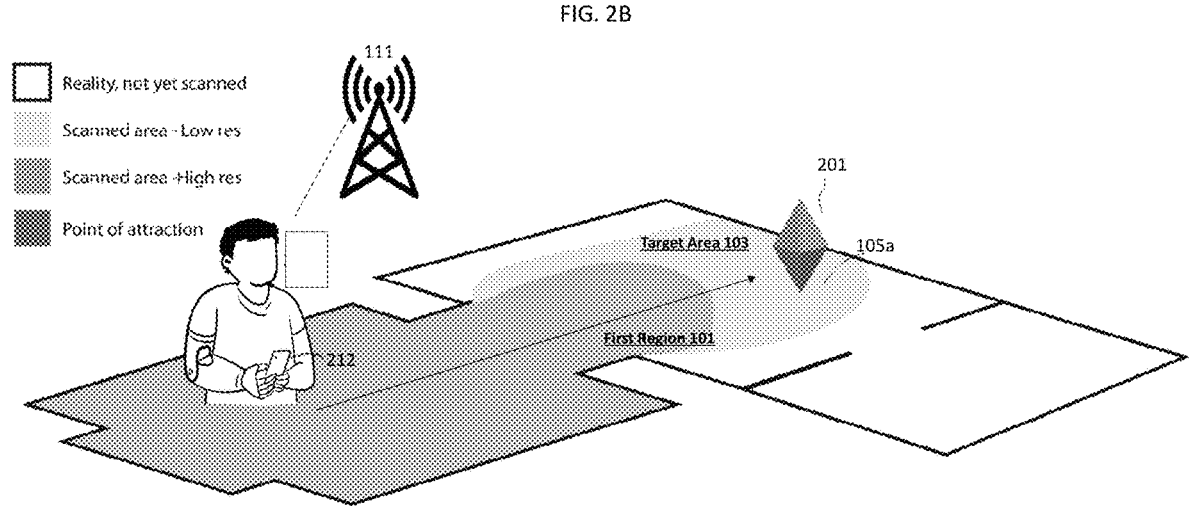

FIGS. 2A and 2B show the central processor providing a visual guide 201 to aid via a device 211, such an head mounted device (HMD) running an AR, XR, MR or other such application, or a tablet, smartphone or other handheld or mobile device, to move to the target location 105*a* for capturing map data of a target area 103, according to a second embodiment. FIG. 2A shows an example of the HMD or smart glasses implementation. FIG. 2B shows an example of a handheld device implementation in which the visual aid and other virtual aspects generated by the system may be visible on a handheld device 212. The device 211 and the handheld device 212 may display the visual guide 201 and other virtual guides or aspect, for example, overlaid on a map of the first region 101 and/or the target region 103 or overlaid on a real world image representation thereof. The central processor 111 may determine that existing map data corresponding to the target area 103 is not of sufficient detail, has not been updated in some time, for example, in 3 hours, or in 1-48 hours, or in otherwise incomplete, as discussed, and may determine that device 211 is in or near the target area 103.

The central processor 111 may then detect a presence in the first region 101, or approaching the first region 101, of device 211 and then generate a visual aid visible via the device 211 to guide or attract a user of the device 211 to the visual guide 201. The central processor 111 may already have generated a low resolution map of the target area 103, or portions thereof, or may have access to such a map generated elsewhere, and thus may be able to position the visual guide accordingly. Device 211 may be running a game application whose object is to locate visual guides. Thus, the user of the device 211 may be participating in a group game, in which participants use devices running such a game to find or tag or virtually scoop up, using AR equipment, such visual guides. The device 211 may accumulate points for each such visual guide "obtained" by the user using the AR device. For example, the AR handheld device 213 may be a virtual light saber that the user uses to slash the visual guide to obtain points. The AR device 211 may capture map data of the target area 103, or portions thereof, in the process of moving toward, finding and reaching the visual guide 201.

In an embodiment, visual guide 201 may be placed low to the ground or high, above furniture, to induce the user of the device 211 to reach for the virtual guide 201. This may add to the challenge of the game and also the VR device may thus capture map data that would not be captured by a VR device in ordinary user movement.

According to an aspect of the disclosure, the appearance and positioning of the visual guide 201 may be selected according to VR application running in the device 211 and according to the interests, age, skill level, height and physical mobility of the user. For a smaller child, for example, the visual guide may be in the form of a bunny or a familiar cartoon character, and may be generated to appear to be positioned lower to the ground where it more likely to be seen and be interacted with a child of smaller stature. If the application running on the VR device is a fantasy adventure game, then the visual guide 201 may be a dragon or a knight to be slain or chased and captured. A chase may entail a moving visual guide 201, which would necessitate the user moving with the VR device 211 through the space and capturing more map data. The central processor 111 may move the appearance of the visual guide 201 via the VR device from location to location through the target area 103 as needed for capturing map data. The visual guide 201 may be placed and oriented so as to be most clearly visible from the portion of the target location where the VR device is ideally situated for capturing map data. Thus, the location of the visual guide 201 may be selected so as to lure the VR device to the best location for capturing map data. The selection of the particular target location may be based in part on identifying location(s) that are safe and permitted for a user/VR device to be located. For example, dangerous, inappropriate, fragile, or other "off-limits" objects or areas may be avoided, and permissible bounds for a game in an indoor area may set in other ways. By way of illustration, a group of rooms within a larger area may be reserved for a group of players and this group of rooms may be set as the permissible bounds of the game.

Similarly, if the central processor 111 deems it necessary to obtain data about the positioning of light sources in the target area 103, then it may position the visual guide in, on, above, below or near a light source to impel the user to look up with the HMD. This may facilitate the central processor 111 capturing data about the location, orientation, quantity of illumination provided or other illumination properties of the light source. Such lighting data may aid in interpreting images captured by devices in the vicinity of the light source. For example, it may be uncertain whether a dimmer image was received from a device due to dimmer light sources in the vicinity, darker color furniture or poorer camera equipment. A clearer understanding of the amount of light provided by light sources may aid the central processor in classifying image data.

Figure 3:
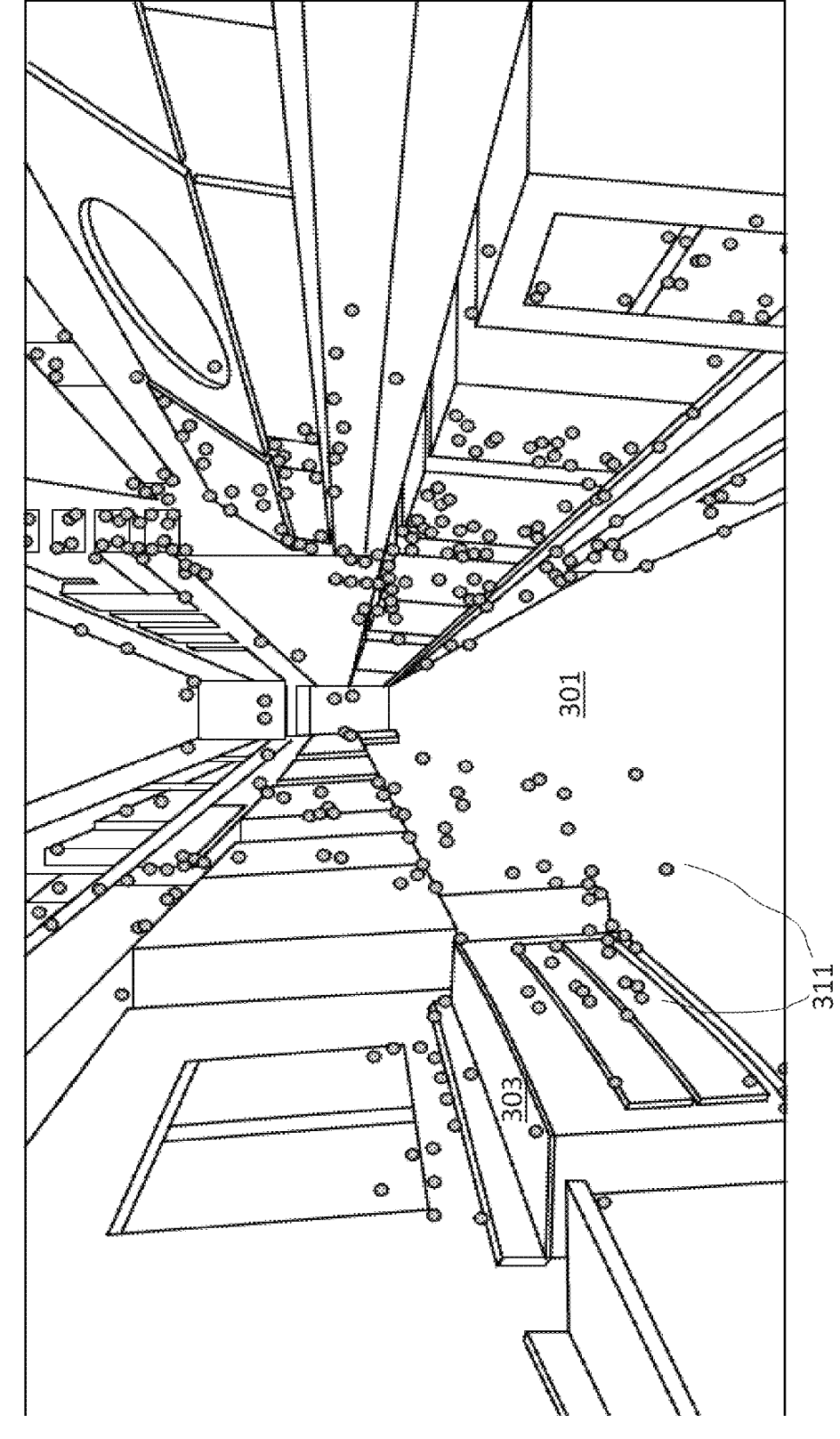
FIG. 3 illustrates an example of feature points tracking as a device moves through its physical environment.

FIG. 3 illustrates key points (feature points) 311 having been extracted from image data generated by a SLAM-enabled device as it moves through a physical space 301, for example, in a robotics application. These feature points 311 may be points of furniture or on landscape features 303 and may be tracked continuously as the device moves through its environment. In addition, feature points 311 may move if they are located on moving objects, including for example, other SLAM-enabled devices.

A SLAM device typically includes some type of inertial measurement unit (IMU) to measure the acceleration and angular velocity of the device along three mutually perpendicular axes over time. A visual-inertial module may be configured to determine visual-inertial data (e.g., as sensor data) using visual-inertial odometry (VIO). For example, visual-inertial module may acquire one or more input images from sensor data store or directly from a user device (e.g., single cameras, stereo cameras, omnidirectional cameras, or other image sensors). Based on the quality of the image data, visual-inertial module may apply an image correction process or image processing techniques to improve the quality of one or more portions of the image (e.g., for lens distortion removal).

In some examples, the VIO process may implement feature detection and feature extraction to help estimate the sensor motion. In feature detection, the process may define interest operators and match features across frames to construct an optical flow field. The process may establish a correlation between two images and perform feature extraction based on the comparison. In some examples, the process may construct optical flow field (e.g., using Lucas-Kanade method) and remove outliers. In some examples, the VIO process may further estimate the visual-inertial data (e.g., the motion of the sensor, and thus the motion of the device) from the optical flow. A Kalman filter may be used to estimate a state distribution and/or geometric and 3D properties of the features that minimize a cost function (e.g., using an AI model) may be determined based on the re-projection error between two adjacent images. This can be done by, for example, mathematical minimization or random sampling.

SLAM networks may use visual odometry based on frames captured by one or more cameras of its SLAM-enabled devices to determine distances. The distances thus determined may be used to build a map and to determine locations of the SLAM-enabled devices, which in turn are used to control the SLAM-enabled devices. The image data captured and transmitted may be in the visible spectrum, IR, microwave, radio frequency or other spectral ranges, or a combination of the foregoing.

The device's sensors, such as one or more charge coupled devices and/or cameras and/or RADAR/LIDAR and the like, or a combination of the foregoing, collect visual data from the physical world in terms of reference points. In addition, or instead, a SLAM-enabled device may also use one or more of GPS data, satellite data, wireless network and/or Wi-Fi signal strength detection, acoustic signals, and the like for determining location, movement and/or orientation. In industrial applications, such as automated factories and distribution warehouses, SLAM is used for robot navigation and interacting with the world around the robot and with other moving robots, as well as humans, to solve the specified task. A self-driving car may use a roof-mounted LIDAR sensor to create a 3D map of its surroundings. Measurements are constantly taken as the device moves through its surroundings and SLAM takes care of the inaccuracies of the measurement method by factoring in 'noise.' However, it will be understood that what is disclosed is not limited to SLAM technology or to the above-noted implementations.

Figure 4:
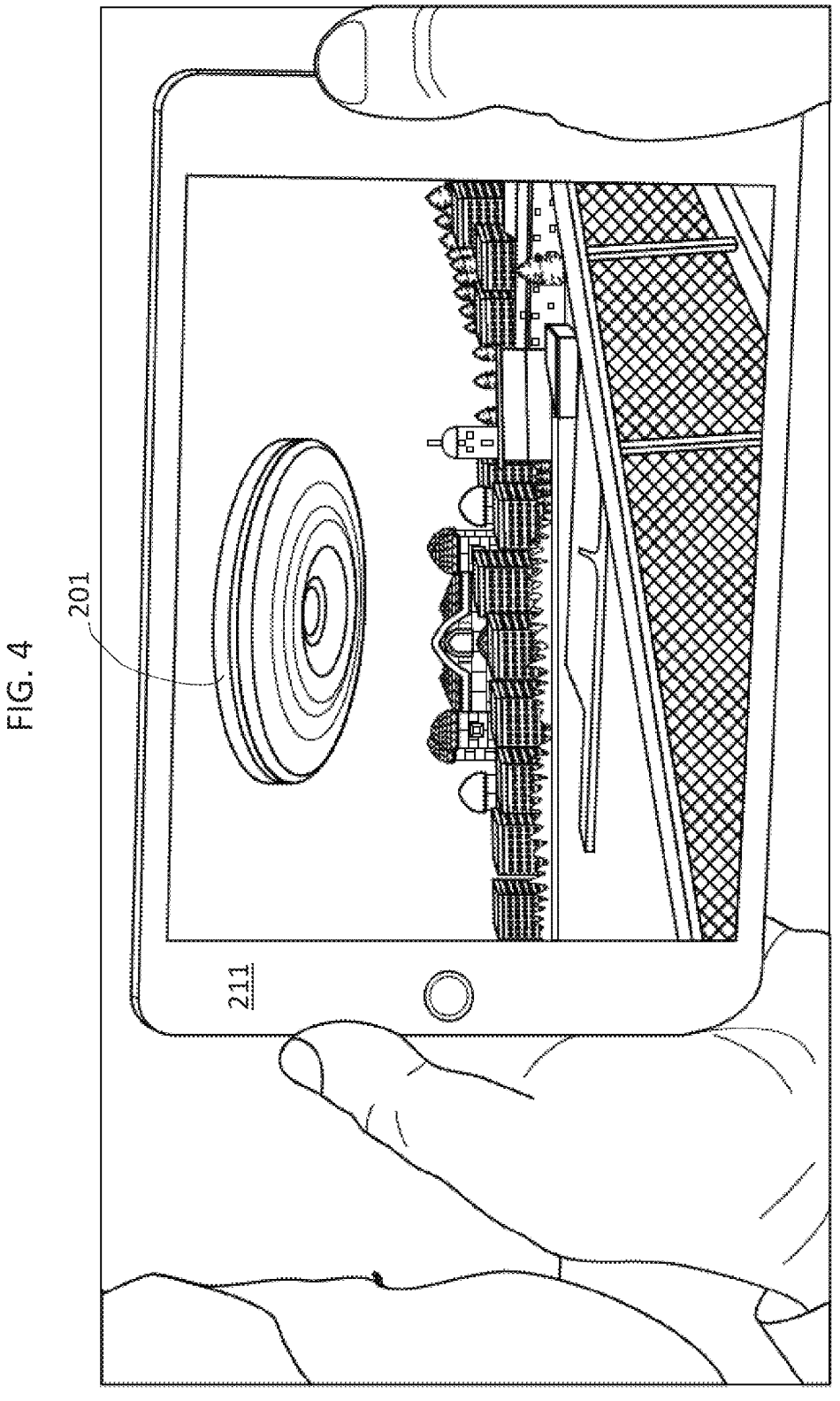
FIG. 4 illustrates an example using SLAM on a tablet outdoors enabling a virtual object to interact with the physical world.

FIG. 4 illustrates a handheld device, such as a tablet, which provides an AR interface for visualizing and positioning a virtual object, such as a visual guide 201, in the physical world "around it." Data processing module may receive data from one or more user sensors or other devices, and store the sensor data in sensor data store. Depth sensors can generate a three-dimensional (3D) image by acquiring multi-point distance information across a wide Field-of-View (FoV). The system may guide movement of the user through a physical environment by controlling the position of the visual guide virtually appearing in the physical environment via the device held or worn by the user. Map data for large swaths of target area 103 may be captured as the user is guided through the target area 103 as needed for generating or updating the map in this way. In an embodiment, an application may be provided in which users race to one target location after another guided by visual guides 201. In an embodiment, the system may generate a visual guide 201 for each device.

Figure 5:
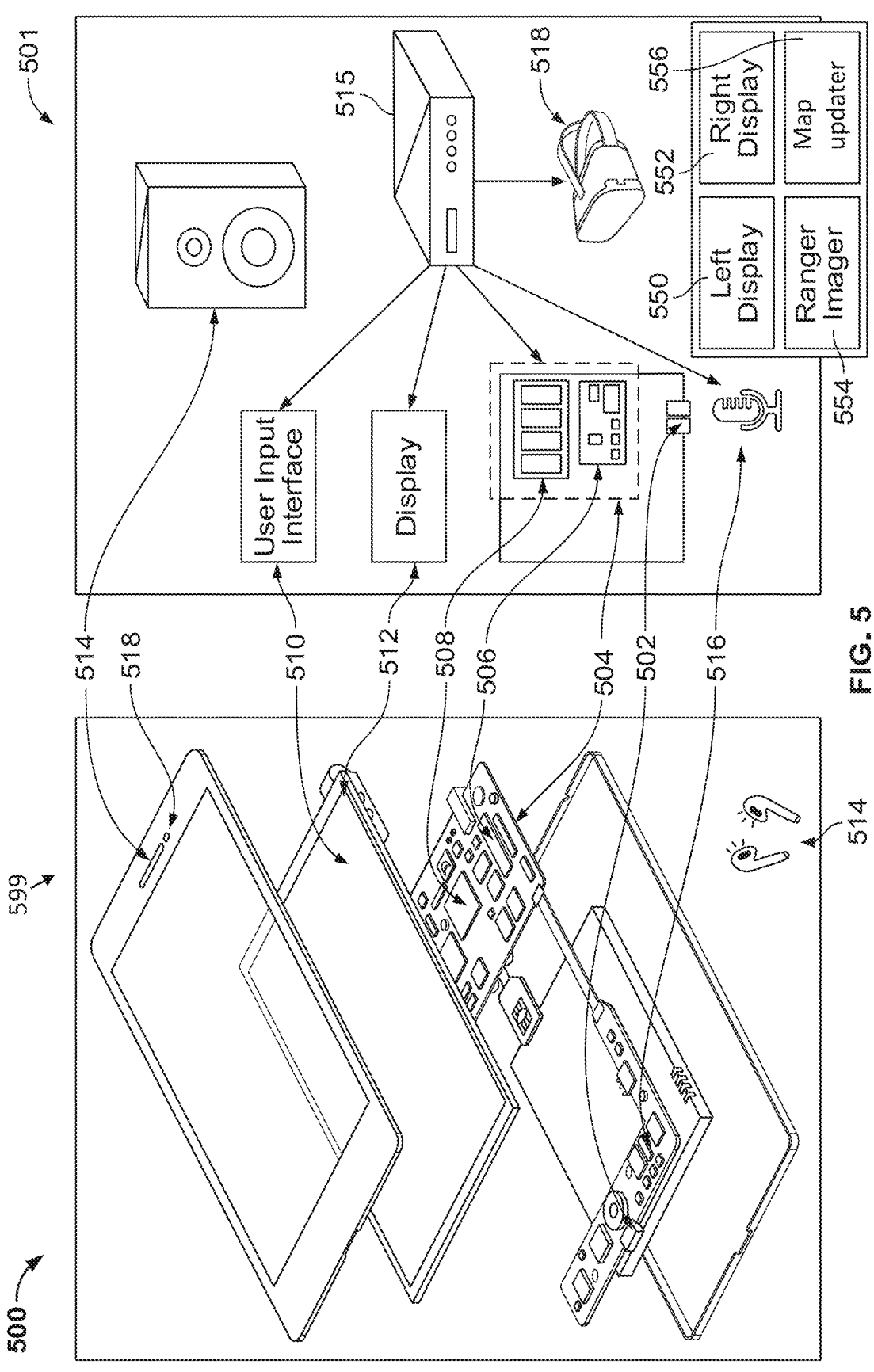
FIG. 5 is an illustration of a computer with peripheral devices.

FIG. 5 illustrates devices and related hardware for AR generation or other applications or implementations of a SLAM-enabled device, and for network edge service devices, including devices used for mapping and localization. A circuit board may include control circuitry, processing circuitry, and storage (e.g., RAM, ROM, hard disk, removable disk, etc.). In some embodiments, the circuit boards may include an input/output path. Each device 500/501 may receive content and data via input/output (I/O) path 502 that may comprise I/O circuitry (e.g., network card, or wireless transceiver). I/O path 502 may communicate over a local area network (LAN) or wide area network (WAN).

Control circuitry 504 may comprise processing circuitry 506 and storage 508 and may comprise I/O circuitry. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i9 processor and an Intel Core i7 processor). In some embodiments, control circuitry 504 executes instructions for the AR application stored in memory (e.g., storage 508). Specifically, control circuitry 504 may be instructed by the AR application to perform the functions discussed above and below. In some implementations, processing or actions performed by control circuitry 504 may be based on instructions received from the AR application.

In client/server-based embodiments, control circuitry 504 may include communications circuitry suitable for communicating with other networks. The AR application may be implemented as software or a set of executable instructions. The instructions for performing any of the embodiments discussed herein of the AR application may be encoded on non-transitory computer-readable media (e.g., a hard drive, random-access memory on a DRAM integrated circuit, read-only memory etc.). For example, in FIG. 5, the instructions may be stored in storage 508, and executed by control circuitry 504 of a device 500.

In some embodiments, the AR application may be a client/server application where only the client application resides on device 500 (e.g., device 104), and a server application resides on an external device or edge service network. Control circuitry 504 may include communications circuitry suitable for communicating with a server, edge service computing systems and devices, a table or database server, or other networks or servers. Such communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video recorders, solid state devices, quantum storage devices, gaming consoles, or any other suitable fixed or removable storage devices, and/or any combination of the same. Storage 508 may be used to store various types of content described herein as well as AR application data described above (e.g., database 420). Non-volatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry. Control circuitry 504 may also include scaler circuitry for upconverting and down converting content into the preferred output format of equipment 500. Control circuitry 504 may also include digital-to-analog converter circuitry and analog-to-digital converter circuitry for converting between digital and analog signals. In some embodiments all elements of system 500 may be inside housing of the AR display device 518. In some embodiments, AR display device 518 comprises a camera (or a camera array) 556. Video cameras 556 may be integrated with the equipment or externally connected. One or more of cameras 556 may be a digital camera comprising a charge-coupled device (CCD) and/or a complementary metal-oxide semiconductor (CMOS) image sensor. In some embodiments, one or more of cameras 556 may be dirtied at outside physical environment (e.g., two cameras may be pointed out to capture to parallax views of the physical environment). In some embodiments, AR display device 518 may comprise other biometric sensor or sensors to measure eye rotation (e.g., electrodes to measure eye muscle contractions). AR display device 518 may also comprise range image 554 (e.g., LASER or LIDAR) for computing distance of devices by bouncing the light of the objects and measuring delay in return (e.g., using cameras 556). In some embodiments, AR display device 518 comprises left display 550, right display 550 (or both) for generating VST images, or see-through AR images in accordance with embodiments in FIGS. 1-6.

The AR application may be implemented using any suitable architecture. For example, it may be a stand-alone application wholly-implemented on each one of user equipment device 500 and user equipment device 501. In such an approach, instructions of the application may be stored locally (e.g., in storage 508), and data for use by the application is downloaded on a periodic basis (e.g., from the edge service network, from an out-of-band feed, from an Internet resource, or using another suitable approach). Control circuitry 504 may retrieve instructions of the application from storage 508 and process the instructions to provide AR generation functionality and preform any of the actions discussed herein. Based on the processed instructions, control circuitry 504 may determine what action to perform when input is received from user input interface 510. For example, head movement or movement of a cursor on a display up/down may on user input interface 510. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the AR application may be downloaded and interpreted or otherwise run by an interpreter or virtual machine (run by control circuitry 504). In some embodiments, the AR application may be encoded in the ETV Binary Interchange Format (EBIF), received by control circuitry 504 as part of a suitable feed, and interpreted by a user agent running on control circuitry 504. For example, the AR application may be an EBIF application. In some embodiments, the AR application may be defined by a series of JAVA-based files that are received and run by a local virtual machine or other suitable middleware executed by control circuitry 504. Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 802.11x, etc.), or other short-range communication via wired or wireless paths. The user equipment devices may also communicate with each other directly through an indirect path via communication network. While sometimes described as an "AR" network or system by way of example, it will be understood that other types of SLAM implementations are also contemplated, including drones, vehicles, robots and the like.

Figure 6:
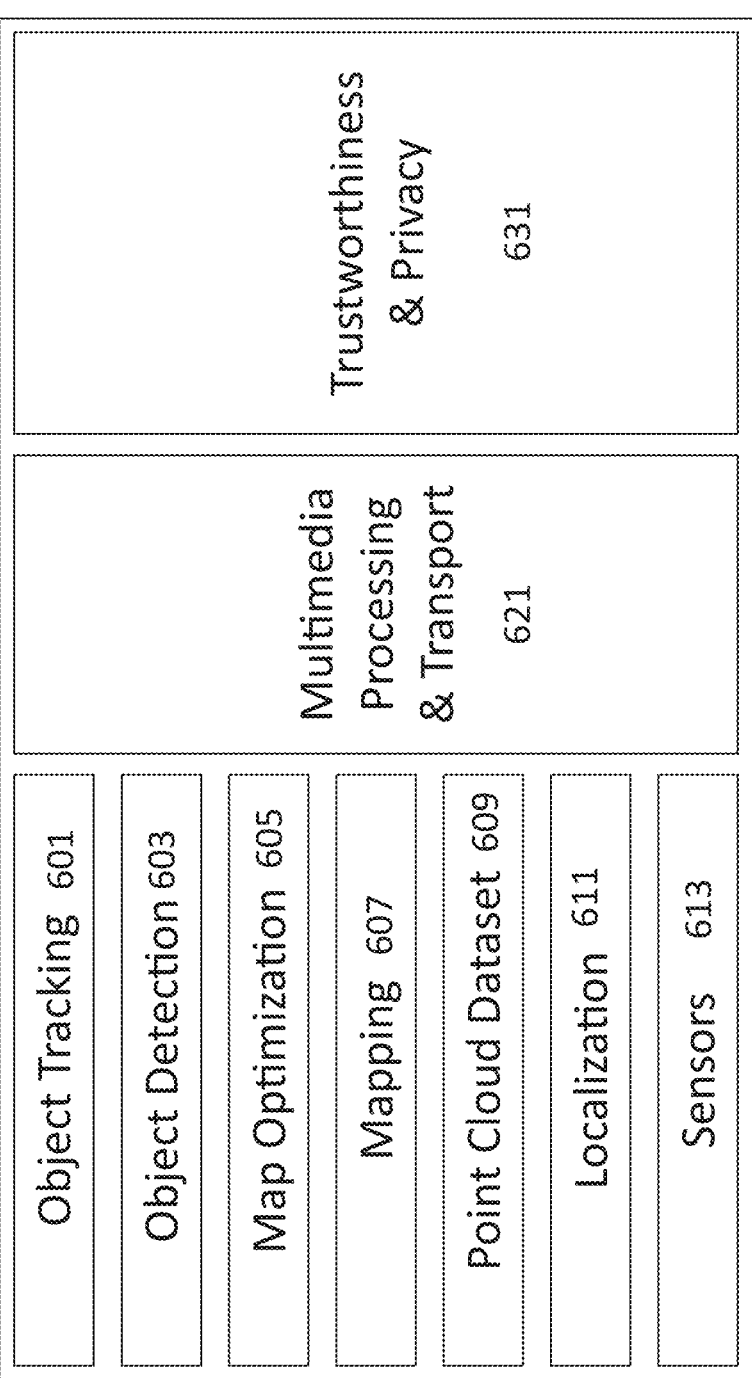
FIG. 6 illustrates components of a SLAM system that may be provided on a SLAM-enabled device.

FIG. 6 illustrates components of a SLAM device, one or more of which may be implemented as software modules or as hardware, including, for example, object tracking (OT) 602, object detection (OD) 603, map optimization (MO) 605, mapping (M) 607, point cloud dataset (PCD) 609, localization (L) 611, and sensors(S) 613, in addition to multimedia processing and transport/transmission 621, and trustworthiness and privacy measures 631. However, it is often the case that one or more of these modules are not present on a SLAM-enabled device, but are offloaded to the edge service network. This may be done to make the SLAM-enabled devices less expensive and to optimize resources.

Figures 7A, 7B, 7C:
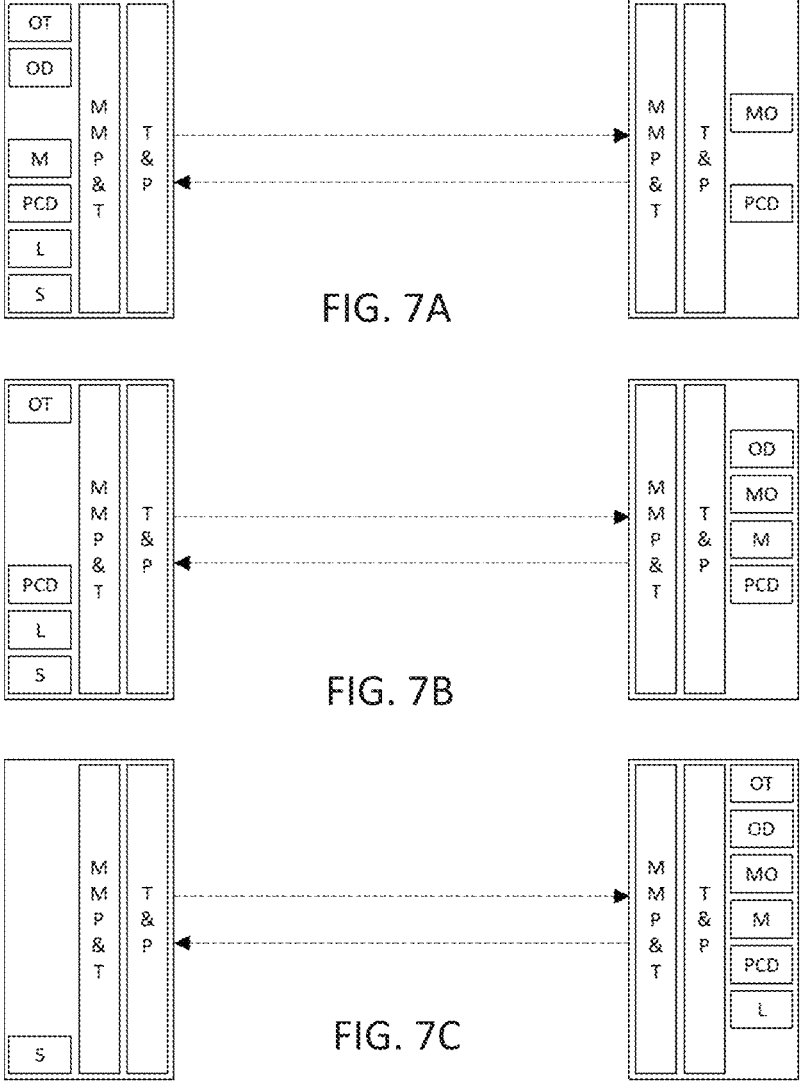
FIGS. 7A-7C illustrate three architectures for splitting SLAM processing, for example, in an XR application: low offload (FIG. 6A), mid offload (FIG. 6B), and high offload (FIG. 6C)

FIGS. 7A-7C illustrate three SLAM architectures with increasing degrees of offloading the processing from the SLAM device. In FIG. 7A, all of the processing, with the exception of map optimization, is performed by the SLAM device. FIG. 7B illustrates that the object detection, map optimization, and mapping processes have been offloaded from the SLAM device to the edge service network. FIG. 7C illustrates that all, but the sensors and associated processing, as well as the multimedia processing and transport, and the trustworthiness and privacy modules have been offloaded from the SLAM device.

FIGS. 8A-8D illustrate an example of a SLAM implementation of a system with a client device 801 in communication via network 841 with a SLAM network edge 851.

Figure 8A:
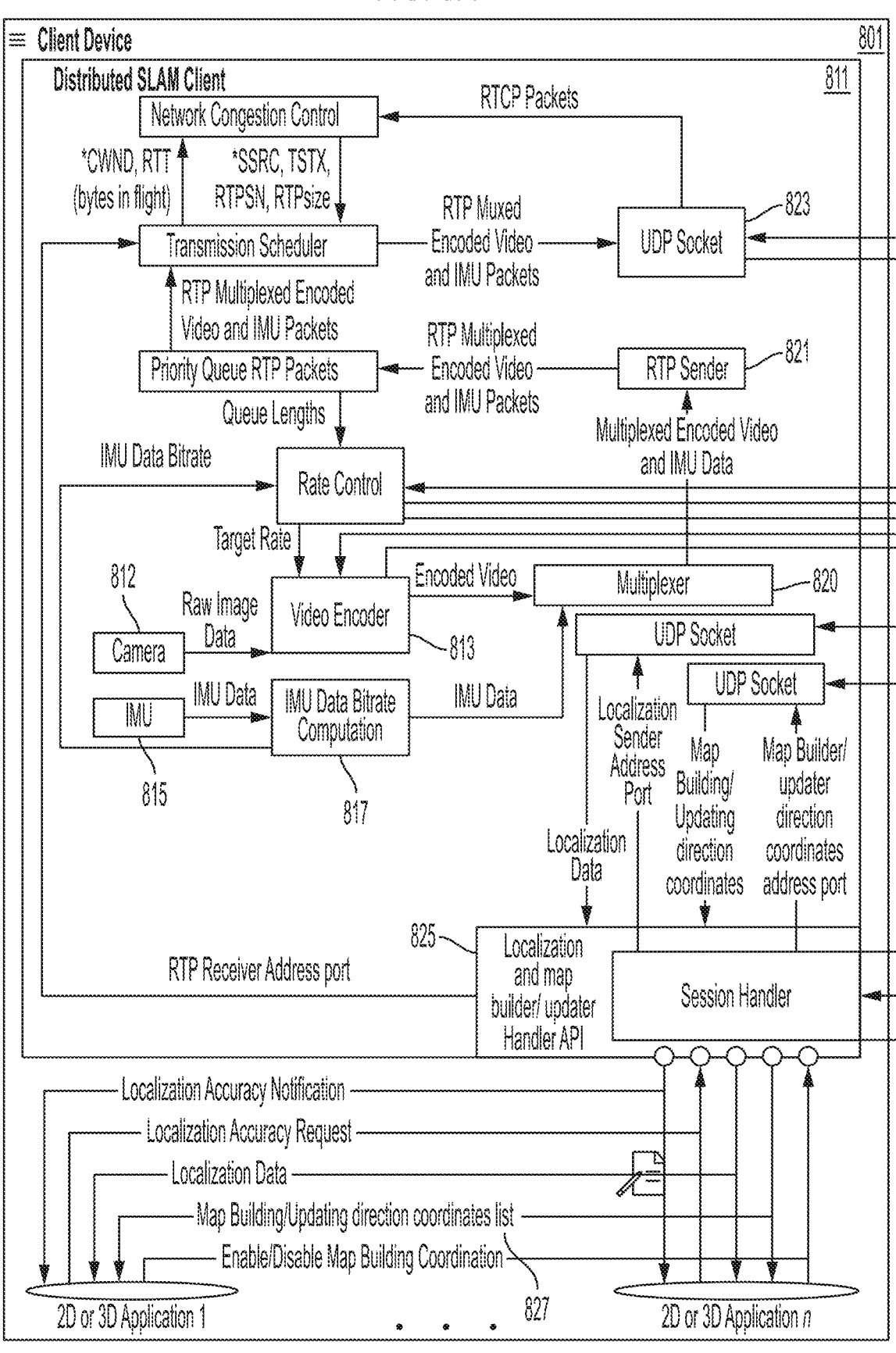
FIG. 8A illustrates an example of a SLAM device in communication through a data network with a distributed SLAM network edge service, according to an aspect of the disclosure.

FIG. 8A illustrates a SLAM-enabled device 801 communicating via exchanges through a data network 831, shown in FIG. 8B with a distributed SLAM network edge service device, server, service or system 841 shown in FIGS. 8A and 8B, according to the first embodiment. While illustrated as a SLAM example, it will be understood that the present description is not limited to SLAM technology. As shown in FIG. 8, the SLAM device 801, such as a AR/XR/MR glasses or head mounted display (HMD) or other wearable device, smartphone, tablet or other handheld device, laptop computer, industrial robot, vacuum cleaner or other household appliance, drone, automobile or other vehicle, may have a SLAM client 811 that controls a camera 812 for capturing, at a set framerate, a stream of frames as image data that are then transmitted to a video encoder 813 of the SLAM client 811.

In addition, the SLAM client 811 may have an inertial measurement unit (IMU) 815, which measures a change in speed or a change in orientation (change in acceleration) of the device 801 and then transmits the IMU data to an IMU data bitrate computation module 817. The IMU data bitrate computation module 817 transmits this data as data packets to multiplexer 820, which also receives the encoded video data. Multiplexer 820 may also encode the IMU and image data it receives using a selected codec, and then transmits this encoded, multiplexed data to RTP (real time transport protocol) sender 821. The example illustrated in FIG. 8A shows RTP, being used to transmit the data from these sensors (the camera and the IMU data, as encoded and multiplexed, via UDP (user datagram protocol) socket 823 through the wireless network 831 to the SLAM network edge service 841. However, it will be understood that other types of processing and other protocols may be used to prepare the data for transmission and to transmit the data. The data may be transmitted via a mobile or fixed line network 850 to SLAM network edge service 841 shown in FIGS. 8C-8D. Client device 801 may also receive map updating 827 from the SLAM network edge service 841 a list of coordinates associated with camera or other sensor data captured by the client device.

Figure 8C:
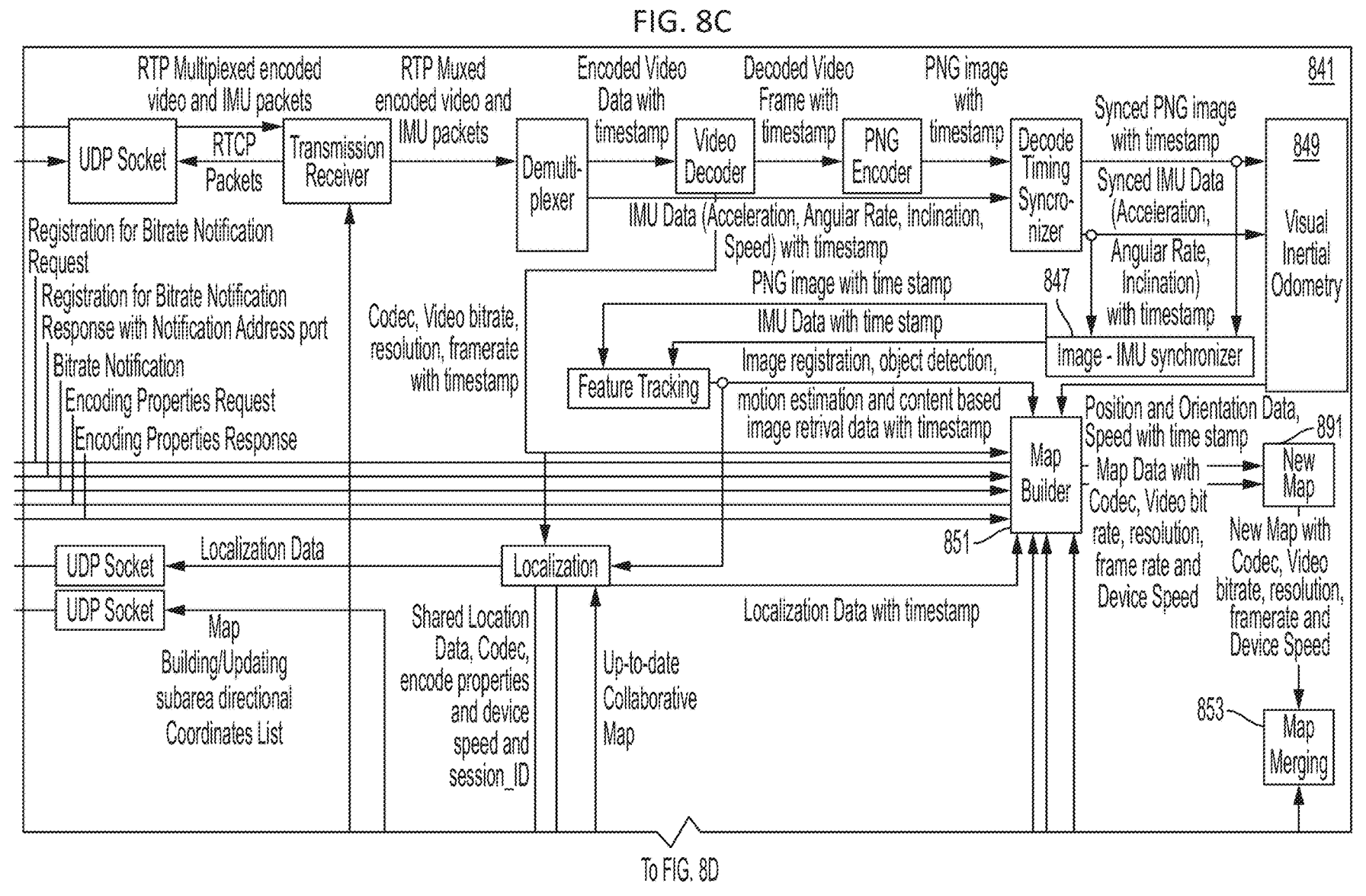

The SLAM network edge service 841, illustrated in FIGS. 8C-8D, may perform localization, according to the first embodiment of the present disclosure. According to the first embodiment, the map of the area of the device is already generated by map builder module 851 of the SLAM network edge service 841 and stored in a map module 890. However, the map may be generated by another device, for example, one or more other SLAM network edge service devices working alone or in concert, and transmitted to the SLAM network edge service 841 and stored there. Sensor data, for example, camera, IMU, LiDAR, GPS, data or the like, for the map may be generated by the SLAM client 811 and transmitted to the SLAM network edge service 841 or to one or more other SLAM edge service network devices and/or may be generated by and transmitted from other SLAM devices 801. Map building and updating directional guidance 859 may determine one or more target areas that need further data, one or more target locations where devices may collect data for the target areas, and may coordinate which target devices are requested to move to the target locations for collecting the new or updated map data. The generation of the data for the map be a collaborative process orchestrated by collaborative mapping controller 855, or may performed by the capturing of data and data transmission by more than one SLAM devices and processed by more than one SLAM network edge services 841. Some SLAM clients may provide processing, including map building, as part of this process. SLAM network edge service 841 also includes an IMU-image synchronizer 847 that may correlate the IMU data with the image data, both obtained from SLAM device 801. Visual inertial odometry module 849 may use the IMU and image data to determine distances. If additional higher quality data is received, map builder 851 updates the map at 853, or replaces portions of map 890, to obtain a new map or an upgraded map 891.

Localization accuracy for the SLAM device 801 on the map, as needed for the SLAM device 801, may be provided by the distributed SLAM network edge service 841 illustrated in FIGS. 8C-8D, based on the image data received from the SLAM client 811 of the SLAM device 801 and based on the IMU data received from the SLAM client 811. The SLAM network edge service 841 provides a level of localization accuracy needed at the moment for the SLAM device 801, as explained herein. The SLAM network edge service 841 may be a base station for a mobile telephony system or other network, may be stationary or mobile, airborne, on the ground or water, or may itself be a SLAM device that moves autonomously and needs to be localized on the map.

Figure 9:
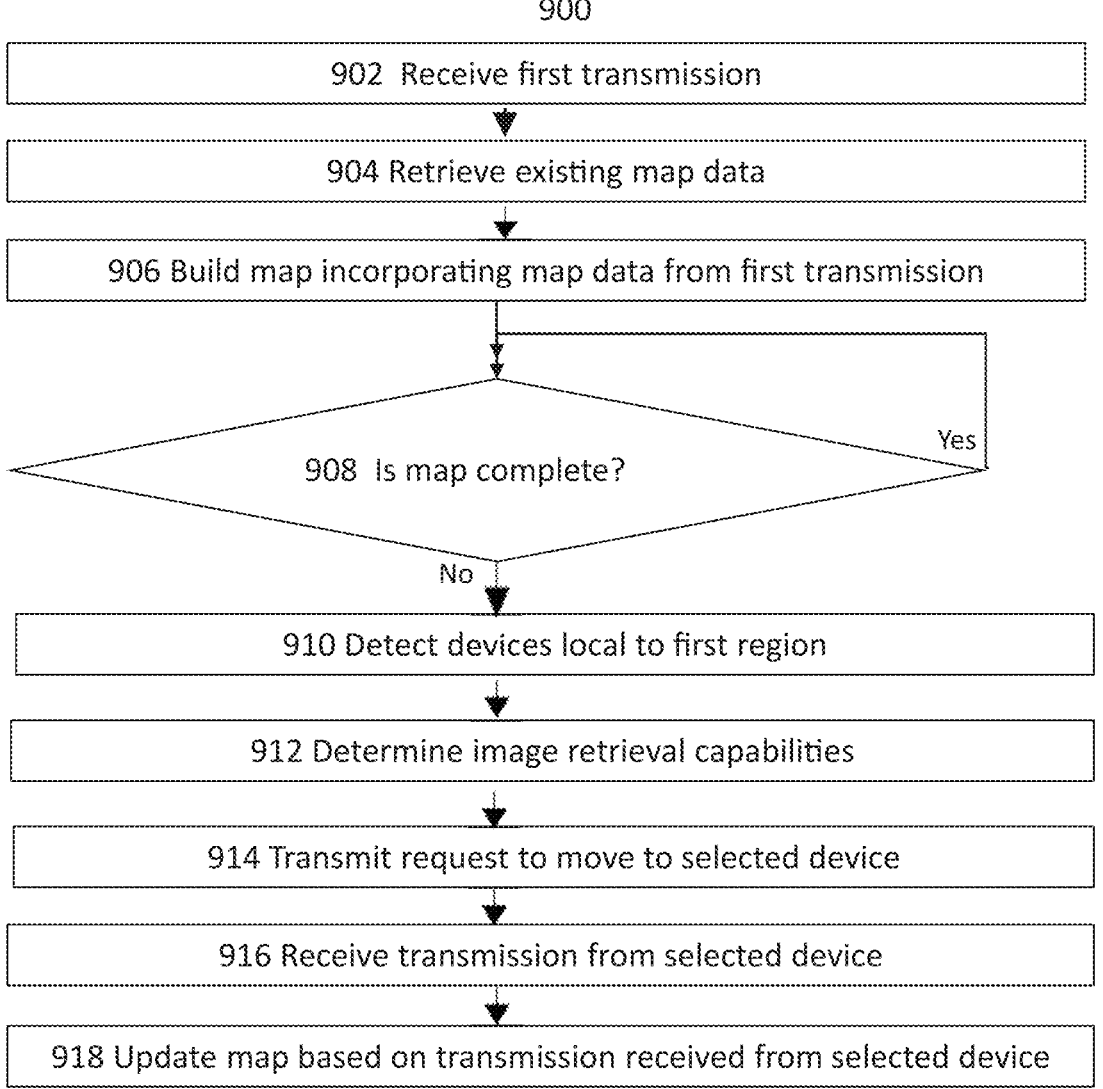
FIG. 9 illustrates an example of a method for a collaborative map generating process in which a device is guided to provide additional map data for a target area, according to an aspect of an embodiment.
Figure 10B:
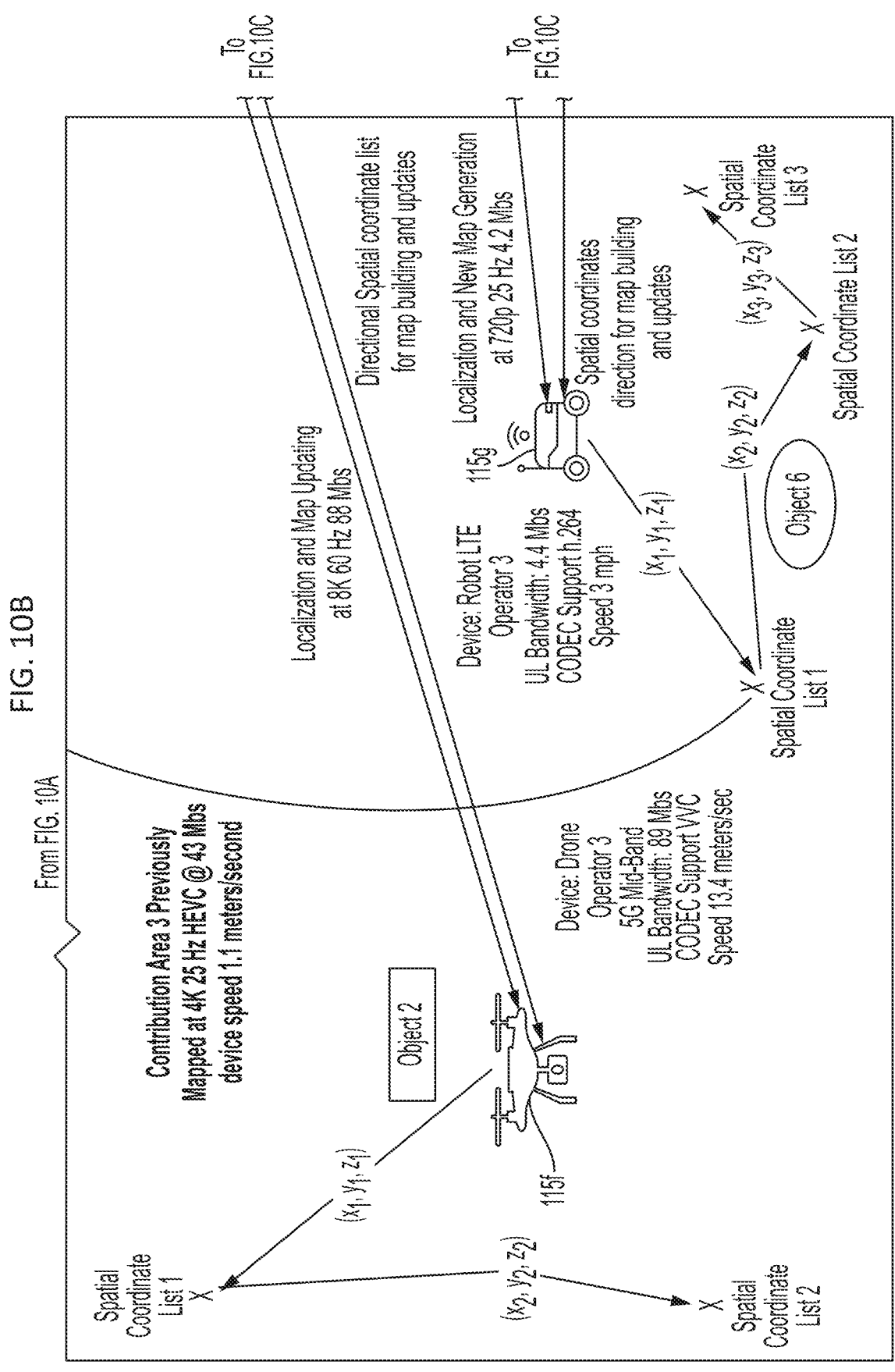
Figure 10D:
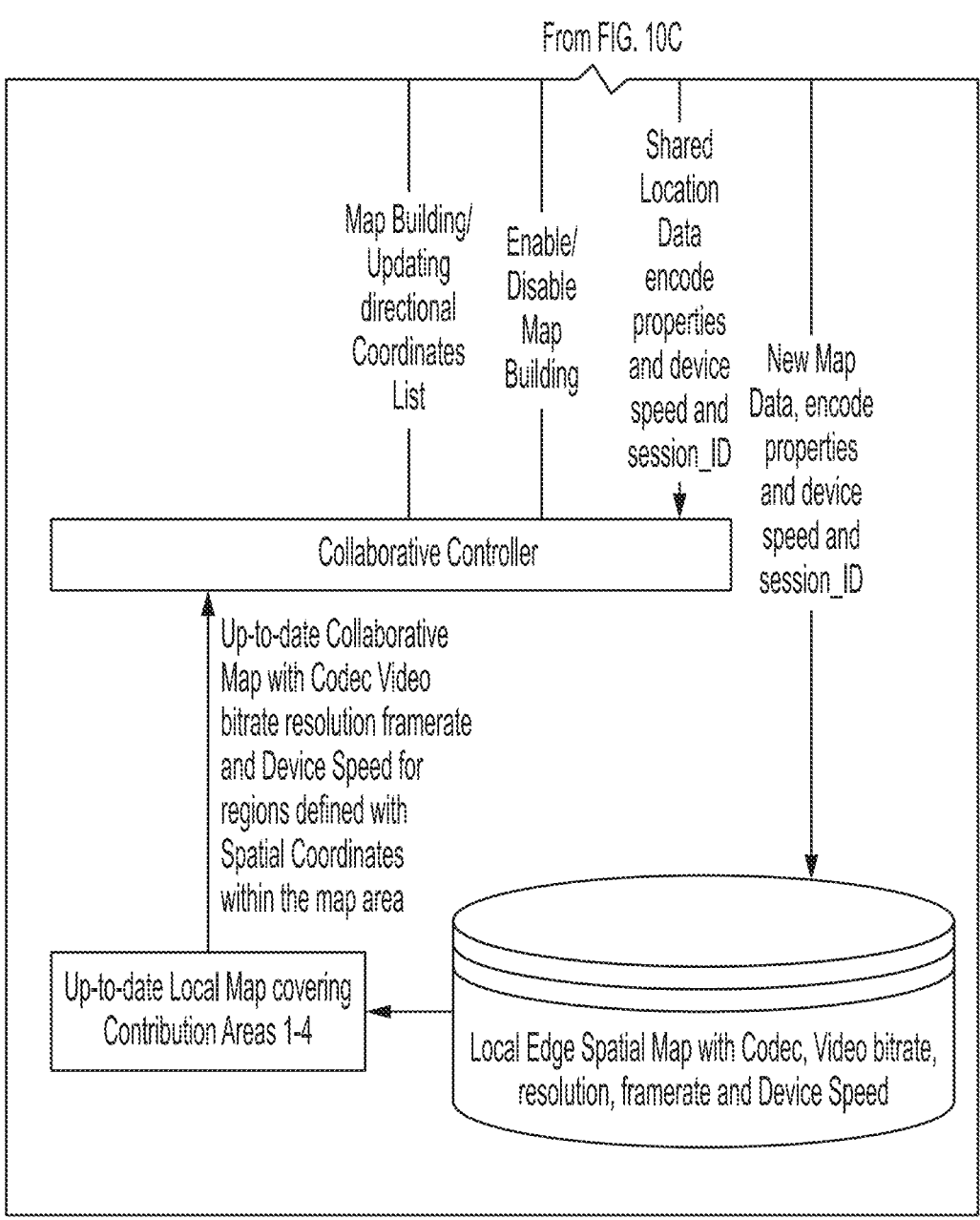

FIG. 9 shows a flowchart for a process 900 according to an aspect of the disclosure. The method 900 may be implemented, in whole or in part, by the system 599 shown in FIG. 5, the system 841 shown in FIGS. 8C-8D, or the system 801 shown in FIG. 8A. One or more actions of the method 900 may be incorporated into or combined with one or more actions of any other process or embodiments described herein. The method 900 may be saved to a memory or storage (e.g., of the systems shown in FIG. 5) as one or more instructions or routines, which may be executed by any suitable device or system having access to the memory or storage to implement the method 900.

As shown in FIG. 9, the system at 902 may receive a first transmission providing map data for the first region 101. At this stage, the system may already have some of the map built for the first region 101 based on earlier transmissions from the same or different devices.

The system may have or may generate at preliminary map for the first region 101. At 904, the system may retrieve this existing map data for the first region 101. The map data may also include target area 103. However, the map data for the target area 103 may be preliminary at this point. For example, an earlier device may have had a camera at a low vantage point and thus may not been able to reach high furniture or other high fixture points. Accordingly, the system would lack a full 3D map of the area. Or, earlier devices may have sped through the area and not captured sufficient data, or may have transmitted only low resolution images or low frame rate images.

At 906, the system incorporates the map data received in the first transmission into the map. The received map data may be for an area of the first region 101 that was not previously mapped or may enrich the map for a portion of the first region 101 for which the system already had a rough map.

At 908, the system determines whether the map is complete for the first region 101. The amount of data that is required to deem complete the map for the first region 101 may vary based on the needs of the devices in the area. In general, devices moving at a higher speed may require more precision in the placement of objects or obstacles in the first region 101. Accordingly, the system may determine the map to be incomplete at 908 if it determines that devices in the first region 101 typically move or have moved at a higher speed. A high speed may be a speed that causes damage to the devices or to surrounding objects upon impact. For example, a 20 km/hour speed or a speed of above 40 km an hour maybe deemed to be a high speed that requires a finer resolution map. In addition, movement of heavier devices may also call for greater caution and a higher map resolution. For example, an autonomous vacuum cleaner in a residential application may be deemed not to be a heavy device, however some industrial equipment or an autonomous automobile maybe deemed to be a heavy device.

At 910, the system detects local devices in or near or approaching the first region 101. One or more devices may be detected. In addition, or instead of the detecting of the devices, the system may know that one or more devices are scheduled to approach or to be in the first region 101. For example, some industrial applications may have moving at predetermined times or at predetermined intervals through or in the first region.

At 912, the system may determine the image retrieval capabilities of the devices determined to be in or near or approaching the first region 101. Central processor 111 may send a signal requesting devices in the first region 101 to respond, in response to the determining that the map is incomplete. Or, the central processor 111 may be interacting with devices in or near the region 101 in the process of providing localization or other services to the devices in or near the first region.

One or more candidate devices may respond or be known to be in or near the first region 101. Central processor 111 may select the second device 115 from among the candidate devices to be the one to be requested to approach the target location 105a based on a variety of factors in addition to image quality parameters. For example, the second device 115 may be more proximate to the target area 103a or to the target location 105a, or the second devices 115 may be selected based on capabilities of the second device 115. The central processor may query the second device 115 and other candidate devices as to their height, width, or other dimensions to determine whether the device can fit through or under various furniture items or other features of the landscape, as to the position or orientation of its camera, as to the height of its camera, or as to the type of its other sensors. For example, the central processor may determine that given current night time lighting conditions in the target area 103, the second device 115 is well suited to capture a portion of the target area 103 because of its lighting equipment but other candidate devices would not be well suited. Or, the central processor 111 may determine that the second device 115 has night vision infrared sensors or LIDAR while other candidate devices do not. In an embodiment, the central processor 111 may query the second device 115 as to its previously set itinerary and select the second device 115 to avoid requesting other candidate devices from having to deviate from their previously set itinerary. Or, the second device 115 may be chosen for the task because it is a flying device that is thus able to capture images from a higher vantage point or faster. In addition or instead of requesting such information about the candidate devices and their cameras from the one or more candidate devices, the central processor 111 may already have stored, or have access to such information. For example, one or more of the candidate devices may have previously collaborated with the central processor in building map data and thus such information may be stored for each such device in association with the portion of the map data it provided.

At 914, the system may transmit a request to the second device 115 to move to the target location 105a. The target location 105A may be only the first of a series of target locations 105a, 105b that the system transmits to the second device 115. That is, depending on the size and layout of the target area 103 and the capabilities of the second device 115, the second device may be requested to move through a sequence of target locations.

The second device 115 may move to the target location 105 in, near or over the target area 105. The second device 115 may confirm that it has captured image data for a requested range of the target area 103 before transmitting a third transmission 125 to central processor 111.

At 916, the central processor 111 receives the third transmission 125 containing map data of the target area 103. The central processor 111 may then request additional map data from the second device 115 or from one or more other devices if it determines that the map is still not complete.

At 918, the central processor 111 may use the received map data to improve, to expand, or to make more detailed the map data of the first region 101. The central processor 111 may transmit the map data that incorporates the addition map data, or may transmit relevant portion thereof, to devices operating in the first region 101. In addition, or instead, the central processor 111 may transmit guidance data or navigation instructions to devices in the first regions 101, instead of, or in addition to, the map data. For example, in the off-loaded configuration shown in FIGS. 7B and 7C, the central processor 111 may handle many of the processing tasks necessary for navigating devices in the field, and thus provide guidance data or navigation instructions to devices, instead of map data.

FIGS. 10A-D illustrate that the central processor 111, illustrated by way of example as a SLAM network edge system 841, is in communication via network 831 with several devices 115a-115g (referred to in FIG. 1 as the second device 115) in or flying over the first region 101.

Second devices 115A-115G may use a variety of networks, including cellular networks, Wi-Fi, satellite links, and the like to communicate with the SLAM network edge system 841.

As illustrated in FIGS. 10A-D, the first region 101 may have more than one target areas 103 or target objects, object 1-object 6, that the second devices 115A-115G must navigate to provide additional map data to the SLAM network edge system 841. The SLAM network edge system 841 may manage simultaneously one or more sessions with second devices 115a-115g to update the map. The SLAM network edge system 841 may keep track of, or request, for each of the second devices 115a-115g information about the sensor collection abilities and data throughputs of each device, as well as the codec used and the speed with which the device is moving. As discussed, such information may be useful for determining by the SLAM network edge system 841 where to direct each of the second devices 115a-115g, and to classify the quality of the map data received from each device. For example, a second device 115a that is more proximate to a target area then a second device 115b may be preferred for that target area, or the second device 115c may be chosen based on its image data retrieval capabilities or that of its sensors. While sometimes referred to as a camera, it will be understood that other sensors may be used in addition to or instead of camera. Also, a camera may operate in the visible light mode, the IR, UV, radio, microwave bandwidths or in a combination thereof.

Figure 11:
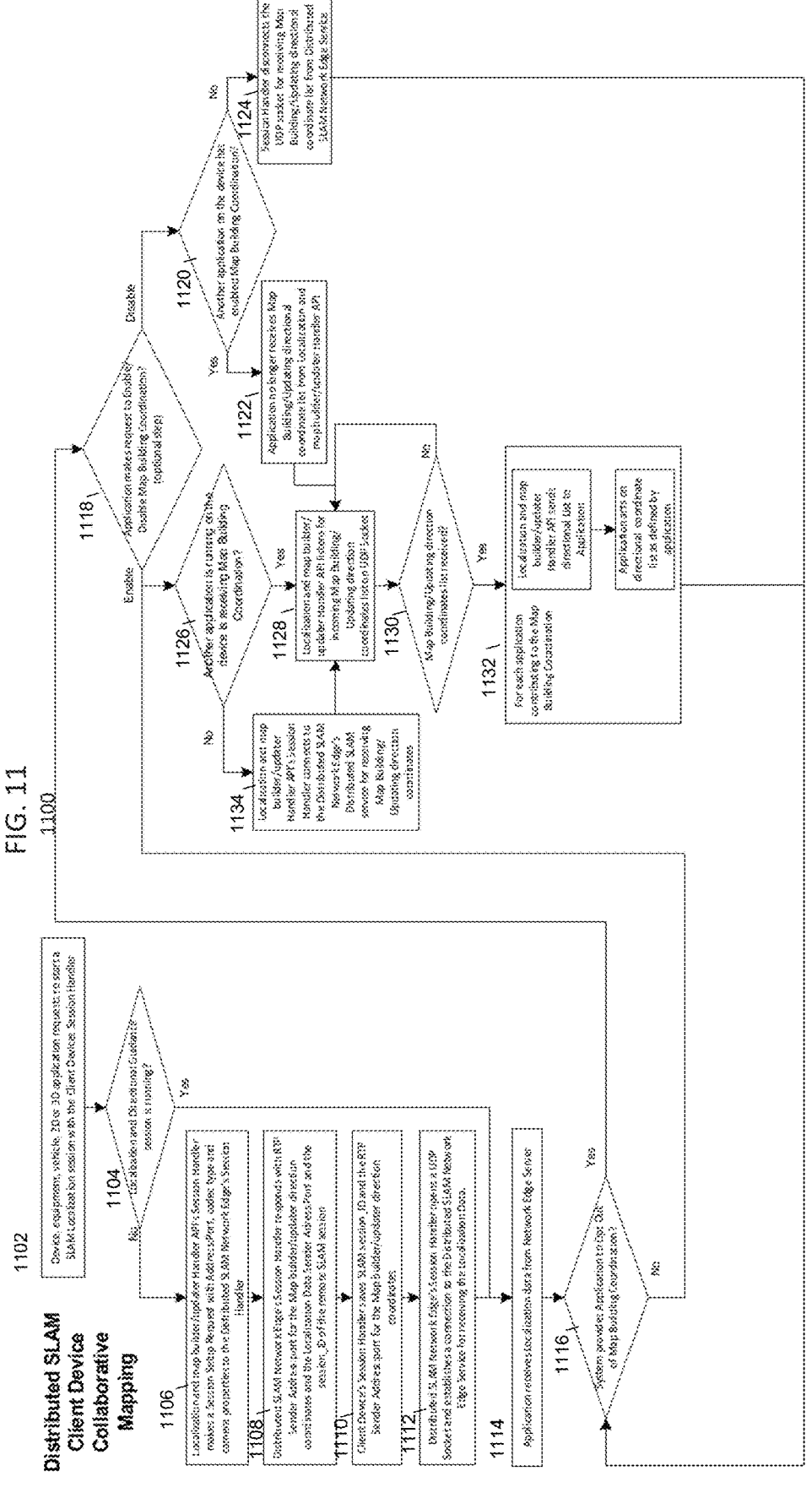
FIG. 11 illustrates an example of an initiation of a collaborative map generating process in which a SLAM network edge communicates with a device in a region of the target area, according to an aspect of the disclosure.
Figure 12B:
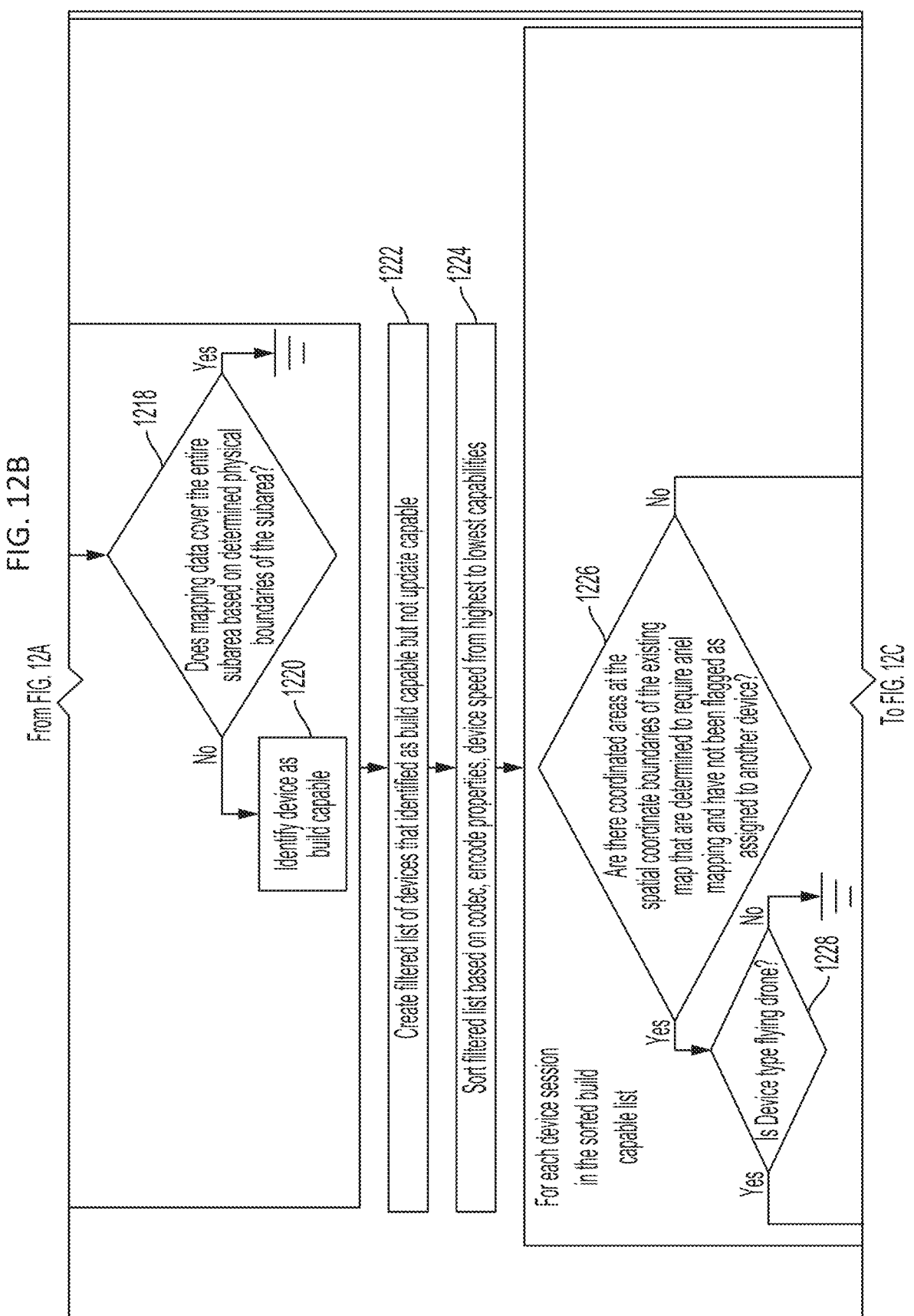
Figure 12C:
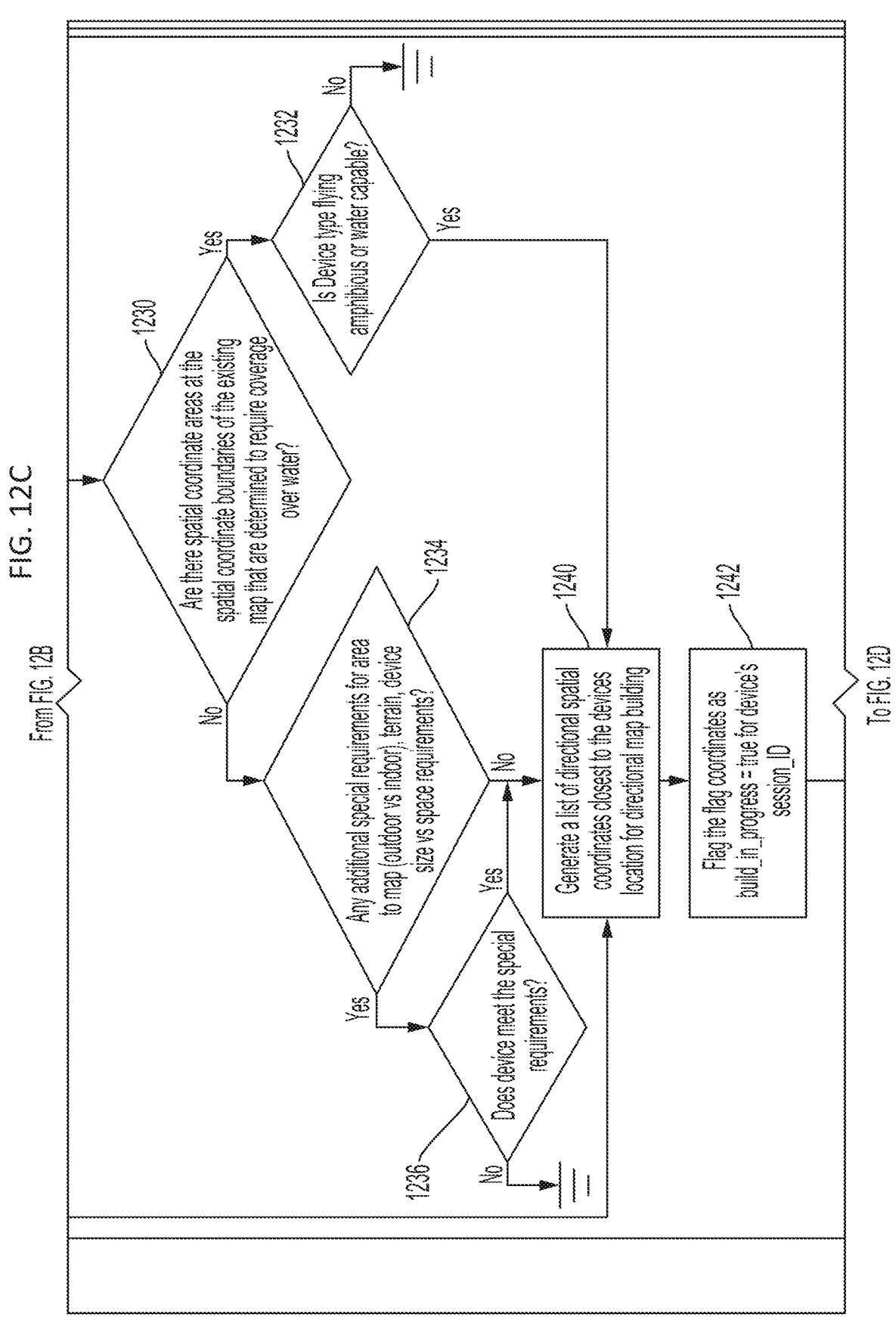

FIG. 11 shows a flowchart for a process 1100 for establishing communication for map building collaboration between (i) the device 801 running the SLAM client 811 and (ii) the SLAM network edge service 841, according to an aspect of the disclosure. At block 1102, the device 801 determines the need for starting a SLAM localization session with the SLAM network edge service 841. For example, the device may move to a new area, which may trigger the device 801 requesting a new SLAM localization session. In an embodiment, the SLAM network edge service 841 may initiate the SLAM localization session, for example, upon determination that the map data corresponding to the target area 103 is incomplete, and detection of the device 801 in, near, or approaching the first region 101.

At block 1104, the device 801 determines whether a localization/guidance/map data gathering session with the SLAM network edge service 841 is already in progress. If yes, then processing may move directly to block 1114

If such a session is not in progress, then at 1106, the device 801 may initiate a session setup request to the SLAM network edge service 841, providing information for the session, such as address: port, codec type to be used by the device 801, and camera properties, including image resolution, framerate, and the like. Additional information, such as a current speed and/or orientation of the device 801, IMU data, type and model of the device and of the camera, heading and destination of the device 801, height of the device and height of the camera onboard the device, and the like, may also be provided to the SLAM network edge service 841. Also, such information as speed and/or orientation of the device may be automatically periodically, or occasionally, or upon request by the SLAM network edge service, updated to the SLAM network edge service 841 by the device 801 or they may be reported automatically upon the occurrence of changes to one or more of these parameters.

At 1108, session handler of the SLAM network edge service 841 may respond to the request received by transmitting information regarding RTP sender address: port and the session ID of the SLAM session. At this point, the SLAM network edge service 841 may also request additional information from the device 801, such as IMU data for the device, type and model of camera, heading and destination of the device 801, height of the device and height of the camera onboard the device. Additional handshake processes may take place. At 1110, the client device 801 may save session information, and at 1112, the SLAM network edge service 841 may open a UDP socket or otherwise establish a connection.

At 1114 it is determined whether the device may opt out of map building collaboration with the SLAM network edge service 841. In an embodiment, such map building collaboration the SLAM network edge service 841 is required for the SLAM network edge service 841 to provide localization services to the device 801. At 1116, the SLAM network edge service 841 may allow the device 801 to opt out of the map building process.

At 1118, it may be determined whether the application 811 of device 801 requests that map building collaboration be enabled or disabled. If the application has disabled map building collaboration, then at 1120 the system may determine whether another application on the device 811 has enabled it, in which case the application that has disabled the map building collaboration may no longer receive updates, as shown at 1122. If no other application on the device 811 has enabled map building collaboration, then the UDP socket may be disconnected, as shown at 1124. Otherwise, additional processing may be performed if the map building collaboration process is enabled by the application: Various applications on the device 801 may then have access to the localization information received from the SLAM network edge service 841 if it is determined at 1126 that an additional application running on the device 801 has also requested map building collaboration, then at 1128 map updating is listened for, and if at 1130 map updating data/a direction coordinate list is received, then at 1132 for each application on the device 801 participating in the map building collaboration, updates are sent to the application and the application acts on the information received. If no other application on the device 801 is receiving map building coordinates, then at 1134 updates are sent to the application and the application acts on the information received by the device 801 via the connection with the SLAM network edge service 841.

FIGS. 12A-12F illustrate a method of map building control 1200 as the SLAM network edge service 841 orchestrates map building and updating by one or more SLAM devices 801 in the first region 101. At 1202, the SLAM network edge service 841 updates the map it has based on available sources. Such sources may include databases for the first region 101 in addition to previously map data that it has.

At 1204, the SLAM network edge service 841 receives from each device 801 information such as codec type to be used by the device 801, camera properties, including image resolution, framerate, current speed and/or orientation of the device 801, IMU data, type and model of the device and of the camera, heading and destination of the device 801, height of the device and height of the camera onboard the device. Some or all of this information may have been previously stored by the SLAM network edge service 841 for each device and may have been stored in association with each portion of map data so that the quality of the portion of the map data may be referenced later.

At 1206, the SLAM network edge service 841 may receive a confirmation from all devices in the first region 101 that enable map collaboration session with the SLAM network edge service 841. In an embodiment, a device 801 may be engaged in another task and request a delay in the collaboration in the map making/updating until the first task is complete. For example, capturing images for map making may require the device 801 to move to a target location 105, or may require that device 801 transmit large amounts of image data, which may be incongruous with the task undertaken currently by the device 801.

At 1208, the SLAM network edge service 841 creates a map with the location of each device in the first region 101. The session ID for each device may be the key that is used to identify each device in the first region 101.

At 1210, the SLAM network edge service 841 generates a list of identified devices in the target area 103 of the first region 101 that are currently not in map building mode. Devices that opt out of collaborative map building may not be added to the list.

At 1212, the SLAM network edge service 841 retrieves quality metrics of map data corresponding to the target area 103. In an embodiment, this determination may be made earlier in the method 1200, for example, the location of devices in the target area 103 may not be identified if it is determined that no further map data is needed for the target area 103.

At 1214, the SLAM network edge service 841 determines whether a device 801 would be able to improve the quality of the map data. For example, the SLAM network edge service 841 may determine whether the device 801 has a camera with image resolution or framerate capabilities that enable it to capture image data superior in some way to the map data that the SLAM network edge service 841 has for the target area 103 or for a portion thereof. Additional parameters that may make the device 801 a good candidate for being able to provide improved image data include a current lower speed of the device 801 than the speed of the device that previously captured image data for corresponding portions of the target area 103, height of the device 801, width of the device 801, which may enable the device to enter some spaces, height of the camera onboard the device 801, ability of the device to fly, which may enable the device to gather data faster or from a better vantage point or from taller portions of objects.

If it is determined that the device 801 would be able to contribute improved data, then at 1216, the SLAM network edge service 841 flags the device 801 as update capable. The device 801 may be capable of improving the map data in some portions of a target area 103, but not in others, according to the quality of the previously compiled map data.

If it is determined that the device 801 would not be able to contribute improved data, then at 1218 the SLAM network edge service 841 determines whether quality map data for the entire target area 103 exists. If yes, then processing may stop for the method 1200.

On the other hand, if at 1218 the SLAM network edge service 841 determines that the map data may be updated, then at 1220 it flags the device 801 as map build capable. According to an embodiment, the SLAM network edge service 841 may delay notifying the device 801 until the SLAM network edge service 841 has created a list of all the devices that will participate in the map generation collaboration effort for the target area 103. For example, in a game context, contestants in the field using devices may compete for finding and reaching target locations 105a, 105b, . . . 105n, and thus all the devices may be notified at once. In this way, at 1222 a list is generated of devices capable of providing data for initial map building but not necessarily of providing data for map updating.

At 1224, the SLAM network edge service 841 may generate a list of devices deemed to be build capable for the target area 103. FIG. 10 illustrates devices 115a-115g in the first region 101 that may participate in the collaborative map building.

At 1226, the SLAM network edge service 841 determines whether aerial mapping is needed or desirable for the target area 103 or a portion thereof. Map data for some indoor as well as outdoor target areas 103 may be improved by aerial mapping.

If yes, then at 1228, the SLAM network edge service 841 determines whether the device 801 is a flying drone or other flying equipment. If the answer is "no," then processing before method 1200 may stop for this device in this subprocess.

At 1230, the SLAM network edge service 841 determines whether map data generation for the target area 103 requires or may benefit from coverage over water. For example, a portion of the target area 103 may be a lake or other body of water, or access to the target area 103 may require traversing water.

If at 1230 water capability is determined to be desirable or necessary, then the SLAM network edge service 841 determines at 1232 whether the device 801 is capable of flight, traversing water or amphibious maneuvers. If not, then processing may stop for this device for this subprocess.

If at 1232 water capability is determined for the device 801 then at 1240 the SLAM network edge service 841 generates a list of coordinates of target locations 105 where target area map data may be captured by the device. The list may be selected based on proximity of the device to the coordinates. That is, the SLAM network edge service 841 may designate a target location 105 for a first available device instead of a second available device based on the proximity of the first available device to the target location 105, or based on known previous itinerary of the first available device. For example, the SLAM network edge service 841 may know or request the pre-existing itineraries (itineraries involving device work schedules or routines not involved in collaborative map building) of the devices participating in the collaborative map building and select a second device more remote from the target location 105 than a first device because the SLAM network edge service 841 may calculate that the pre-existing itinerary of the second device will be disturbed less by moving to one or more target locations 105a, 105b then would be disturbed the pre-existing itinerary of the first device.

If at 1230 water capability is not determined to be needed or necessary for the job, then at 1234 the SLAM network edge service 841 determines whether any other specific requirements are needed for map data gathering in the target area 105. For example, some terrains may call for an all-terrain vehicle, some types of tires or treads, very narrow and/or very low vehicle profile, very tall camera vantage point, very low camera vantage point, and the like.

If no, then processing may proceed to 1240. If yes, then at 1236 the SLAM network edge service 841 determines whether the device 801 has the special capability needed for the task. If not, then this subprocess may terminate for this device.

If the device is determined to have the special capability, then processing may continue to 1240. Selection according to special capabilities was earlier discussed.

At 1242, the coordinates may be flagged by the SLAM network edge service 841 as being in the process of being remapped, so that they are not assigned to another device, and the SLAM network edge service 841 may transmit the coordinates of the target location 105 to the device. The SLAM network edge service 841 may then remove the device from its list of available devices.

At 1250, the SLAM network edge service 841 creates a list of devices that remain available and are suitable for contributing data to generate an improved/updated map, and this list may be sorted based on the image capturing capabilities of the devices on the list. The sorting may be based on the device speed, camera image resolution, framerate, encoding properties, including bitrate transmission throughput. Codec version/type, etc. The list may be ordered from most capable along these dimensions to lowest.

At 1254, the SLAM network edge service 841 determines whether aerial mapping is needed or desirable for the target area 103 or a portion thereof. This portion of the process is analogous to the process for determining suitable devices for the initial map building, discussed above. Map data for some indoor as well as outdoor target areas 103 may be improved by aerial mapping.

If yes, then at 1256, the SLAM network edge service 841 determines whether the device 801 is a flying drone or other flying equipment. If the answer is "no," then processing in this subprocess for method 1200 may stop for this device.

At 1260, the SLAM network edge service 841 determines whether map data generation for the target area 103 requires or may benefit from coverage over water. For example, a portion of the target area 103 may be a lake or other body of water, or access to the target area 103 may require traversing water.

If at 1260 water capability is determined to be desirable or necessary, then the SLAM network edge service 841 determines at 1232 whether the device 801 is capable of traversing water or amphibious maneuvers. If not, then processing may stop for this device for this subprocess.

If at 1262 water capability is determined for the device 801, then at 1270 the SLAM network edge service 841 generates a list of coordinates of target locations 105 where target area map data may be captured by the device. The list may be selected based on proximity of the device to the coordinates. That is, the SLAM network edge service 841 may designate a target location 105 for a first available device instead of a second available device based on the proximity of the first available device to the target location 105, or based on known previous itinerary of the first available device. For example, the SLAM network edge service 841 may know or request the pre-existing itineraries (itineraries involving device work schedules or routines not involved in collaborative map building) of the devices participating in the collaborative map building and select a second device more remote from the target location 105 than a first device because the SLAM network edge service 841 may calculate that the pre-existing itinerary of the second device will be disturbed less by moving to one or more target locations 105a, 105b then would be disturbed the pre-existing itinerary of the first device.

If at 1260 water capability is not determined to be needed or necessary for the job, then at 1264 the SLAM network edge service 841 determines whether any other specific requirements are needed for map data gathering in the target area 105. For example, some terrains may call for an all-terrain vehicle, very narrow and/or very low vehicle profile, very tall camera vantage point, very low camera vantage point, and the like.

If no, then processing may proceed to 1270. If yes, then at 1236 the SLAM network edge service 841 determines whether the device 801 has the special capability needed for the task. If no special capability is deemed to be needed for the task, then this subprocess may terminate for this device.

If the device is determined to have the special capability, then processing may continue to 1270. Selection according to special vehicle/device capability was earlier discussed.

At 1272, the coordinates may be flagged by the SLAM network edge service 841 as being in the process of being remapped, so that they are not assigned to another device, and the SLAM network edge service 841 may transmit the coordinates of the target location 105 to the device. The SLAM network edge service 841 may then remove the device from its list of available devices.

The SLAM network edge service 841, at 1280, determines whether has been updated according to the best current capabilities of each contributing device. For example, the SLAM network edge service 841 may store the model number of the devices camera, codec, etc. and thus know what the capabilities of each components is to deliver best quality images, framerates, etc.

At 1282, the SLAM network edge service 841 may determine whether the device has transmitted the task it was assigned. For example, the SLAM network edge service 841 may determine whether the device transmitted map data for each of the target locations 105 assigned to it.

At 1290, the SLAM network edge service 841 may determines exception states for each device. For example, if the device 801 enters a disabled state or leaves the first region 101, then at 1290, the SLAM network edge service 841 may reassign remaining target locations 105 to remaining devices.

Figure 13:
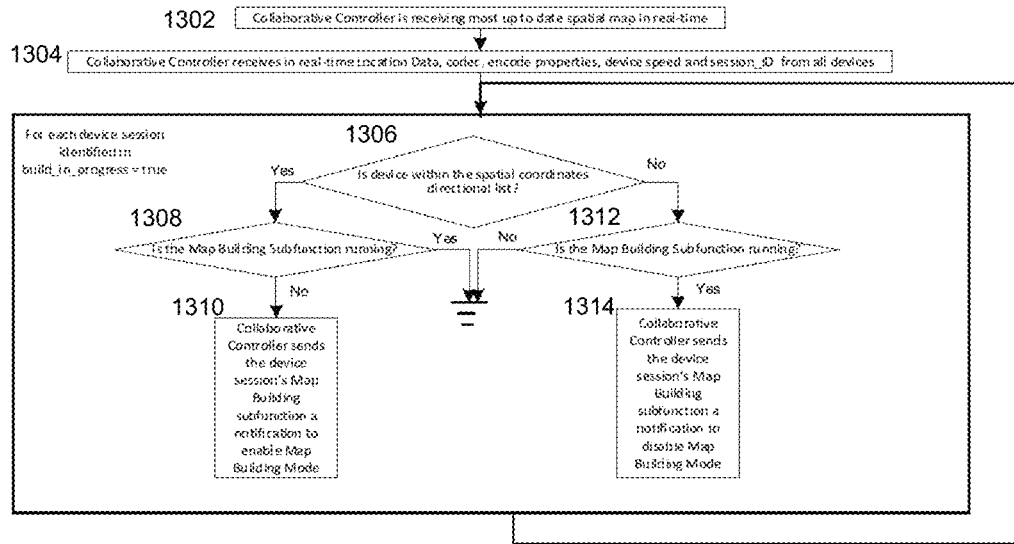
FIG. 13 illustrates an example of a method performed by collaborative mapping controller of the SLAM network edge service to control the collaborative mapping session for each device, according to an aspect of the disclosure.

FIG. 13 illustrates a method performed by collaborative mapping controller of the SLAM network edge service 841 controlling the collaborative mapping session for each device. At 1302, collaborative mapping controller of the SLAM network edge service 841 receives the most up to date map data. This may be performed in real time while other devices 801 are still on their appointed rounds capturing map data.

At 1304, collaborative mapping controller of the SLAM network edge service 841 receives real-time location data, codec, encode properties, device speed and other such information, as well as data about the state of camera and/or other sensors. Information regarding data traffic conditions, and noise to signal ratios due to ambient conditions may also be received. Devices behind hills or other obstacles may not be transmitting as efficiently or as fast as normal, for example.

At 1306, collaborative mapping controller of the SLAM network edge service 841 determines for each device session whether the device is within the area of the coordinates list that had been assigned to it. For example, the device 841 may be on the list of devices deemed capable of updating the map data, shown at 1250 of FIG. 12. If yes, processing continues to 1308.

At 1308, the system determines whether the device is currently in map building mode. If the device is not currently running the map building subfunction, then at 1310, collaborative mapping controller of the SLAM network edge service 841 transmits a notification to enable map building mode. For example, the device may have exited map building mode for a variety of reasons, for example, to take care of an urgent local task, because it was interrupted by a lack of power or because it was turned off unexpectedly.

If at 1306, collaborative mapping controller of the SLAM network edge service 841 determines that the device is not within the area of the coordinates list that had been assigned to it, then at 1312, the SLAM network edge service 841 determines whether the map building subfunction is running. The device 801 may still have the map building function running but not be in the area identified by the coordinate list. If so, then at 1314 the SLAM network edge service 841 transmits to the device a notification to disable map building. Since the device 801 is no longer operating within the area specified by the coordinates list, the device should no longer be participating in collaborating on the map building.

Figure 14A:
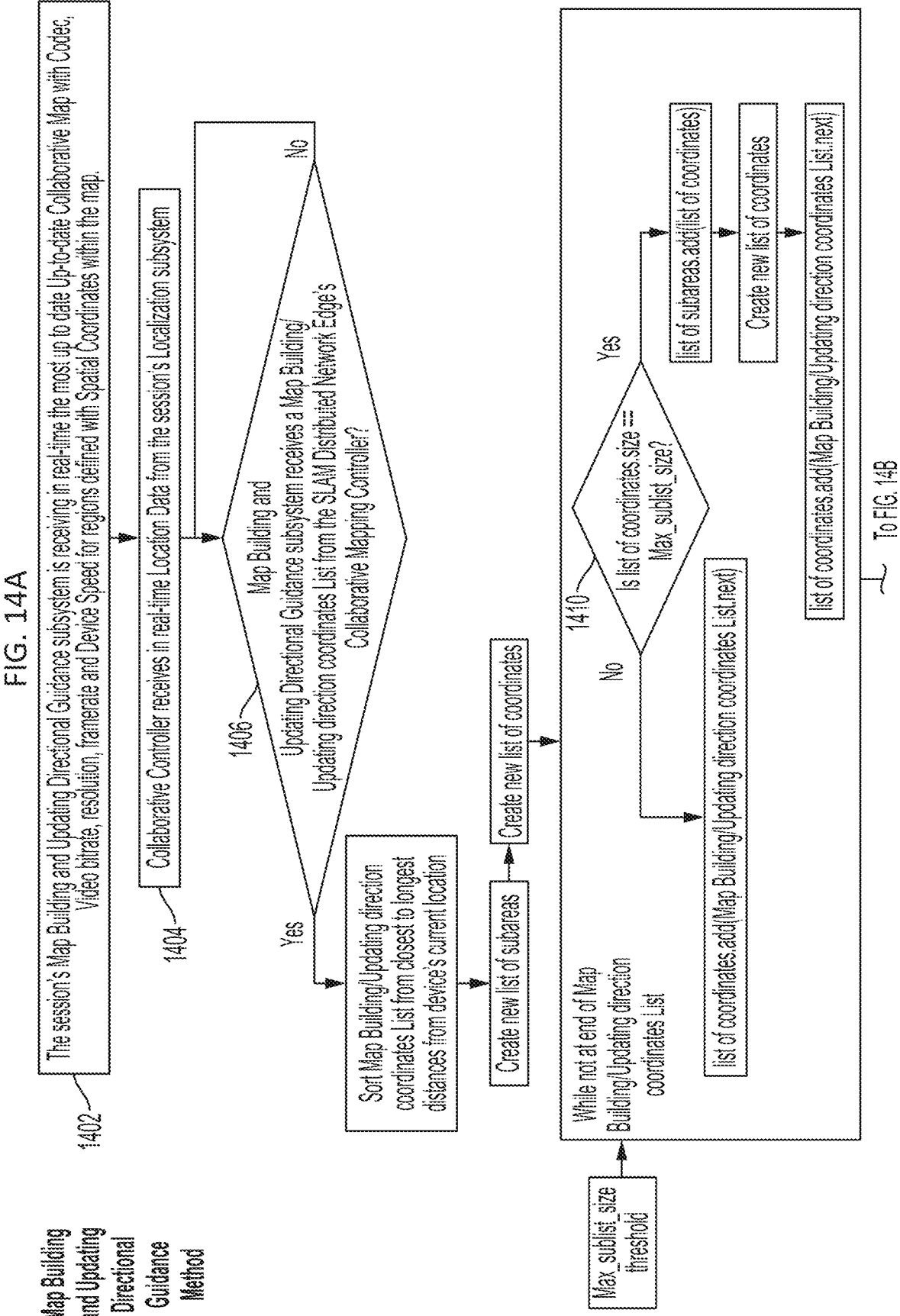

FIGS. 14A-14B is a flowchart showing an example of a process performed by the SLAM network edge service 841 for orchestrating map data capturing by devices 115*a-g* shown in FIGS. 10A-D (referred to in FIG. 1 as the second device 115). In this method, the SLAM network edge service 841 narrows down the Directional Spatial Coordinate List into a subareas list for the device. This may be done to prioritize the most efficient routes for collecting data by the client device. The map building/updating processing will continue in a subarea until the device has completed building or updating the subarea. Once the subarea is complete, the next subarea will be sent to the client device for map building/updating. At 1402, map building and updating directional guidance subsystem of the SLAM network edge service 841 receives in real time the most recently updated map, including sensor information such as framerate, image resolution, video bitrate, codec used, device speed and other such information associated with captured map data. Such information informs the quality of the map and may determine whether updating the map with better quality map data is needed or is desirable. Map Building and Updating Directional Guidance module may receive directional coordinates list from the new Collaborative Mapping Controller and may also receive and track in real-time the exact location of the device 115 within the level of accuracy based on the network QoS (quality of service) and the current video encoding bitrate, resolution, frame rate, and device's speed. Based on the directional coordinate list, Map Building and Updating Directional Guidance may narrow down the list to a narrowed list of spatial coordinates ordered by priority as determined by the device's location with respect to the target area 103.

At 1404, the collaborative controller of the SLAM network edge service 841 receives real-time location data from the localization subsystem. This provides data on the whereabouts of the devices.

At 1406, if the map building and updating directional guidance subsystem of the SLAM network edge service 841 receives a coordinate list of target locations 105*a*, 105*b* remaining then It may sort the list by distance of the device from the target locations 105*a*, 105*b*. For example, the device may be requested to proceed first to target locations closer to the device than to target locations farther away.

At 1410, the SLAM network edge service 841 determines whether this device has completed collecting mapping data from the list of target areas that were assigned. If "yes," then a new list may be created. If not, then the next coordinates on the list may be added.

At 1420, the SLAM network edge service 841 determines the next list and based on this coordinates are sent to the client device 115. Updates to the map are checked. The map may have been updated based on transmissions from one or more devices roaming the target area 103.

While map building remains unfinished for additional subareas, the SLAM network edge service 841 transmits coordinates for map building or updating to the client device's localization and map builder/updater handler API.

At 1430, the SLAM network edge service 841 determines whether this client device's sensor information such as framerate, image resolution, video bitrate, codec used, device speed and other such information associated with captured map data, is sufficient to add to the data quality of the target area 103. For example, it is determined whether this client device 115 can capture improved image data for the map. If "yes," then the SLAM network edge service 841 transmits a coordinate list to the client device 115. If it is determined that this client device cannot capture improved image data for the map, then the SLAM network edge service 841 checks these coordinates within the map for the most up-to-date collaborative map data quality and returns to 1430 to determine whether this client device's sensor information such as framerate, image resolution, video bitrate, codec used, device speed and other such information associated with captured map data, is sufficient to add to the data quality of these coordinates on the map, so that the map may be enhanced. The client device thus continues to collect map data and to transmit them to the SLAM network edge service 841.

FIG. 15 is a table showing examples of optimal minimum required framerates corresponding to device speed rates. In general, the faster the speed of a device 115 as it moves through or over a target area, the faster framerate/second that is necessary to capture quality map data.

For example, a device moving 2.2-3.49 meters/second would need to be able to capture 20 frames/second at a minimum for optimal map data. Such framerates and device speeds may be stored in association with map data, as each portion of map data is added to the map that is generated. It will be understood that the values of the table in FIG. 15 are provided by way of illustration only.

FIG. 16 is a table showing examples of encoding bitrates, resolutions, and framerates for optimal map building. This example uses MPEG h.264 (AVC), MPEG h.265 (HEVC) and MPEG h.266 (VVC) codecs.

The table in FIG. 15 may be used to determine the framerate based on the speed of the client device 115, and this may be used as input for selection of encoding parameters for the table shown in FIG. 16. The columns, Resolution and Frame Rate, are particularly useful for localization and device speed that are used to determine the encoding parameters for optimal map building at different bitrates. These values may be stored along with the corresponding map data when a map is created or updated. A comparison of incoming device codec, encoding properties and device speed may then be made with this data along with the data of the table provided in FIG. 15 to determine the areas of the map that can or should be updated and, if devices are detected to be in the area, to determine which devices can contribute to the updating of the map given the devices capabilities for capturing map data.

Also described herein is a virtual guide image system in which users are guided by their devices using visual cues to scan target areas 103 of a first region 101. As shown in FIG. 2, the SLAM network edge service 841 may generate for display by a client device 211 a virtual object 201 to guide collaborative mapping of a target area 103.

One or more users may simultaneously collaborate to generate or to update a map. For example, as part of a game or other computer application, several users may compete in finding and reaching virtual object 201 placed throughout a first region 101. The SLAM network edge service 841 may generate the virtual objects to be seen by the client devices 211 and position them strategically so that as the device 211 moves through the target area 103 the mapping data is captured by the device 211. If improvements to the map data are called for, then the SLAM network edge service 841 may position virtual object 201 as needed for capturing of the improved map data. For example, if additional map data is needed about chair and table legs or under surfaces of table tops, then the virtual object 201 may appear to the wearer of device 211 to be positioned low, near or at the floor, so that in searching for and enriching the a virtual object 201, a low sweep of the target area 103 is made by the device 211. In this way, the sense of play is harvested to generate map data.

A variety of games or stories may be devised to impel players to move through the target area 103 and to do so in a way that captures data corresponding to the target area 103 or to portions thereof that are missing map data or for which map data could be improved. In an embodiment, a low-resolution proxy mesh, or low-quality map, may first be obtained, prior to or as a first activity of the game. The low-resolution proxy mesh may be used for navigation but may lack sufficient data for compilation of a high-resolution mesh. The low-resolution proxy mesh may be sufficient for the SLAM network edge service 841 to place virtual objects 201 as points of attraction. Generating a high-resolution scan mesh may be a goal of the system, with quality map data generated as users get sufficiently close previously unscanned target area to gather accurate LIDAR or other image data.

As shown in FIG. 2A, a light saber 213 may be used in concert with the device 211. For example, in the game, users may be awarded points for finding and reaching virtual objects 201 and then piercing or slicing through them with their light sabers 213. In this way, players would be induced to move to target area and then to find the next target area to find the next virtual object.

FIG. 17 shows a flowchart for a process 1700 for establishing communication for map building collaboration between one or more devices 211 running the SLAM client 811 and the SLAM network edge service 841, according to an aspect of the disclosure. At 1702, the SLAM network edge service 841 receives a transmission from device 211. This transmission together with others like it may be used to compile a rough map of the first region 101. The SLAM network edge service 841 may already have some or all of such map data from another source.

At 1704, the SLAM network edge service 841 determines the coordinates of the device with respect to the first region 101 and determines image retrieval capabilities of the first device 211. Such capabilities information may include camera image resolution, memory, framerate, bitrate of transmission of the device. The capture capabilities may also depend on factors such as height of the wearer or user of the device (ability to see taller portions of objects), weather the device is worn on the head, such as an HMD or carried in the hand (vantage point of the device), and the like. The SLAM network edge service 841 may query the device for this information or the SLAM network edge service 841 may already have this information, for example, based on the model number of the device, camera and other components. The SLAM network edge service 841 may obtain some or all of such map data from another source. The detection of the device 211 in or near the first region 101 may trigger the SLAM network edge service 841 to determine whether additional data is needed or desirable for the target area 103. According to another embodiment, the SLAM network edge service 841 may initiate the process of identifying devices capable of capturing map data in or near the first region 101 in response to determining that the map data is incomplete for a target area 103 of the first region 101.

At 1706, the SLAM network edge service 841 retrieves existing map data. The SLAM network edge service 841 may already have, or may access, some or all of such map data from another source.

At 1708, the SLAM network edge service 841 expands or improves the map based on the map data received in the first transmission. The SLAM network edge service 841 may store capabilities information of the type discussed above in association with the newly added data for the map.

At 1710, the SLAM network edge service 841 may determine whether for the first region 101 any further expansion of the map or improvements, such as resolution, image quality, etc. are called for. This may be determined based on the capabilities information stored for each portion of the stored map.

If the map is determined to be not complete, then the SLAM network edge service 841 at 1712 may determine the target location for image capture for the target area 103 of the first region 101 needing further image capture. The location would be driven by the coordinates of the target area 103.

At 1714, the SLAM network edge service 841 may transmit to the device 211 a virtual image or object 201 that appears at the target location 105a. The coordinates of the location of the appearance of the virtual image 201 may be chosen so that the device 211 has to traverse the target area 103, or a portion thereof, to reach it. In an embodiment, depending on the game, the virtual image 201 may be visible via the device 211 only from some angles or perspectives, or may be visible only from some distances. For example, if map data is needed for a target area 103 due south of the virtual image 201, and in the game points are awarded for "touching" the virtual image 201 using the lightsaber 213, then the virtual image 201 may be visible only when approached from the south of the virtual image 201 so that the wearer of the device 211 is induced to approach from that direction in order that map data of the appropriate target area 103 be captured by device 211.

At 1716, the SLAM network edge service 841 may receive a transmission of additional map data from the device 211. As shown in FIGS. 10A-D, the SLAM network edge service 841 may be receiving simultaneously in real time map data from a number of client devices according to the needs of target areas 103 and the positioning of virtual images 201 generated for them by the SLAM network edge service 841.

At 1718, the SLAM network edge service 841 may update the map based on the transmission received. Additional virtual images 201 may be positioned as needed for acquiring data for further portions of the target area 103 or may reposition the virtual image 101 if sufficient map data was not received for the recent target area 103. For example, the device 211 may have moved too fast to obtain a sufficient number of frames for a quality images, or may have been oriented away from one or more target objects or portions thereof.

Figure 18:
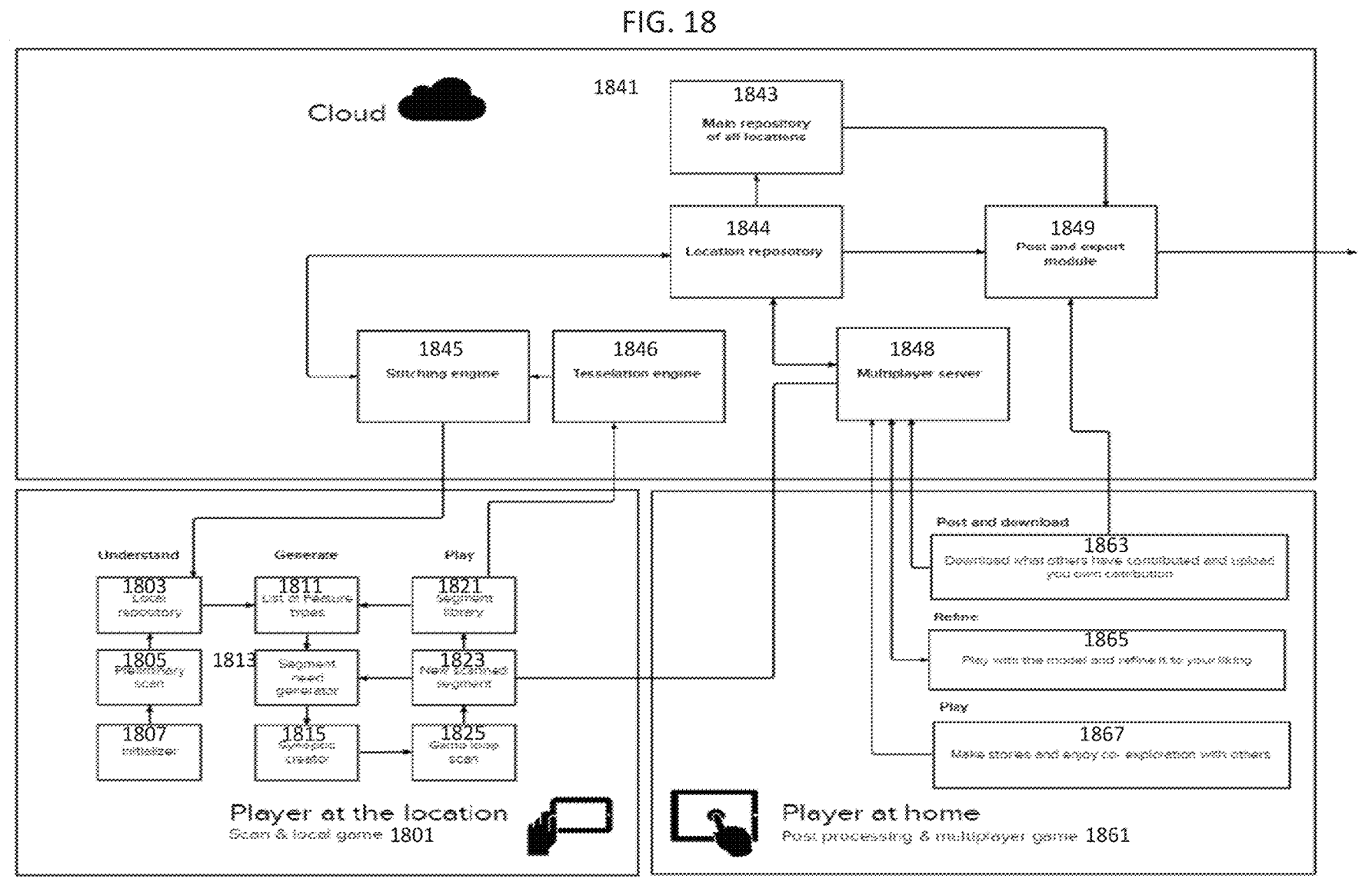

FIG. 18 is an overview of components of an example system, including the SLAM network edge service 1841, and the local device 1801 and the remote device 1861 that may interact with it. The main repository 1843 may be located offsite or onsite at the SLAM network edge service 1841. It may contain the combined and currently best version of scanned places as received from devices 1801 and from other sources. It may also contain a map based on the image data/scans received and IMU, GPS and/or Wi-Fi coordinate data corresponding to the location at which the images were captured.

Location repository 1844 may contain images and map data for a first region 101 based on data received from devices 1801 and from other sources. Tesselation engine 1846 may draw the interpreted shape of an object using polygons. Tesselation engine 1846 and stitching engine 1845 receive image data from one or more local devices 1801 and create a map based thereon with reference to the location and orientation of the submitting device 1801 and one or more cameras associated with the submitting device 1801. A plan, blueprint or layout of the first region 101, or portions thereof, may also be retrieved to build the map. A mesh engine may pull the master 3D file and compare it to incoming scan/image snippets to decide whether it is duplicative and, if so, whether it is of superior image quality or presents additional information to the data already on file.

Multiplayer server 1848 may coordinate local devices 1801, remote device 1861, game selection and game flow, including player turns and gameplay, user action, altering game states, virtual image generation, selection, positioning and orientation, game point awarding and tracking, game rule enforcement and game rule arbitration, and the like.

Local device 1801 may have or may have access to a local repository—a library of 3D and photo data from the scanned content for the first region 101 or portions thereof. This may include the some or all of the scans/images captured by this local device 1801 or may include scans/images captured by other local devices in the first region 1801. For example, in a game involving racing to obtain scans of a target area 103, the local repository 1803 may retrieve representative images indicating the status of scan capture by other players to add a sense of competition between players. Local repository 1803 may serve as a session buffer before upload of scans/images to the cloud.

Local device 1801 may also have a preliminary scan processor 1805 that prepares a rough sketch of the environment to generate collision and rough navigation meshes. These may be used by the game to direct the player into reasonable areas for scanning. Initializer 1807 may interact with the user of the local device 1801 to signal an opportunity to scan as part of a game, for example, in response to previously added data and invitation to play, based on coordinates of the local device 1801. The invitation to play received by the local device 1801 may be triggered by one or more of: (i) detection by the SLAM network edge service 1841 of the local device 1801 in or near or approaching the first region 101 or the target area 101; (ii) detection by the SLAM network edge service 1841 of another local device 1801 in or near or approaching the first region 101 or the target area 101, for example, if there is a known relationship between the local devices 1801 or their users (e.g. a family or school brings children together to a museum and each child uses a local device 1801); (iii) determination by the SLAM network edge service 1841 that further image data or improved image data would be needed or would be desirable for the target area 103; and/or (iv) an invitation or challenge to the local device 1801 from another local device 1801.

In addition, local device 1801 may have list of feature types module that lists what types of features to be scanned (e.g. doors floors, ceilings, lights and so on). It may interact with the user to provide alerts regarding these features. It may combine data form the preliminary scan 1805 and the local repository 1803. It may sort the hierarchy of needed scans based on what scans have accumulated thus far and what the local repository lacks. A segments need generator may compare the local repository against a current status of the location repository 1844 to identify holes in the mesh. This comparison may be performed instead, or in addition, or with the aid of the SLAM network edge service 1841. The segments need generator may also select or determine the types of virtual images 201 (e.g., monsters, ghosts, friendly helpers, statues, guides, objects that grab attention of the relevant audience, etc.) to generate and their placement. Synopsis creator 1815 may include game code that takes the result from the segment need generator and based on that decides a virtual image 201 to spawn including a text or voice prompt for the player to follow.

Also potentially include in local device 1801 may be a game loop scan 1821, which may be game code that takes the result from the segment need generator 1813 to
New Scanned Segment
   Game code that takes the result from the Segment need
      Generator and base
Segment Library
   Game code that takes the result from the Segment need
      Generator and base Also shown in FIG. 18 is a remote device 1861 that may view the progress of local devices 211a-e in the game, view all or parts of image data or maps generated, download the map and play using a virtual reality interface and device. For example, using the map developed and the image data available, the remote device 1861 may be a virtual reality device that provides the look and feel of navigating through the first region 101 and interacting with virtual images 201.

Figure 19:
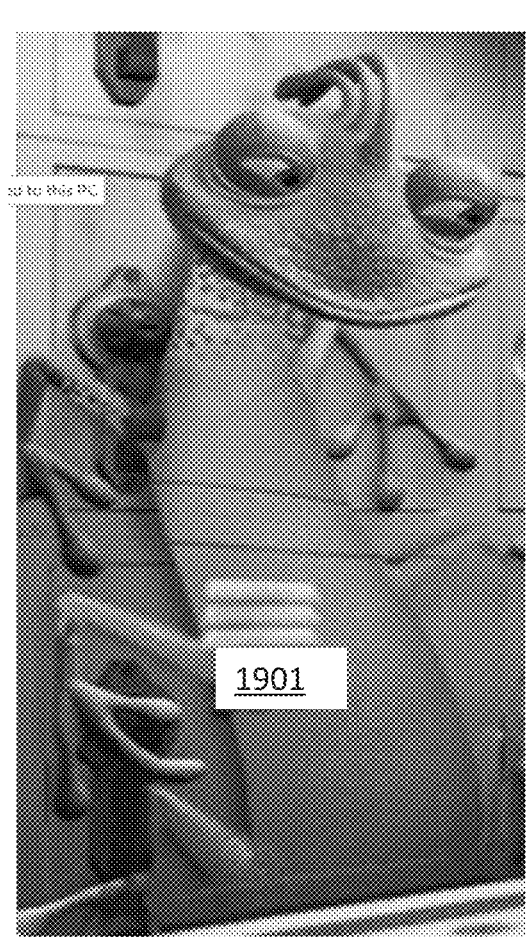
FIG. 19 shows a virtual monster as an example of a virtual object or image viewable via the local device, according to an aspect of the disclosure.

FIG. 19 is an example of a virtual monster 1901 that may be provided as a virtual image 201. Interaction with the virtual monster 1901 may be available via the local device 211a-e and/or via the lightsaber 213 or other handheld device in communication with the local device 211a-e and/or with the SLAM network edge service 1841.

Figure 20:
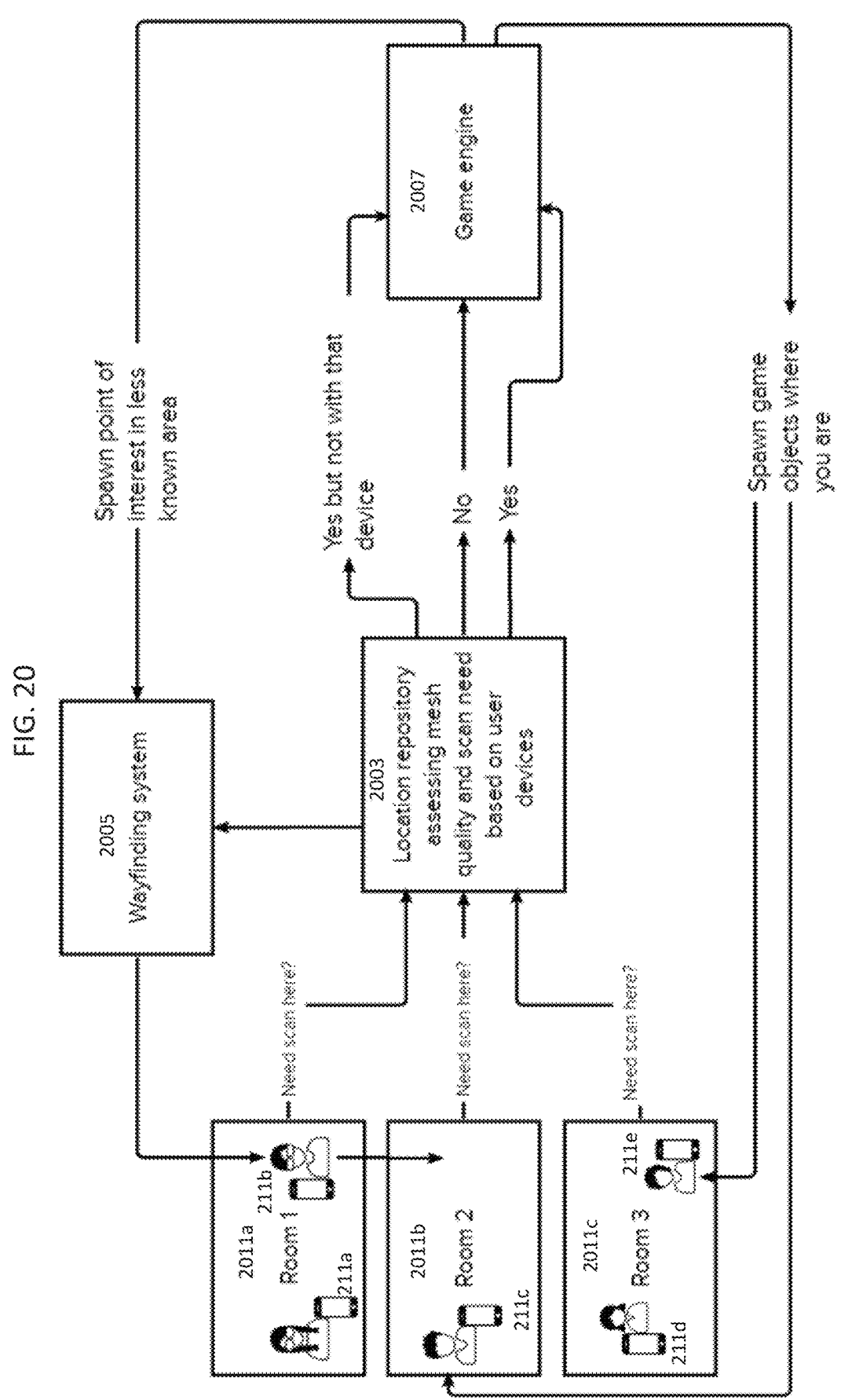
FIG. 20 is a logic flow diagram provided as an example of a logic flow for the virtual object guided scan generation, according to an aspect of the disclosure.

FIG. 20 is a logic flow diagram provided as an example of a logic flow according to the game embodiment of the present disclosure. As shown at 2003 of FIG. 20, the SLAM network edge service 1841 may determine that one or more devices 211a-211e may be in or close or approaching a target area 103 where further scan/image data is called for. The SLAM network edge service 1841 may periodically or from time to time ping some or all of the local devices 211a-211e to request that they report their coordinates or determine coordinates of the local devices 211a-211e in other ways. Or the approach or entry of a local device 211a-211e may automatically initiate a process of determining by the SLAM network edge service 1841 whether further scan/image data is called for in a target area 103. In addition, at 2003 it is determined whether a further scan by this device should be requested, for example, by comparing the image quality of the map corresponding to the target location 103 where the local device 211a-e has been detected with the image capture capabilities of the local device 211a-e. The SLAM network edge service 1841 may request such image capture capabilities information from the respective local device 211a-e or the SLAM network edge service 1841 may have stored the SLAM network edge service 1841, or may retrieve such image capture capabilities information, for example, according to model numbers of the respective local device 211a-e and/or its components.

The SLAM network edge service 1841 may also include a game engine 2007 that selects a game according to user preferences and/or based on the needed scanning. For example, if image capture of light sources is deemed to be called for, then the game selected may be focused on finding light sources of the target area 103. To illustrate, a player may be impelled to direct the camera of a tablet that is the local device 211*a* toward different light sources in room, some of them in the ceiling, because in the game monsters are hiding in the light. After scanning several lights, the virtual image may be a light monster, appearing on the local device 211*a* to be crawling from one light source to another in the ceiling. A virtual net may be generated to appear on the local device 211*a*, which can be "thrown" to catch a monster. Or a lightsaber 213 may be used, depending on the game, to "slay" the monster (by detection of the system of contact of the lightsaber 213 therewith). If a scan of low areas is needed then the game selected may be one that entails lots of crawling by the users of the local devices 211*a-e*. Game selection may also be driven by the number of participants, the age of the participants, preferences of the users, whether the target area 103 is an outdoor space or an indoor space, whether light sabers 213 are being used, and the like. A first local device 211*a* may be playing a game different from a local device 211*b* or local device 211*c*, whether or not they are in the same room or area.

The SLAM network edge service 1841 may guide users via local devices 211*a*-211*e* using a wayfinding system 2005. Or, the wayfinding system 2005 may be provided as part of each of the local devices 211*a-e*. Similarly, components and functionality discussed with reference to one or more of the local devices 211*a-e* may be implemented by the SLAM network edge service 1841, and components and functionality described with respect to the SLAM network edge service 1841 may be implemented by the local devices 211*a-e*. While described with regard to the SLAM network edge service 1841, it will be understood that other types of central nodes are also contemplated.

Figure 21:
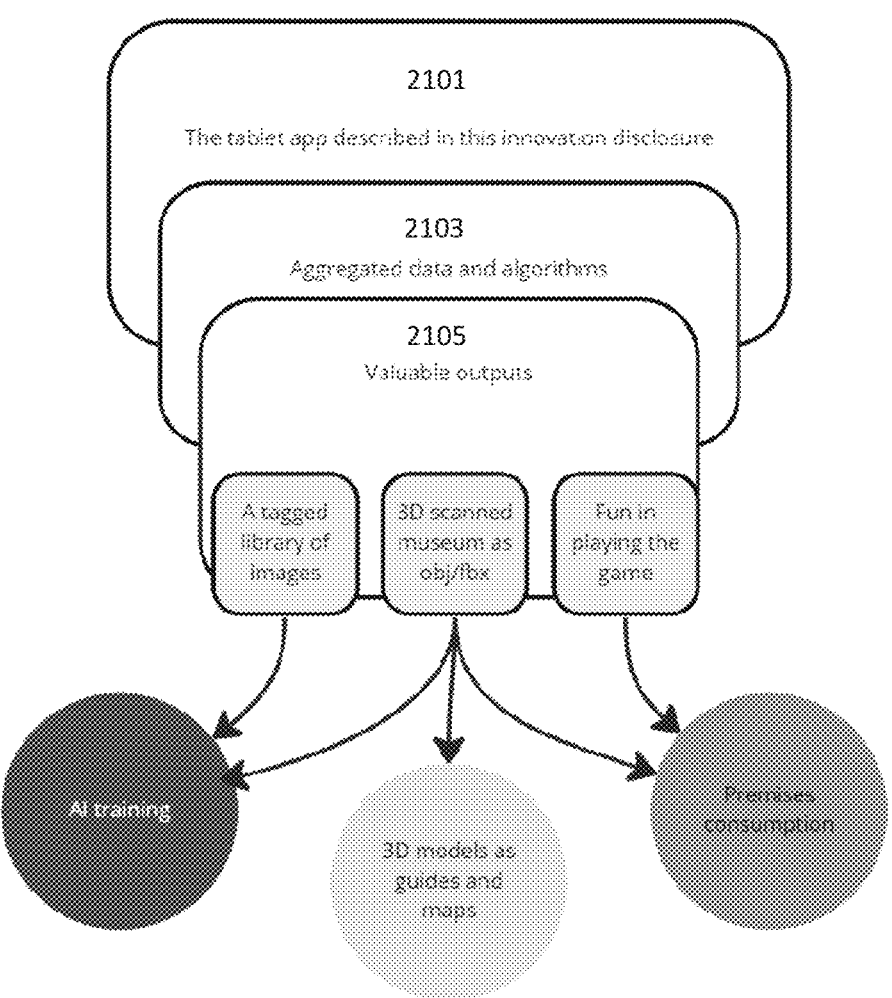
FIG. 21 illustrates examples of data that may be yielded according an aspect of the disclosure and use cases for the data.

FIG. 21 illustrates that components of the systems described herein may yield data that may be useful in various use cases. The tablet, HMD, or other local device 211*a-e* application described 2101, and the data that is aggregated 2103, including the images captured and the map data generated, may yield valuable output data including a tagged library of images, a three dimensionally scanned first region 101 (e.g., a museum), and a game output.

As shown further in FIG. 21, these outputs may be useful for training an artificial intelligence model. For example, the images compiled for a given location, such as a museum, may be useful in training an AI model. Also, a 3D model or guide or map for the first region 101 may be developed or generated based on the imaging and map data. This may be useful, for example, for creating virtual or real world guide for the premises. A game based on these outputs may be useful for local consumption on premises for playing a game as herein described, or may be played remotely by remote device 1861.

A technological problem that arises with the AR, MR, XR technology is data gathering needed to navigate through areas for which accurate map data of sufficient detail is unavailable. This problem is particularly acute for indoor spaces and in private properties away from a street grid. Smaller appliances or other devices navigating chair or table legs and low sofas, or humans walking around furniture, and industrial robots that are dangerous when moving at high or moderate speeds require great map resolution. A related problem is obtaining updated image data for generating maps, as furniture or other objects are moved.

A technological solution that may be obtained according to an aspect of the present disclosure is obtaining detailed image data and map data using local devices that provide virtual images 201 to guide users of the local devices through the image capture process. A game or story played out through the use of such virtual images may propel the action of the users using the local devices orchestrated by the SLAM network edge service 1841.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be affected to the particular embodiments by those of skill in the art without departing from the scope of the present application, which is defined solely by the claims appended hereto.

What is claimed is:

1. A method comprising:

receiving a first transmission from a first device, the first transmission containing first image data for a target area;

generating, by control circuitry, using the first image data, a map of the target area;

determining that at least a portion of the map of the target area is incomplete;

based at least in part on the determining that at least the portion of the map of the target area is incomplete, identifying a plurality of available devices;

selecting at least one second device of the plurality of available devices based at least in part on a rule that permits entry to the target area for the at least one second device and prohibits entry to the target area for available devices of the plurality of available devices other than the at least one second device;

based at least in part on the selecting the at least one second device, transmitting a request to the at least one second device to move toward the target area, wherein the transmitted request causes the at least one second device to display an image or map of at least a portion of the target area with a direction to move toward the target area or causes the at least one second device to automatically move toward the target area;

receiving a second transmission from the at least one second device, the second transmission indicating containing second image data of the target area; and updating, according to the second image data, the map of the target area.

2. The method of claim 1, further comprising:

receiving a third transmission from a third device, the third transmission indicating a location of the third device; and determining that an image data retrieval capability of the at least one second device exceeds an image data retrieval capability of the third device, wherein the transmitting of the request to the at least one second device to move toward the target area is performed in response to the determining that the image data retrieval capability of the at least one second device exceeds the image data retrieval capability of the third device.

3. The method of claim 2, wherein the determining that the image data retrieval capability of the at least one second device exceeds the image data retrieval capability of the third device comprises: determining that the at least one second device retrieves image data in flight.

4. The method of claim 2, wherein the determining that the image data retrieval capability of the at least one second device exceeds the image data retrieval capability of the third device comprises:

determining that the at least one second device comprises an image sensor configured to provide a higher image resolution or a higher frame rate than provided by the third device, or that the at least one second device is configured to provide a higher bit transmission rate than provided by the third device.

5. The method of claim 2, wherein the determining that the image data retrieval capability of the at least one second device exceeds the image data retrieval capability of the third device comprises: determining that an image sensor of the at least one second device is positioned lower to the ground than is an image sensor of the third device.

6. The method of claim 2, further comprising:

storing in relation to the second image data one or more of an image resolution provided by the image sensor of the at least one second device, a frame rate provided by the image sensor of the at least one second device, or a bit transmission rate provided by the at least one second device.

7. The method of claim 2, further comprising:

determining, prior to the transmitting of the request to the at least one second device to move toward the target area, that the indicated location of the third device is closer to the target area than is a location of the at least one second device.

8. The method of claim 1, wherein the first device is a SLAM-enabled device, and the first transmission indicating the location of the first device comprises inertial measurement data obtained by the first device;

wherein the at least one second device is a SLAM-enabled device, and the second transmission indicating the location of the at least one second device comprises inertial measurement data obtained by the at least one second device; and the control circuitry is comprised in a SLAM network edge service.

9. The method of claim 1, wherein the at least one second device is a wearable device.

10. The method of claim 1, wherein the at least one second device is configured to provide an extended reality experience or an augmented reality experience.

11. The method of claim 1, wherein the at least one second device comprises an autonomous household appliance, an industrial robot, a robotic device, or an autonomous vehicle.

12. A system comprising:

communication circuitry configured:

to receive a first transmission from a first device, the first transmission containing first image data for a target area; and processing circuitry configured:

to generate, using the first image data, a map of the area;

to determine that at least a portion of the map of the target area is incomplete;

based at least in part on the determining that at least the portion of the map of the target area is incomplete, to identify a plurality of available devices;

to select at least one second device of the plurality of available devices based at least in part on a rule that permits entry to the target area for the at least one second device and prohibits entry to the target area for available devices of the plurality of available devices other than the at least one second device;

based at least in part on the selecting the at least one second device, to transmit a request to the at least one second device to move toward the target area, wherein the transmitted request causes the at least one second device to display an image or map of at least a portion of the target area with a direction to move toward the target area or causes the at least one second device to automatically move toward the target area;

to receive a second transmission from the at least one second device, the second transmission containing second image data of the target area; and to update, according to the second image data, the map of the target area.

13. The system of claim 12, wherein the processing circuitry is further configured:

to receive a third transmission from a third device, the third transmission indicating a location of the third device; and to determine that an image data retrieval capability of the at least one second device exceeds an image data retrieval capability of the third device, wherein the transmitting of the request to the at least one second device to move toward the target area is performed in response to the determining that the image data retrieval capability of the at least one second device exceeds the image data retrieval capability of the third device.

14. The system of claim 13, wherein the determining that the image data retrieval capability of the at least one second device exceeds the image data retrieval capability of the third device comprises:

determining that the at least one second device retrieves image data in flight.

15. The system of claim 13, wherein the determining that the image data retrieval capability of the at least one second device exceeds the image data retrieval capability of the third device comprises:

determining that the at least one second device comprises an image sensor configured to provide a higher image resolution or a higher frame rate than provided by the third device, or that the at least one second device is configured to provide a higher bit transmission rate than provided by the third device.

16. The system of claim 13, wherein the determining that the image data retrieval capability of the at least one second device exceeds the image data retrieval capability of the third device comprises:

determining that an image sensor of the at least one second device is positioned lower to the ground than is an image sensor of the third device.

17. The system of claim 13, wherein the processing circuitry is further configured:

to store in relation to the second image data one or more of an image resolution provided by the image sensor of the at least one second device, a frame rate provided by the image sensor of the at least one second device, or a bit transmission rate provided by the at least one second device.

18. The system of claim 13, wherein the processing circuitry is further configured:

to determine, prior to the transmitting of the request to the at least one second device to move toward the target area, that the indicated location of the third device is closer to the target area than is a location of the at least one second device.

19. The system of claim 12, wherein the first device is a SLAM-enabled device, and the first transmission indicating the location of the first device comprises inertial measurement data obtained by the first device;

wherein the at least one second device is a SLAM-enabled device, and the second transmission indicating the location of the at least one second device comprises inertial measurement data obtained by the at least one second device; and the processing circuitry is comprised in a SLAM network edge service.

20. The system of claim 12, wherein the at least one second device is a wearable device.

* * * * *